United States Patent
Hirayama

(10) Patent No.: US 7,286,464 B2
(45) Date of Patent: Oct. 23, 2007

(54) OPTICAL ELEMENT AND OPTICAL PICK-UP DEVICE

(75) Inventor: Hiroshi Hirayama, Musashino (JP)

(73) Assignee: Konica Minolta Opto, Inc., Tokyo (JP)

( * ) Notice: Subject to any disclaimer, the term of this patent is extended or adjusted under 35 U.S.C. 154(b) by 676 days.

(21) Appl. No.: 10/872,571

(22) Filed: Jun. 21, 2004

(65) Prior Publication Data

US 2004/0264342 A1  Dec. 30, 2004

(30) Foreign Application Priority Data

Jun. 30, 2003  (JP) .............................. 2003-187042

(51) Int. Cl.
*G11B 7/00* (2006.01)
(52) U.S. Cl. ................. 369/112.23; 369/121
(58) Field of Classification Search ...................... None
See application file for complete search history.

(56) References Cited

U.S. PATENT DOCUMENTS 6,388,822 B1 * 5/2002 Kitamura et al. ........... 359/793

2004/0218503 A1 * 11/2004 Ikenaka .................. 369/112.05

FOREIGN PATENT DOCUMENTS

| JP | 11-167003 | 6/1999 |
| JP | 2000-111702 | 4/2000 |

* cited by examiner

*Primary Examiner*—Paul Huber
(74) *Attorney, Agent, or Firm*—Cohen Pontani Lieberman & Pavane LLP

(57) ABSTRACT

An optical element to be arranged in an optical pickup apparatus for conducting information recording and/or reproducing and to converge light fluxes with a plurality of wavelengths including a wavelength of $\lambda 1$ and a wavelength of $\lambda 2$ onto information recording media, comprises one or more optical main bodies; and an antireflective film which is arranged on a surface of the optical element main bodies and on which at least one optical functional surface is formed, wherein a reflectivity of an incident light flux perpendicular to the optical functional surface has a local maximum value of 1% or more between the wavelength $\lambda 1$ and the wavelength $\lambda 2$.

37 Claims, 9 Drawing Sheets

OPTICAL ELEMENT AND OPTICAL PICK-UP DEVICE

BACKGROUND OF THE INVENTION

The present invention relates to an optical pick-up device by which recording and/or reproducing of the information is conducted, and to an optical element provided in the optical pick-up device.

Conventionally, as information recording media, there are CD using a light flux of wavelength of about 780 nm, DVD using a light flux of wavelength of 635-650 nm, and AOD (Advanced Optical Disc) using the light flux having wavelength of about 405 nm or blu-ray disc, and an optical pick-up device which can correspond also to any information recording medium such as AOD or blu-ray disc, DVD and/or CD is developed. On an optical functional surface of the optical element such as an objective lens provided in this optical pick-up device, a antireflective film to prevent the reflection of the light flux is provided.

Generally, the antireflective film has the reflection prevention function for each light flux of the wavelength of a broad band, and corresponding to the breadth of the wavelength region (hereinafter, it is denoted as the reflection prevention wavelength region) in which the reflection is to be prevented, or the magnitude of the refractive index of the optical element main body, the reflection factor for a target (hereinafter, it is denoted as a target reflection factor), it is structured by various layer numbers. Specifically, in the optical pick-up device which can correspond to AOD or blu-ray disc and DVD, for example, in the case where the reflection prevention wavelength region is 400-650 nm, the refractive index of the optical element main body is about 1.5-1.6, and the magnitude of the target reflection factor is not larger than 1%, the antireflective film of the optical element is generally structured by 5-7 layers. Further, in the optical pick-up device which can correspond to AOD or blu-ray disc, DVD and CD, when the reflection prevention wavelength region is 400-800 nm, the antireflective film is structured by 9 layers or more (for example, refer to Patent Document 1).

Hereupon, when the antireflective film number is increased, there is a problem that the production cost is increased, or water enters between layers and the spectral characteristic is changed. Further, particularly when the optical element main body is formed of optical plastic, there is problem that the environmental resistance is lowered such as a case where a crack is generated on the antireflective film by the stress of the antireflective film itself, or the adhesion between the antireflective film and optical element main body is lowered.

Therefore, in order to solve such a problem, there is a technology by which, by limiting the wavelength whose reflection factor is not larger than 1% to only two kinds of wavelengths, the antireflective film is structured by few layer numbers of 3-7 (for example, refer to Patent Document 2).

(Patent Document 1)
Tokkai 2000-111702
(Patent Document 2)
Tokkaihei 11-167003

However, the technology disclosed in the above Patent Document 2 is a technology by which the reflection of the light flux having wavelength 150-300 nm or the light flux having wavelength 400-800 nm is prevented, and is not a technology by which the reflection of the light flux of wavelength 390-430 nm or the light flux of wavelength of 630-800 nm is prevented.

The object of the present invention is to provide an optical element by which the reflection of the light flux of wavelength of 390-430 nm or the light flux of wavelength of 630-800 nm can be prevented using the antireflective film with fewer layer numbers than conventional devices, and an optical pick-up device provided with this optical element.

A structure written in item 1 is an optical element which is provided in an optical pick-up device which conducts the recording and/or reproducing of the information, and which light-converges light fluxes of a plurality of wavelengths including wavelength $\lambda 1$ (390 nm$\leq \lambda 1 \leq$430 nm) and wavelength $\lambda 2$ (630$\leq \lambda 2 \leq$800 nm) on the information recording medium, and there are provided with one or more optical element main bodies, and the antireflective film which is provided on the surface of the optical element main body and on which at least one optical functional surface is formed, and the reflection factor of the light flux incident perpendicularly on the optical functional surface shows the local maximal value not smaller than 1% between the wavelength $\lambda 1$ and the wavelength $\lambda 2$. Furthermore, it is preferable that the local maximal value is not smaller than 2%.

Herein, the plurality of wavelengths means the wavelengths of 2 kinds or more. Further, "between the wavelength $\lambda 1$ and the wavelength $\lambda 2$" means a range which is longer than the wavelength $\lambda 1$, and shorter than the wavelength $\lambda 2$.

According to the above-described structure, because the reflection factor of the light flux incident perpendicularly on the optical functional surface shows the local maximal value not smaller than 1% between the wavelength $\lambda 1$ and the wavelength $\lambda 2$, the reflection factor is relatively low to the light flux of wavelength $\lambda 1$ and the light flux of wavelength $\lambda 2$, and is in the situation in which the reflection is prevented. Accordingly, by reducing the reflection prevention function between the wavelength $\lambda 1$ and the wavelength $\lambda 2$, the layer numbers of the antireflective film can be reduced without losing the reflection prevention function to the light flux of wavelength $\lambda 1$ and the light flux of wavelength $\lambda 2$ against the conventional antireflective film by which the reflection is prevented to the whole of light fluxes of the broad wavelength region of wavelength $\lambda 1$-$\lambda 2$. Accordingly, the production cost can be reduced, and a change of the spectral characteristic by entering of water between layers of the antireflective film can be suppressed.

Further, even when the optical element main body is made of plastic, a case where a crack is generated in the antireflective film by the stress of the antireflective film, or the adherence of the antireflective film and the optical element main body is lowered, can be prevented, that is, the environmental resistance can be improved.

DETAILED DESCRIPTION OF THE PREFERRED EMBODIMENT

Figure 1:
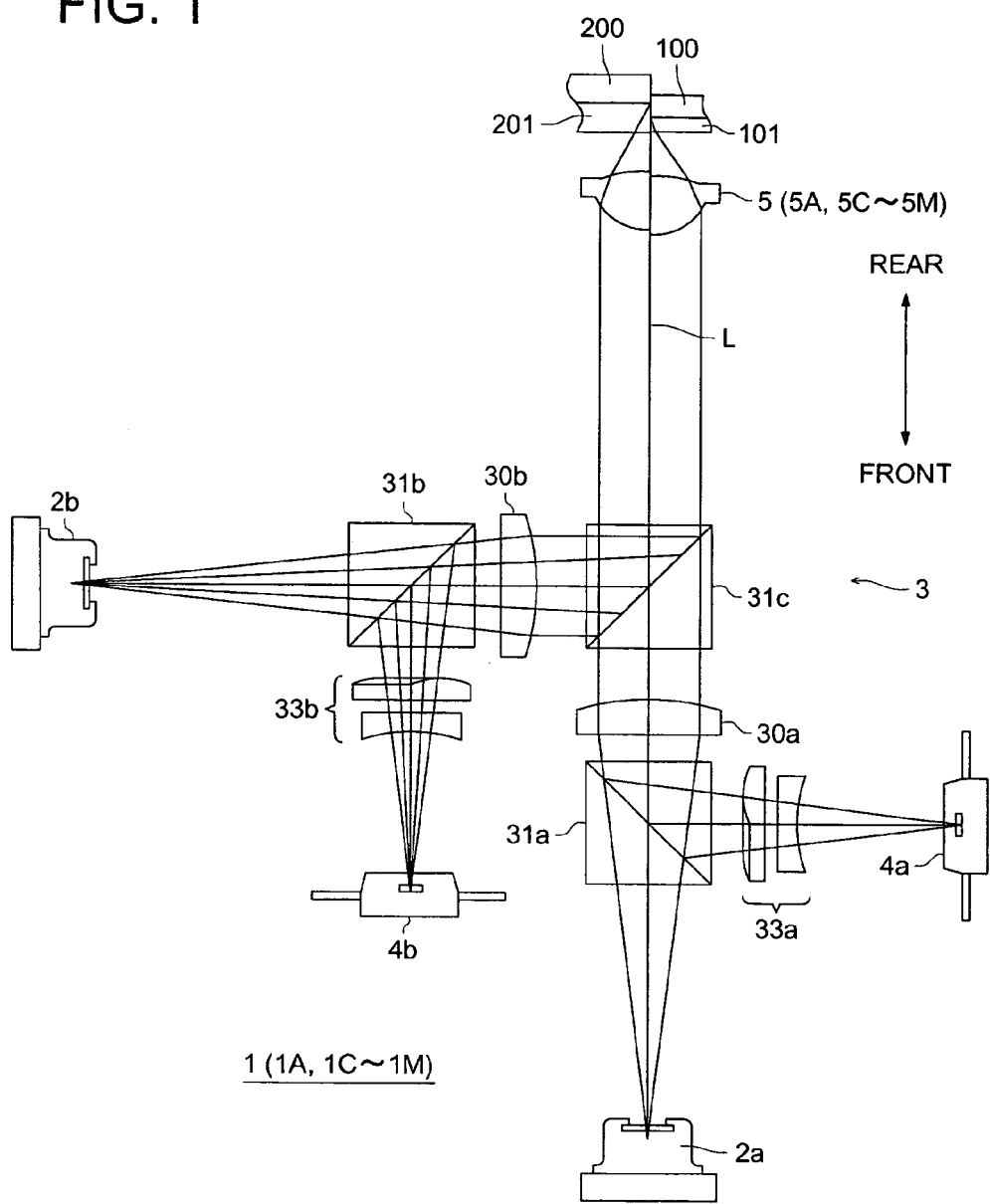
FIG. 1 is a view showing an outline structure of an optical pick-up device according to an embodiment of the present invention.

A preferred embodiment of the present invention will be described below.

According to a structure written in item 2, in the optical element written in item 1, the plurality of wavelengths includes a wavelength $\lambda 3$ (760 nm$\leq \lambda 3 \leq$800 nm), and a wavelength $\lambda 2$ is 630 nm$\leq \lambda 2 \leq$670 nm.

According to the structure written in item 2, the reflection of the light flux of using wavelength $\lambda 1$ of AOD or blu-ray disc, the light flux of using wavelength $\lambda 2$ of DVD, and the light flux of using wavelength $\lambda 3$ can be prevented by the antireflective film of few layer numbers.

According to the structure written in item 3, in the optical element written in item 1 or 2, the maximum incidence and projection angle $\theta$max of the light flux of wavelength $\lambda 1$ on the optical functional surface is $0° \leq \theta$max$\leq 40°$.

According to the structure written in item 3, by using the light flux of $0° \leq \theta$max$\leq 40°$, the accurate recording or reproducing of the information can be conducted.

According to a structure written in item 4, in the optical element written in any one of items 1-3, the refractive index $n_0$ of the optical element main body is $1.45 \leq n_0 \leq 1.65$, and in a layer included in the antireflective film, in the first layer positioned on the most optical element main body side, the refractive index $n_1$, is $1.7 \leq n_1, \leq 2.5$, and the optical film thickness $nd_1$ is 225 nm$\leq nd_1 \leq$275 nm, and in the second layer secondly positioned on the optical element main body side, the refractive index $n_2$ is $1.3 \leq n_2 \leq 1.55$, and the optical film thickness $nd_2$ is 100 nm$\leq nd_2 \leq$150 nm.

Herein, the optical film thickness is a value expressed by the film thickness×refractive index (nm), and the film thickness means the thickness in the normal direction of the surface of the optical element main body.

According to the invention written in item 4, because the first layer and the second layer can prevent the reflection of the light flux of each wavelength, without deteriorating the reflection prevention function, the number of layers of the antireflective film can be reduced.

According to the structure written in item 5, in the optical element written in any one of items 1-3, the refractive index $n_0$ of the optical element main body is $1.45 \leq n_0 \leq 1.65$, and in the layer included in the antireflective film, as to the first layer positioned on the most optical element main body side, the refractive index $n_1$ is $1.7 \leq n_1 \leq 2.5$, and the optical film thickness $nd_1$ is 125 nm$\leq nd_1 \leq$175 nm, and as to the second layer positioned secondly on the optical element main body side, the refractive index $n_2$ is $1.55 \leq n_2 \leq 1.7$, and the optical film thickness $nd_2$ is 75 nm$\leq nd_2 \leq$125 nm, and as to the third layer positioned thirdly on the optical element main body side, the refractive index $n_3$ is $1.3 \leq n_3 < 1.55$, and the optical film thickness $nd_3$ is 100 nm$\leq nd_3 \leq$150 nm.

According to a structure written in item 5, because the first layer, second layer, and third layer can prevent the reflection of the light flux of each wavelength, the number of layers of the antireflective film can be reduced without deteriorating the reflection prevention function.

According to the structure written in item 6, in the optical element written in any one of items 1-3, the refractive index $n_0$ of the optical element main body is $1.45 \leq n_0 \leq 1.65$, and in the layer included in the antireflective film, as to the first layer positioned on the most optical element main body side, the refractive index $n_1$ is $1.7 \leq n_1 \leq 2.5$, and the optical film thickness $nd_1$ is 25 nm$\leq nd_1 \leq$75 nm, as to the second layer positioned secondly on the optical element main body side, the refractive index $n_2$ is $1.3 \leq n_2 \leq 1.55$, and the optical film thickness $nd_2$ is 25 nm$\leq nd_2 \leq$75 nm, as to the third layer positioned thirdly on the optical element main body side, the refractive index $n_3$ is $1.7 \leq n_3 \leq 2.5$, and the optical film thickness $nd_3$ is 225 nm$\leq nd_3 \leq$275 nm, and as to the fourth layer positioned fourthly on the optical element main body side, the refractive index $n_4$ is $1.3 \leq n_4 < 1.55$, and the optical film thickness $nd_4$ is 135 nm$\leq nd_4 \leq$185 nm.

According to the structure written in item 6, because the reflection of the light flux of each wavelength can be prevented by the first layer, second layer, third layer, and fourth layer, the number of layers of the antireflective film can be reduced without deteriorating the reflection prevention function.

A structure written in item 7 is an optical element which is provided in the optical pick-up device by which the recording and/or reproducing of the information is conducted, and is an optical element by which the light flux of a plurality of wavelengths including wavelength $\lambda 1$(390 nm$\leq \lambda 1 \leq$430 nm), and the light flux of a plurality of wavelengths including wavelength $\lambda 2$(630 nm$\leq \lambda 2 \leq \lambda$670 nm), are light-converged onto the information recording medium, and it has one or more optical element main bodies, and the antireflective film provided on the surface of the optical element main body, and the antireflective film is formed in such a manner that a value of ((the maximum film thickness in the effective diameter to the light flux of the wavelength $\lambda 1$)−(the minimum film thickness in the effective diameter))/average film thickness, is not larger than 5%, and at least 2 optical functional surfaces in which the maximum incidence and projection angle $\theta$max in the effective diameter is 0° $\theta$max$\leq 40°$, are formed, and in these optical functional surfaces, in the case where the wavelength $\lambda$ of the light flux incident perpendicularly is $\lambda 1 \leq \lambda \leq \lambda 1 + 15$ nm or $\lambda 2 \leq \lambda \leq \lambda 2+15$ nm, the reflection factor is not larger than 1%, and in the case where the wavelength $\lambda$ is a wavelength within the range of $\lambda 1+15$ nm$<\lambda<\lambda 2$, the reflection factor shows the local maximal value larger than 1%.

According to the structure written in item 7, in the case where the wavelength $\lambda$ of the light flux perpendicularly incident on the optical functional surface is $\lambda 1 \leq \lambda \leq \lambda 1+15$ nm, and in the case where $\lambda 2 \leq \lambda \leq \lambda 2+15$ nm, because the reflection factor on the optical functional surface is not larger than 1%, the reflection for the wavelength in these zones can be prevented. Further, in the case where wavelength $\lambda$ is a wavelength in the area $\lambda 1+15$ nm$\leq \lambda \leq \lambda 2$, because the reflection factor shows the local maximal value larger than 1%, that is, the reflection prevention function is lowered, different from the conventional antireflective film which prevents the reflection for the whole light fluxes in the broad wavelength region of wavelength $\lambda 1$-$\lambda 2$, the number of layers of the antireflective film can be reduced without deteriorating the reflection prevention function for the light flux of the wavelength $\lambda 1$ and the light flux of wavelength $\lambda 2$. Accordingly, the production cost can be reduced, and a change of the spectral characteristic by the entering of water between layers of the antireflective film can be suppressed.

Further, even when the optical element main body is made of optical plastic, a case where a crack is generated in antireflective film by the stress of the antireflective film, or the adherence of the antireflective film to the optical element main body is reduced, can be prevented, that is, the environmental resistance can be increased.

Hereupon, as a method by which the reflection film is formed in such a manner that a value of ((the maximum film thickness in the effective diameter to the light flux of wavelength $\lambda 1$)-(the minimum film thickness in the effective diameter))/average film thickness is not larger than 5%, there is a method by which a rotation revolution tool is fitted to an evaporating machine by which the antireflective film is evaporated, or when the film is formed by a CVD (Chemical Vapor Deposition) method, a method by which the pressure of an atmosphere is adjusted to a little high condition. Further, in the case where the antireflective film is formed in this manner, when the optical film thickness of the antireflective film is larger than the using wavelength, an incident angle of the light flux can be changed and the spherical aberration is deteriorated. Therefore, it is preferable that the transmission wave-front of the optical element after the film is formed, is measured, a metallic mold to mold the optical element main body is corrected, and the design work of the optical element main body is conducted so that the spherical aberration of the antireflective film is previously cancelled.

According to the structure written in item 8, in the optical element written in item 7, the plurality of wavelengths include the wavelength $\lambda 3$ (760 nm$\leq \lambda 3 \leq 800$ nm), and when the wavelength $\lambda$ is $\lambda 3 \leq \lambda \leq \lambda 3+15$ nm, on the optical functional surface, the reflection factor is not larger than 1%.

According to the structure written in item 8, when the wavelength $\lambda$ is $\lambda 3 \leq \lambda \leq \lambda 3+15$ nm, because the reflection factor on the optical functional surface is not larger than 1%, the reflection can be prevented also for the wavelength in this region.

The structure written in item 9 is the optical element which is provided in the optical pick-up device by which the recording and/or reproducing of the information is conducted, and which light converges the light fluxes of a plurality of wavelengths including the wavelength $\lambda 1$ (390 nm$\leq \lambda 1 \leq 430$ nm) and $\lambda 2$ (630 nm$\leq \lambda 2 \leq 670$ nm) on the information recording medium, and is provided with one or more optical element main bodies and the antireflective film provided on the surface of the optical element main body, and the antireflective film is formed in such a manner that a value of ((the maximum film thickness in the effective diameter to the light flux of the wavelength $\lambda 1$)-(the minimum film thickness in the effective diameter))/average film thickness, is not larger than 5%, and at least 2 optical functional surfaces in which the maximum incidence projection angle $\theta$max in the effective diameter is $40°<\theta$max$<90°$, are formed, and in these optical functional surfaces, when the wavelength $\lambda$ of the light flux incident perpendicularly is $\lambda 1 \leq \lambda \leq \lambda 1+50$ nm, or when $\lambda 2 \leq \lambda \leq \lambda 2+40$ nm, the reflection factor is not larger than 1%, and when the wavelength $\lambda$ is a wavelength within the range of $\lambda 1+50$ nm$<\lambda<\lambda 2$, the reflection factor shows the local maximal value larger than 1%.

According to the structure written in item 9, when the wavelength $\lambda$ of the light flux incident perpendicularly to the optical functional surface is $\lambda 1 \leq \lambda \leq \lambda 1+50$ nm and when it is $\lambda 2 \leq \lambda \leq \lambda 2+40$ nm, because the reflection factor on the optical functional surface is not larger than 1%, the reflection can be prevented for the wavelength in these zones. Further, when the wavelength $\lambda$ is a wavelength in the range of $\lambda 1+50$ nm$<\lambda<\lambda 2$, the reflection factor shows the local maximal value larger than 1%, that is, because the reflection prevention function is lowered. Therefore, the number of layers of the antireflective film can be reduced without deteriorating the reflection prevention function to the light flux of the wavelength $\lambda 1$ and the light flux of the wavelength $\lambda 2$ against the conventional antireflective film to prevent the reflection for the whole light fluxes in the broad wavelength region of wavelength $\lambda 1$-$\lambda 2$. Accordingly, the production cost can be reduced, and a change of spectral characteristic by penetrating of the water between layers of the antireflective film can be suppressed.

Further, even when the optical element main body is made of plastic, it can be prevented that a crack is generated in the antireflective film by the stress of the antireflective film, or the adherence between the antireflective film and the optical element main body is lowered, that is, the environmental resistance can be increased.

According to the structure written in item 10, in the optical element written in item 9, the plurality of wavelengths include the wavelength $\lambda 3$ (760 nm$\leq \lambda 3 \leq 800$ nm), and in the optical functional surface, when the wavelength $\lambda$ is $\lambda 3 \leq \lambda \leq \lambda 3+30$ nm, the reflection factor is not larger than 1%.

According to the structure written in item 10, when the wavelength $\lambda$ is $\lambda 3 \leq \lambda \leq \lambda 3+30$ nm, because the reflection factor on the optical functional surface is not larger than 1%, the reflection can be prevented also for the wavelength in this zone.

The structure written in item 11 is an optical element which is provided in the optical pick-up device which conducts the recording and/or reproducing of the information, and which light-converges light fluxes of a plurality of wavelengths including the wavelength $\lambda 1$ (390 nm$\leq \lambda 1 \leq 430$ nm) and the wavelength $\lambda 2$ (630 nm$\leq \lambda 2 \leq 670$ nm) on the information recording medium, and which is provided with an optical element more than 1, and the antireflective film provided on the surface of the optical element main body, and the antireflective film is formed in such a manner that a value of ((the maximum film thickness in the effective diameter to the light flux of the wavelength $\lambda 1$)-(the minimum film thickness in the effective diameter))/average film thickness is not larger than 5%, and at least one of the first optical functional surface in which the maximum incidence projection angle $\theta$max in the effective diameter is $0° \leq \theta max \leq 40°$, and the second optical functional surface in which the maximum incidence projection angle $\theta max$ in the effective diameter is $40° \leq \theta max \leq 90°$, is formed, and in the first optical functional surface, the reflection factor is not larger than 1% when the wavelength $\lambda$ of the light flux incident perpendicularly is $\lambda 1 \leq \lambda \leq \lambda 1+15$ nm, and when it is $\lambda 2 \leq \lambda \leq \lambda 2+15$ nm, and when the wavelength $\lambda$ is a wavelength in the range of $\lambda 1+15$ nm$<\lambda<\lambda 2$, the reflection factor shows the local maximal value larger than 1%, and in the second optical functional surface, the reflection factor is not larger than 1% when the wavelength $\lambda$ is $\lambda 1 \leq \lambda \leq \lambda 1+50$ nm, or when it is $\lambda 2 \leq \lambda \leq \lambda 2+40$ nm, and when the wavelength $\lambda$ is a wavelength in the range of $\lambda 1+50$ nm$<\lambda<\lambda 2$, the reflection factor shows the local maximal value larger than 1%.

According to the structure written in item 11, when the wavelength $\lambda$ of the light flux incident perpendicularly to the first optical functional surface is $\lambda 1 \leq \lambda \leq \lambda 1+15$ nm, and $\lambda 2 \leq \lambda \leq \lambda 2+15$ nm, the reflection factor on the first optical functional surface is not larger than 1%, and when the wavelength $\lambda$ of the light flux incident perpendicularly to the second optical functional surface is $\lambda 1 \leq \lambda \leq \lambda 1+50$ nm, and $\lambda 2 \leq \lambda \leq \lambda 2+40$ nm, because the reflection factor on the second optical functional surface is not larger than 1%, the reflection can be prevented to the wavelengths in these zones.

Further, in the first optical functional surface, when the wavelength $\lambda$ is a wavelength in the range of $\lambda 1+15$ nm$<\lambda<\lambda 2$, the reflection factor shows the local maximal value larger than 1%, and in the second optical functional surface, when the wavelength $\lambda$ is a wavelength in the range of $\lambda 1+50$ nm$<\lambda<\lambda 2$, the reflection factor shows the local maximal value larger than 1%, that is, the reflection prevention function is lowered. Therefore, the number of layers of the antireflective film can be reduced without deteriorating the reflection prevention function for the light flux of wavelength $\lambda 1$ and the light flux of wavelength $\lambda 2$ against the conventional antireflective film to prevent the reflection to the whole light fluxes of the broad area of wavelengths $\lambda 1$-$\lambda 2$. Accordingly, the production cost can be reduced, and a change of the spectral characteristic by penetrating of the water between layers of the antireflective film can be suppressed.

Further, even when the optical element main body is made of plastic, it can be prevented that a crack is generated in the antireflective film by the stress of the antireflective film, or the adherence between the antireflective film and the optical element main body is lowered, that is, the environmental resistance can be increased.

According to the structure written in item 12, in the optical element written in item 11, the plurality of wavelengths include the wavelength $\lambda 3$ (760 nm$\leq \lambda 3 \leq$800 nm), and in the first optical functional surface, when the wavelength $\lambda$ is $\lambda 3 \leq \lambda \leq \lambda 3+15$ nm, the reflection factor is not larger than 1%, and in the second optical functional surface, when the wavelength $\lambda$ is $\lambda 3 \leq \lambda \leq \lambda 3+30$ nm, the reflection factor is not larger than 1%.

According to the structure written in item 12, when the wavelength $\lambda$ is $\lambda 3 \leq \lambda \leq \lambda 3+15$ nm, because the reflection factor on the first optical functional surface is not larger than 1%, and when the wavelength $\lambda$ is $\lambda 3 \leq \lambda \leq \lambda 3+30$ nm, the reflection factor on the second optical functional surface is not larger than 1%, the reflection can be prevented also for the wavelength in these regions.

The structure written in item 13 is an optical element which is provided in the optical pick-up device which conducts the recording and/or reproducing of the information, and which light-converges light fluxes of a plurality of wavelengths including the wavelength $\lambda 1$ (390 nm$\leq \lambda 1 \leq$430 nm) and the wavelength $\lambda 2$ (630 nm$\leq \lambda 2 \leq$670 nm) on the information recording medium, and which is provided with an optical element main bodies more than 1, and the antireflective film provided on the surface of the optical element main body, and the antireflective film is formed in such a manner that a value of ((the maximum film thickness in the effective diameter to the light flux of the wavelength $\lambda 1$)–(the minimum film thickness in the effective diameter))/average film thickness is larger than 5%, and at least two optical functional surfaces in which the maximum incidence projection angle $\theta max$ in the effective diameter and the maximum surface angle $\theta \perp max$ in the effective diameter, are $0° \leq \theta max \leq 40°$, and $0° \leq \theta \perp max \leq 40°$, are formed, and in these optical functional surfaces, the reflection factor is not larger than 1% when the wavelength $\lambda$ of the light flux incident perpendicularly is $\lambda 1 \leq \lambda \leq \lambda 1+15$ nm, and when it is $\lambda 2 \leq \lambda \leq \lambda 2+15$ nm, and when the wavelength $\lambda$ is a wavelength in the range of $\lambda 1+15$ nm$<\lambda<\lambda 2$, the reflection factor shows the local maximal value larger than 1%.

Herein, the surface angle is an angle formed between the normal line of the optical functional surface and the optical axis.

According to the structure written in item 13, when the wavelength $\lambda$ of the light flux incident perpendicularly to the optical functional surface is $\lambda 1 \leq \lambda \leq \lambda +15$ nm, and when it is $\lambda 2 \leq \lambda \leq \lambda 2+15$ nm, because the reflection factor on the optical functional surface is not larger than 1%, the reflection can be prevented to the wavelength in these regions. Further, when the wavelength $\lambda$ is a wavelength in the range of $\lambda 1+15$ nm$<\lambda<\lambda 2$, the reflection factor shows the local maximal value larger than 1%, that is, the reflection prevention function is lowered. Therefore, the number of layers of the antireflective film can be reduced without deteriorating the reflection prevention function to the light flux of wavelength $\lambda 1$ and the light flux of wavelength $\lambda 2$ against the conventional antireflective film to prevent the reflection to the whole light fluxes in broad wavelength region of wavelength $\lambda 1$-$\lambda 2$. Accordingly, the production cost can be reduced, and a change of spectral characteristic by penetration of the water between layers of the antireflective film can be suppressed.

Further, even when the optical element main body is made of plastic, it can be prevented that a crack is generated in the antireflective film by the stress of the antireflective film, or the adherence between the antireflective film and the optical element main body is lowered, that is, the environmental resistance can be increased.

According to the structure written in item 14, in the optical element written in item 13, the plurality of wavelengths include wavelength $\lambda 3$ (760 nm$\leq \lambda 3 \leq$800 nm), and in the optical functional surface, when the wavelength $\lambda$ is $\lambda 3 \leq \lambda \leq \lambda 3+15$ nm, the reflection factor is not larger than 1%.

According to the structure written in item 14, when the wavelength $\lambda$ is $\lambda 3 \leq \lambda \leq \lambda 3+15$ nm, because the reflection factor on the optical functional surface is not larger than 1%, the reflection can be prevented also for the wavelength in these regions.

The structure written in item 15 is an optical element which is provided in the optical pick-up device by which the recording and/or reproducing of the information is conducted, and which light converges the light fluxes of a plurality of wavelengths including the wavelength $\lambda 1$ (390 nm$\leq \lambda 1 \leq$430 nm) and wavelength $\lambda 2$ (630 nm$\leq \lambda 2 \leq$670 nm) on the information recording medium, and it is provided with one or more optical element main bodies and a antireflective film provided on the optical element main body, and the antireflective film is formed so that a value of ((the maximum film thickness in the effective diameter to the light flux of the wavelength $\lambda 1$)–(the minimum thickness in the effective diameter))/average film thickness is larger than 5%, and the maximum incidence projection angle θmax in the effective diameter and the maximum surface angle θ⊥max in the effective diameter form at least 2 optical functional surfaces in which $0°\leq θmax \leq 40°$ and $40°< θ⊥max<90°$, or $40°<θmax<90°$ and $0°\leq θ⊥max \leq 40°$, and in these optical functional surfaces, when the wavelength $\lambda$ of the light flux incident perpendicularly is $\lambda 1 \leq \lambda \leq \lambda 1+50$ nm, or when $\lambda 2 \leq \lambda \leq \lambda 2+40$ nm, the reflection factor is not larger than 1%, and when the wavelength $\lambda$ is a wavelength in the range of $\lambda 1+50$ nm$<\lambda<\lambda 2$, the reflection factor shows the local maximal value larger than 1%.

According to the structure written in item 15, when the wavelength $\lambda$ of the light flux incident perpendicularly to the optical functional surface is $\lambda 1 \leq \lambda \leq \lambda 1+50$ nm, and when $\lambda 2 \leq \lambda \leq \lambda 2+40$ nm, because the reflection factor on the optical functional surface is not larger than 1%, the reflection can be prevented to the wavelength in these regions. Further, when the wavelength $\lambda$ is a wavelength in the range of $\lambda 1+50$ nm$<\lambda<\lambda 2$, the reflection factor on the optical functional surface shows the local maximal value larger than 1%, that is, the reflection prevention function is lowered. Therefore, the number of layers of the antireflective film can be reduced without deteriorating the reflection prevention function to the light flux of wavelength $\lambda 1$ and the light flux of wavelength $\lambda 2$ against the conventional antireflective film to prevent the reflection to the whole light fluxes in broad wavelength region of wavelength $\lambda 1$-$\lambda 2$. Accordingly, the production cost can be reduced, and a change of spectral characteristic by penetration of the water between layers of the antireflective film can be suppressed.

Further, even when the optical element main body is made of plastic, it can be prevented that a crack is generated in the antireflective film by the stress of the antireflective film, or the adherence between the antireflective film and the optical element main body is lowered, that is, the environmental resistance can be increased.

According to the structure written in item 16, in the optical element written in item 15, the plurality of wavelengths include the wavelength $\lambda 3$ (760 nm$\leq \lambda 3 \leq$800 nm), and in the optical functional surface, when the wavelength $\lambda$ is $\lambda 3 \leq \lambda \leq \lambda 3+30$ nm, the reflection factor is not larger than 1%.

According to the structure written in item 16, when the wavelength $\lambda$ is $\lambda 3 \leq \lambda \leq \lambda 3+30$ nm, because the reflection factor on the optical functional surface is not larger than 1%, the reflection can be prevented also for the wavelength in these regions.

The structure written in item 17 is an optical element which is provided in the optical pick-up device by which the recording and/or reproducing of the information is conducted, and which light converges light fluxes of a plurality of wavelengths including the wavelength $\lambda 1$ (390 nm$\leq \lambda 1 \leq$430 nm) and the wavelength $\lambda 2$ (630 nm$\leq \lambda 2 \leq$670 nm) on the information recording medium, and it is provided with one or more optical element main bodies and the antireflective film provided on the surface of the optical element main body, and the antireflective film is formed so that a value of ((the maximum film thickness in the effective diameter to the light flux of the wavelength $\lambda 1$)–(the minimum thickness in the effective diameter))/ average film thickness is larger than 5%, and the maximum incidence projection angle θmax in the effective diameter and the maximum surface angle θ⊥max in the effective diameter form at least one of the first optical functional surface in which $0°\leq θmax \leq 40°$ and $0°\leq θ⊥max \leq 40°$, and at least one of the second optical functional surface in which $0°\leq θmax \leq 40°$ and $40°< θ⊥max<90°$, or $40°<θmax<90°$ and $0°\leq θ⊥max \leq 40°$, and in the first optical functional surface, when the wavelength $\lambda$ of the light flux incident perpendicularly is $\lambda 1 \leq \lambda \leq \lambda 1+15$ nm, and when $\lambda 2 \leq \lambda \leq \lambda 2+15$ nm, the reflection factor is not larger than 1%, and when the wavelength $\lambda$ is a wavelength in the range of $\lambda 1+15$ nm$<\lambda<\lambda 2$, the reflection factor shows the local maximal value larger than 1%, and in the second optical functional surface, when the wavelength $\lambda$ is $\lambda 1 \leq \lambda \leq \lambda 1+50$ nm, or when $\lambda 2 \leq \lambda \leq \lambda 2+40$ nm, the reflection factor is not larger than 1%, and when the wavelength $\lambda$ is a wavelength in the range of $\lambda 1+50$ nm$<\lambda<\lambda 2$, the reflection factor shows the local maximal value larger than 1%.

According to the structure written in item 17, when the wavelength $\lambda$ of the light flux incident perpendicularly to the first optical functional surface is $\lambda 1 \leq \lambda \leq \lambda 1+15$ nm, and when $\lambda 2 \leq \lambda \leq \lambda 2+15$ nm, the reflection factor on the first optical functional surface is not larger than 1%, and when the wavelength $\lambda$ of the light flux incident perpendicularly to the second optical functional surface is $\lambda 1 \leq \lambda \leq \lambda 1+50$ nm, and when $\lambda 2 \leq \lambda \leq \lambda 2+40$ nm, because the reflection factor on the second optical functional surface is not larger than 1%, the reflection can be prevented to the wavelength in these regions. Further, in the first optical functional surface, when the wavelength $\lambda$ is a wavelength in the range of $\lambda 1+15$ nm$<\lambda<\lambda 2$, the reflection factor shows the local maximal value larger than 1%, and in the second optical functional surface, when the wavelength $\lambda$ is a wavelength in the range of $\lambda 1+50$ nm$<\lambda<\lambda 2$, the reflection factor shows the local maximal value larger than 1%, that is, the reflection prevention function is lowered. Therefore, the number of layers of the antireflective film can be reduced without deteriorating the reflection prevention function to the light flux of wavelength $\lambda 1$ and the light flux of wavelength $\lambda 2$ against the conventional antireflective film to prevent the reflection to the whole light fluxes in broad wavelength region of wavelength $\lambda 1$-$\lambda 2$. Accordingly, the production cost can be reduced, and a change of spectral characteristic by penetration of the water between layers of the antireflective film can be suppressed.

Further, even when the optical element main body is made of plastic, it can be prevented that a crack is generated in the antireflective film by the stress of the antireflective film, or the adherence between the antireflective film and the optical element main body is lowered, that is, the environmental resistance can be increased.

According to the structure written in item 18, in the optical element written in item 17, the wavelength of the plurality of wavelengths includes the wavelength $\lambda 3$ (760 nm$\leq \lambda 3 \leq$800 nm), and in the first optical functional surface, when the wavelength $\lambda$ is $\lambda 3 \leq \lambda \leq \lambda 3+15$ nm, the reflection factor is not larger than 1%, and in the second optical functional surface, when the wavelength $\lambda$ is $\lambda 3 \leq \lambda \leq \lambda 3+30$ nm, the reflection factor is not larger than 1%.

According to the structure written in item 18, when the wavelength $\lambda$ is $\lambda 3 \leq \lambda \leq \lambda 3+15$ nm, the reflection factor on the first optical functional surface is not larger than 1%, and when the wavelength $\lambda$ is $\lambda 3 \leq \lambda \leq \lambda 3+30$ nm, because the reflection factor on the second optical functional surface is not larger than 1%, the reflection can be prevented also for the wavelength in these regions.

The structure written in item 19 is an optical element which is provided in the optical pick-up device by which the recording and/or reproducing of the information is conducted, and which light converges light fluxes of a plurality of wavelengths including the wavelength $\lambda 1$ (390 nm$\leq \lambda 1 \leq$430 nm) and the wavelength $\lambda 2$ (630 nm$\leq \lambda 2 \leq$670 nm) on the information recording medium, and it is provided with one or more optical element main body and the antireflective film provided on the surface of the optical element main body, and the antireflective film is formed so that a value of ((the maximum film thickness in the effective diameter to the light flux of the wavelength $\lambda 1$)−(the minimum thickness in the effective diameter))/ average film thickness is larger than 5%, and the maximum incidence projection angle $\theta$max in the effective diameter and the maximum surface angle $\theta\perp$max in the effective diameter form at least one of the first optical functional surface in which $0°\leq\theta$max$\leq 40°$ and $0°\leq\theta\perp$max$\leq 40°$, and at least one of the second optical functional surface in which $40°<\theta$max$<90°$ and $40°\leq\theta\perp$max$\leq 90°$, and in the first optical functional surface, when the wavelength $\lambda$ of the light flux incident perpendicularly is $\lambda 1\leq\lambda\leq\lambda 1+15$ nm, or when $\lambda 2\leq\lambda\leq\lambda 2+15$ nm, the reflection factor is not larger than 1%, and when the wavelength $\lambda$ is a wavelength in the range of $\lambda 1+15$ nm$\leq\lambda\leq\lambda 2$, the reflection factor shows the local maximal value larger than 1%, and in the second optical functional surface, when the wavelength $\lambda$ is $\lambda 1\leq\lambda\leq\lambda 2+130$ nm, the reflection factor is not larger than 1.5%.

According to the structure written in item 19, when the wavelength $\lambda$ of the light flux incident perpendicularly to the first optical functional surface is $\lambda 1\leq\lambda\leq\lambda 1+15$ nm, and when $\lambda 2\lambda\leq 2+15$ nm, the reflection factor on the first optical functional surface is not larger than 1%, and when the wavelength $\lambda$ of the light flux incident perpendicularly to the second optical functional surface is $\lambda 1\leq\lambda\leq\lambda 2+130$ nm, because the reflection factor on the second optical functional surface is not larger than 1.5%, the reflection can be prevented to the wavelength in these regions. Further, in the first optical functional surface, when the wavelength $\lambda$ is a wavelength in the range of $\lambda 1+15$ nm$<\lambda<\lambda 2$, the reflection factor shows the local maximal value larger than 1%, and in the second optical functional surface, when the wavelength $\lambda$ is a wavelength in the range of $\lambda 1+50$ nm$<\lambda<\lambda 2$, because the reflection factor shows the local maximal value larger than 1%, different from the conventional one, the number of layers of the antireflective film can be reduced without deteriorating the reflection prevention function to the light flux of wavelength $\lambda 1$ and the light flux of wavelength $\lambda 2$. Accordingly, the production cost can be reduced, and a change of spectral characteristic by penetration of the water between layers of the antireflective film can be suppressed.

Further, even when the optical element main body is made of plastic, it can be prevented that a crack is generated in the antireflective film by the stress of the antireflective film, or the adherence between the antireflective film and the optical element main body is lowered, that is, the environmental resistance can be increased.

According to the structure written in item 20, in the optical element written in item 19, the wavelength of the plurality of wavelengths includes the wavelength $\lambda 3$ (760 nm$\leq\lambda 3\leq$800 nm), and in the first optical functional surface, when the wavelength $\lambda$ is $\lambda 3\leq\lambda\leq\lambda 3+15$ nm, the reflection factor is not larger than 1%, and in the second optical functional surface, when the wavelength $\lambda$ is $\lambda 3\leq\lambda\leq\lambda 3+120$ nm, the reflection factor is not larger than 1.5%.

According to the structure written in item 20, when the wavelength $\lambda$ is $\lambda 3\leq\lambda\leq\lambda 3+15$ nm, the reflection factor on the first optical functional surface is not larger than 1%, and when the wavelength $\lambda$ is $\lambda 3\leq\lambda\leq\lambda 3+120$ nm, because the reflection factor on the second optical functional surface is not larger than 1.5%, the reflection can be prevented also for the wavelength in these regions.

The structure written in item 21 is an optical element which is provided in the optical pick-up device by which the recording and/or reproducing of the information is conducted, and which light converges light fluxes of a plurality of wavelengths including the wavelength $\lambda 1$ (390 nm$\leq\lambda 1\leq$430 nm) and the wavelength $\lambda 2$ (630 nm$\leq\lambda 2\leq$670 nm) on the information recording medium, and it is provided with one or more optical element main body and the antireflective film provided on the surface of the optical element main body, and the antireflective film is formed so that a value of ((the maximum film thickness in the effective diameter to the light flux of the wavelength $\lambda 1$)−(the minimum thickness in the effective diameter))/ average film thickness is larger than 5%, and the maximum incidence projection angle $\theta$max in the effective diameter and the maximum surface angle $\theta\perp$max in the effective diameter form at least one of the first optical functional surface in which $0°\leq\theta$max$\leq 40°$ and $40°\leq\theta\perp$max$\leq 90°$, or $40°\leq\theta$max$\leq 90°$ and $0°\leq\theta\perp$max$\leq 40°$, and at least one of the second optical functional surface in which $40°<\theta$max$<90°$ and $40°\leq\theta\perp$max$\leq 90°$, and in the first optical functional surface, when the wavelength $\lambda$ of the light flux incident perpendicularly is $\lambda 1\leq\lambda\leq 1+50$ nm, or when $\lambda 2\leq\lambda\leq\lambda 2+40$ nm, the reflection factor is not larger than 1%, and when the wavelength $\lambda$ is a wavelength in the range of $\lambda 1+50$ nm$<\lambda<\lambda 2$, the reflection factor shows the local maximal value larger than 1%, and in the second optical functional surface, when the wavelength $\lambda$ is $\lambda 1\leq\lambda\leq\lambda 2+130$ nm, the reflection factor is not larger than 1.5%.

According to the structure written in item 21, when the wavelength $\lambda$ of the light flux incident perpendicularly to the first optical functional surface is $\lambda 1\leq\lambda\leq\lambda 1+50$ nm, or when $\lambda 2\leq\lambda\leq\lambda 2+40$ nm, the reflection factor on the first optical functional surface is not larger than 1%, and when the wavelength $\lambda$ of the light flux incident perpendicularly to the second optical functional surface is $\lambda 1\leq\lambda\leq\lambda 2+130$ nm, because the reflection factor on the second optical functional surface is not larger than 1.5%, the reflection can be prevented to the wavelength in these regions. Further, in the first optical functional surface, when the wavelength $\lambda$ is a wavelength in the range of $\lambda 1+50$ nm$<\lambda<\lambda 2$, because the reflection factor shows the local maximal value larger than 1%, different from the conventional one, the number of layers of the antireflective film can be reduced without deteriorating the reflection prevention function to the light flux of wavelength $\lambda 1$ and the light flux of wavelength $\lambda 2$. Accordingly, the production cost can be reduced, and a change of spectral characteristic by penetration of the water between layers of the antireflective film can be suppressed.

Further, even when the optical element main body is made of plastic, it can be prevented that a crack is generated in the antireflective film by the stress of the antireflective film, or the adherence between the antireflective film and the optical element main body is lowered, that is, the environmental resistance can be increased.

According to the structure written in item 22, in the optical element written in item 21, the wavelength of the plurality of wavelengths includes the wavelength $\lambda 3$ (760 nm$\leq\lambda 3\leq$800 nm), and in the first optical functional surface, when the wavelength $\lambda$ is $\lambda 3\leq\lambda\leq\lambda 3+30$ nm, the reflection factor is not larger than 1%, and in the second optical functional surface, when the wavelength $\lambda$ is $\lambda1 \leq \lambda \leq \lambda3+120$ nm, the reflection factor is not larger than 1.5%.

According to the structure written in item 22, when the wavelength $\lambda$ is $\lambda3 \leq \lambda \leq \lambda3+30$ nm, the reflection factor on the first optical functional surface is not larger than 1%, and when the wavelength $\lambda$ is $\lambda1\ \lambda \leq \lambda3+120$ nm, because the reflection factor on the second optical functional surface is not larger than 1.5%, the reflection can be prevented also for the wavelength in these regions.

The structure written in item 23 is an optical element which is provided in the optical pick-up device by which the recording and/or reproducing of the information is conducted, and which light converges light fluxes of a plurality of wavelengths including the wavelength $\lambda1$ (390 nm$\leq \lambda1 \leq$430 nm) and the wavelength $\lambda2$ (630 nm$\leq \lambda2 \leq$670 nm) on the information recording medium, and it is provided with an optical element main body and the antireflective film provided on the both surfaces of the optical element main body, and which formed the first optical functional surface on the laser light source side of the optical pick-up device and the second optical functional surface on the information recording medium side, and in the first optical functional surface, when the wavelength $\lambda$ is $\lambda1 \leq \lambda \leq \lambda2+40$ nm, the reflection factor is not larger than 1%, and in the second optical functional surface, when the wavelength $\lambda$ is $\lambda1 \leq \lambda \leq \lambda1+50$ nm, or when $\lambda2 \leq \lambda \leq \lambda2+40$ nm, the reflection factor is not larger than 1%, and when the wavelength $\lambda$ is a wavelength in the range of $\lambda1+50$ nm$<\lambda<\lambda2$, the reflection factor shows the local maximal value larger than 1%.

Herein, the laser light source side, and the information recording medium side mean the laser light source side and the information recording medium side in the light path of the using light flux.

According to the structure written in item 23, when the wavelength $\lambda$ of the light flux incident perpendicularly to the first optical functional surface is $\lambda1 \leq \lambda \leq \lambda2+40$ nm, the reflection factor on the first optical functional surface is not larger than 1%, and when the wavelength $\lambda$ of the light flux incident perpendicularly to the second optical functional surface is $\lambda1 \leq \lambda \leq \lambda1+50$ nm, or when $\lambda2 \leq \lambda \leq \lambda2+40$ nm, because the reflection factor on the second optical functional surface is not larger than 1%, the reflection can be prevented for the wavelength in these zones. Further, when the wavelength is a wavelength in the range of $\lambda1+50$ nm$\leq \lambda \leq \lambda2$, the reflection factor on the second optical functional surface shows the local maximal value larger than 1%, that is, because the reflection prevention function is lowered, different from the conventional antireflective film to prevent the reflection for the whole light fluxes in the broad wavelength region of the wavelength $\lambda1$-$\lambda2$, the number of layers of antireflective film can be reduced without deteriorating the reflection prevention function for the light flux of wavelength $\lambda1$ and the light flux of wavelength $\lambda2$. Accordingly, the production cost can be reduced, and a change of spectral characteristic by the penetrating of the water between layers of the antireflective film can be suppressed.

Further, even when the optical element main body is made of plastic, it can be prevented that a crack is generated in the antireflective film by the stress of the antireflective film, or the adherence between the antireflective film and the optical element main body is lowered, that is, the environmental resistance can be increased.

According to the structure written in item 24, in the optical element written in item 23, the wavelength of the plurality of wavelengths includes the wavelength $\lambda3$ (760 nm$\leq \lambda3 \leq$800 nm), and in the first optical functional surface, when the wavelength $\lambda$ is $\lambda3 \leq \lambda \leq \lambda3+30$ nm, the reflection factor is not larger than 1%, and in the second optical functional surface, when the wavelength $\lambda$ is $\lambda2 \leq \lambda \leq \lambda3+30$ nm, the reflection factor is not larger than 1%.

According to the structure written in item 24, when the wavelength $\lambda$ is $\lambda3 \leq \lambda \leq \lambda3+30$ nm, the reflection factor on the first optical functional surface is not larger than 1%, and when the wavelength $\lambda$ is $\lambda2 \leq \lambda \leq \lambda3+30$ nm, because the reflection factor on the second optical functional surface is not larger than 1%, the reflection can be prevented also for the wavelength in these regions.

The structure written in item 25 is an optical element which is provided in the optical pick-up device by which the recording and/or reproducing of the information is conducted, and which light converges light fluxes of a plurality of wavelengths including the wavelength $\lambda1$ (390 nm$\leq \lambda1 \leq$430 nm) and the wavelength $\lambda2$ (630 nm$\leq \lambda2 \leq$670 nm) on the information recording medium, and it is provided with the first optical element main body arranged on the laser light source side of the optical pick-up device and the second optical element main body arranged on the information recording medium side, and the antireflective film which is provided on the both surfaces of the first optical element main body, and which forms the first optical functional surface on the laser light source side and the second optical functional surface on the information recording medium side, and is provided on both surfaces of the second optical element main body, and the antireflective film which forms the third optical functional surface on the laser light source side and the fourth optical functional surface on the information recording medium side, and in the first optical functional surface and the second optical functional surface, when the wavelength $\lambda$ of the light flux incident perpendicularly is $\lambda=\lambda1$, or $\lambda=\lambda2$, the reflection factor is not larger than 1%, and when the wavelength $\lambda$ is a wavelength in the range of $\lambda1<\lambda<\lambda2$, the reflection factor shows the local maximal value larger than 1%, and in the third optical functional surface, when the wavelength $\lambda$ is $\lambda1 \leq \lambda \leq \lambda2+40$ nm, the reflection factor is not larger than 1%, and in the fourth function surface, when the wavelength $\lambda$ is $\lambda1 \leq \lambda \leq \lambda1+50$ nm, and when $\lambda2 \leq \lambda \leq \lambda2+40$ nm, the reflection factor is not larger than 1%, and when the wavelength $\lambda$ is a wavelength in the range of $\lambda1+50$ nm$<\lambda<\lambda2$, the reflection factor shows the local maximal value larger than 1%.

According to the structure written in item 25, when the wavelength $\lambda$ of the light flux incident perpendicularly is $\lambda=\lambda1$, and $\lambda=\lambda2$, the reflection factor on the first and second optical functional surfaces is not larger than 1%, and when the wavelength $\lambda$ is $\lambda1 \leq \lambda \leq \lambda2+40$ nm, because the reflection factor on the third optical functional surface is not larger than 1%, and when the wavelength $\lambda$ is $\lambda1 \leq \lambda \leq \lambda1+50$ nm or when $\lambda2 \leq \lambda \leq \lambda2+40$ nm, the reflection factor on the fourth optical functional surface is not larger than 1%, the reflection can be prevented for the wavelength in these regions. Further, when the wavelength is a wavelength in the range of $\lambda1<\lambda<\lambda2$, the reflection factor on the first and second optical functional surfaces shows the local maximal value larger than 1%, and when the wavelength is a wavelength in the range of $\lambda1+50$ nm$<\lambda<\lambda2$, the reflection factor on the fourth optical functional surface shows the local maximal value larger than 1%, that is, because the reflection prevention function is lowered, different from the conventional antireflective film to prevent the reflection for the whole light fluxes in the broad wavelength region of the wavelength $\lambda1$-$\lambda2$, the number of layers of antireflective film can be reduced without deteriorating the reflection prevention function for the light flux of wavelength λ1 and the light flux of wavelength λ2. Accordingly, the production cost can be reduced, and a change of spectral characteristic by the penetrating of the water between layers of the antireflective film can be suppressed.

Further, even when the optical element main body is made of plastic, it can be prevented that a crack is generated in the antireflective film by the stress of the antireflective film, or the adherence between the antireflective film and the optical element main body is lowered, that is, the environmental resistance can be increased.

According to the structure written in item 26, in the optical element written in item 25, the plurality of wavelengths include the wavelength λ3 (760 nm≦λ3≦800 nm), and in the first and second optical functional surfaces, when the wavelength λ is λ=λ3, the reflection factor is not larger than 1%, and in the third optical functional surface, when the wavelength λ is λ1≦λ≦λ3+30 nm, the reflection factor is not larger than 1%, and in the fourth optical functional surface, when the wavelength λ is λ2≦λ≦λ3+30 nm, the reflection factor is not larger than 1%.

According to the structure written in item 26, because, when the wavelength λ is λ=λ3, the reflection factor on the first and second optical functional surfaces is not larger than 1%, and when the wavelength λ is λ1≦λ≦λ3+30 nm, the reflection factor on the third optical functional surface is not larger than 1%, and when the wavelength λ is λ2≦λ≦λ3+30 nm, the reflection factor on the fourth optical functional surface is not larger than 1%, the reflection can be prevented also for the wavelength in these regions.

The structure written in item 27 is, in the optical element written in any one of items 1-26, an objective lens whose numerical aperture is not smaller than 0.65.

According to the structure written in item 27, because it is an objective lens whose numerical aperture is not smaller than 0.65, the recording and/or reproducing can be conducted by using AOD as the information recording medium.

According to the structure written in item 28, in the optical element written in any one of items 1-27, the antireflective film is formed of at least 2 kinds of materials in a low refractive index material whose refractive index n to the light flux of wavelength 500 nm is 1.3≦n≦1.55, and a high refractive index material whose refractive index n to the light flux of wavelength 500 nm is 1.7≦n≦2.5.

According to the structure written in item 28, the same effect as in the structure written in any one of items 1-27, can be obtained.

According to the structure written in item 29, in the optical element written in item 28, the low refractive index material is a material whose main component is $MgF_2$ or $SiO_2$, and the high refractive index material is a material whose main component is $TiO_2$, $Ta_2O_5$, $CeO_2$, $ZrO_2$, $HfO_2$ or $CeF_3$.

According to the structure written in item 29, the same effect as in the structure written in item 28, can be obtained.

According to the structure written in item 30, in the optical element written in any one of items 1-27, the antireflective film is formed of at least 3 kinds of materials in a low refractive index material whose refractive index n to the light flux of wavelength 500 nm is 1.3≦n<1.55, a middle refractive index material whose refractive index n to the light flux of wavelength 500 nm is 1.55≦n<1.7, and a high refractive index material whose refractive index n to the light flux of wavelength 500 nm is 1.7≦n<2.5.

According to the structure written in item 30, the same effect as in the structure written in any one of items 1-27, can be obtained.

According to the structure written in item 31, in the optical element written in item 30, the low refractive index material is a material whose main component is $MgF_2$ or $SiO_2$, the middle refractive index material is a material whose main component is $Al_2O_3$, and the high refractive index material is a material whose main component is $TiO_2$, $Ta_2O_5$, $CeO_2$, $ZrO_2$, $HfO_2$ or $CeF_3$.

According to the structure written in item 31, the same effect as in the structure written in item 30 can be obtained.

According to the structure written in item 32, in the optical element written in any one of items 1-31, the optical element main body is formed of plastic.

Herein, as the plastic, an optical plastic such as poly carbonate resin or poly methyl methacrylate resin, norbornen resin, alicyclic olefin resin, can be used. Hereupon, as the norbornen resin, it is preferable that poly olefin compound is used.

According to the structure written in item 32, the same effect as in the structure written in any one of items 1-31, can be obtained.

According to the structure written in item 33, in the optical element written in any one of items 1-31, the optical element main body is formed of glass.

Herein, as the glass, nitric material for a low melt point glass mold can be used, and specifically, M-BaCD5 (trade name, made by HOYA) can be used.

According to the structure written in item 33, the same effect as in the structure written in any one of items 1-31, can be obtained.

According to the structure written in item 34, in the optical system written in any one of items 1-33, a primary coat exists between the optical element main body and the antireflective film, and the refractive index $n_0'$ of the primary coat is, when the refractive index of the optical element main body is $n_0$, $|n_0'-n_0|≦0.1$.

According to the structure written in item 34, because the primary coat exists between the optical element main body and the antireflective film, the adherence of the antireflective film to the optical element main body can be increased.

Further, because the refractive index $n_0'$ of the primary coat satisfies, to the refractive index $n_0$ of the optical element main body, $|n_0'-n_0|≦0.1$, the deterioration of the optical function by providing the primary coat, can be prevented.

The structure written in item 35 is an optical pick-up device and which is provided with the optical element written in any one of items 1-34 and the laser light source, and when the light flux projected from the laser light source is light converged on the optical recording medium by the optical element, at least one of the recording of the information in this optical recording medium and the reproducing of the information recorded in the optical recording medium, can be conducted.

According to the structure written in item 35, the same effect as in the structure written in any one of item 1-34, can be obtained.

Referring to the drawings, embodiments of the present invention will be described below.

The First Embodiment

Initially, an embodiment of the optical pick-up device according to the present invention will be described. FIG. 1 is an outline structural view of an optical pick-up device 1 in the first embodiment. As shown in this view, the optical pick-up device 1 has the first light source 2a and second light source 2b, which project the laser light.

The first light source 2a projects the first light flux of wavelength λ1, and the wavelength λ1 is 380 nm≦λ1≦450 nm, and in the present embodiment, λ1=405 nm. This wavelength λ1 is the using wavelength to AOD (information recording medium) 100. Hereupon, the thickness t1 of a protective substrate 101 of AOD 100 is 0.5 mm≦t1≦0.7 mm.

The second light source 2b projects the second light flux of wavelength λ2, and the wavelength λ2 is 640 nm≦λ1≦680 nm, and in the present embodiment, λ2=650 nm. This wavelength λ2 is the using wavelength to DVD (information recording medium) 200. Hereupon, the thickness t1 of a protective substrate 201 of DVD 200 is 0.5 mm≦t1≦0.7 mm.

Each of light fluxes projected from these first light source 2a and second light source 2b is light converged on AOD 100 and DVD 200 by a light converging optical system 3. The light converging optical system 3 has the first and second collimator lenses 30a and 30b, the first-third beam splitters 31a-31c, and an objective lens (optical element) 5. The first and second collimator lenses 30a and 30b make the light fluxes projected from the first and second light sources 2a and 2b, the parallel light.

The beam splitter 31a makes the first light flux projected from the first light source 2a transmit toward the direction of the objective lens 5, and introduces the reflected light from AOD 100, that is, the returning light to the first detector 4a.

A sensor lens group 33a is arranged between the beam splitter 31a and the first light detector 4a.

The beam splitter 31b makes the second light flux projected from the second light source 2b transmit toward the direction of the beam splitter 31c, and introduces the reflected light from DVD 200 to the second light detector 4b. A sensor lens group 33b is arranged between the beam splitter 31b and the second light detector 4b.

The beam splitter 31c puts the first light flux from the first light source 2a and the second light flux from the second light source 2b on the same light path.

Figure 2:
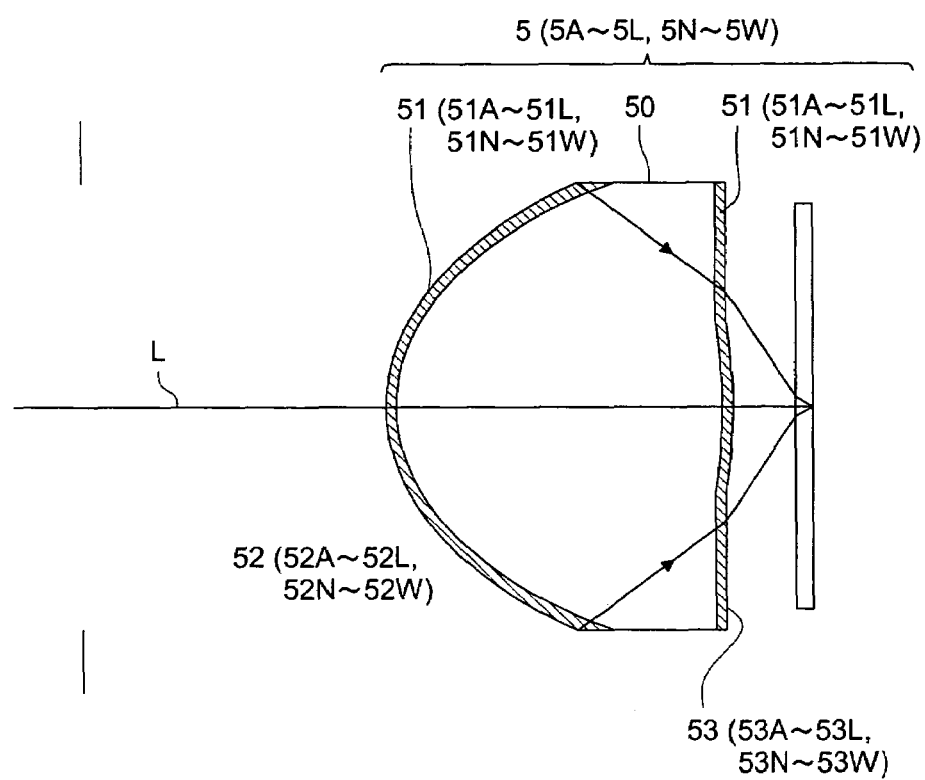
FIG. 2 is a longitudinal sectional view showing an objective lens according to an embodiment of the present invention.

The objective lens 5 is, as shown in FIG. 2, provided with a lens main body (optical element main body) 50 and a antireflective film 51, and mounted on the second dimensional actuator (not shown) which can move in a predetermined direction. The numerical aperture NA of the objective lens 5 is 0.65, and the maximum incidence projection angle θmax of the light flux of the wavelength λ1 on optical functional surfaces 52 and 53, is 0°≦θmax≦40°.

The lens main body 50 is formed of plastic or glass, and the refractive index $n_0$ is 1.45≦$n_0$≦1.65. Herein, as the plastic used for the lens main body 50, the optical plastic such as poly carbonate resin, poly methyl methacrylate resin, norbornen resin, or alicyclic olefin resin, can be used. Hereupon, as the norbornen resin, it is preferable that poly olefin compound is used. Further, as the glass used for the lens main body 50, a nitric material for a low melt point glass mold can be used, and specifically, M-BaCD5 (trade name, made by HOYA) can be used.

The antireflective film 51 is provided on at least one surface of a lens main body 50, in the present embodiment, on both surfaces, and forms optical functional surfaces 52 and 53. The reflection factor of the light flux incident perpendicularly to the optical functional surfaces 52 and 53, shows the local maximal value not smaller than 1% between the wavelength λ1 and wavelength λ2, and becomes relatively low at the wavelength λ1 and the wavelength λ2. Accordingly, for the first light flux and the second light flux, it is in the situation that the reflection on the optical functional surfaces 52, 53, is prevented.

This antireflective film 51 is structured of layers not smaller than 2 and not larger than 30 from at least 2 kinds of materials in the low refractive index material in which the refractive index n to the light flux of wavelength 500 nm, is 1.3≦n≦1.55, and the high refractive index material in which it is 1.7≦n≦2.5. Herein, as the low refractive index material, a material whose main component is $MgF_2$ or $SiO_2$, can be used. Further, as the high refractive index material, a material whose main component is $TiO_2$, $Ta_2O_5$, $CeO_2$, $ZrO_2$, $HfO_2$ or $CeF_3$ can be used. Further, for the formation of antireflective film 51, a method such as evaporation, spattering, CVD, or coating is used.

Further, when the layers included in the antireflective film 51 are defined in the order from the side close to the lens main body 50, as the first layer, second layer, . . . n-th layer, the refractive index n1 of the first layer and optical film thickness $nd_1$, and the refractive index $n_2$ of the second layer and optical film thickness $nd_2$, are $$1.7 \leq n_1 \leq 2.5,\ 225\ nm \leq nd_1, \leq 275\ nm,$$

$$1.3 \leq n_2 \leq 1.55,\ 100\ nm \leq nd_2 \leq 150\ nm.$$

Hereupon, it is preferable to make the primary coat (not shown) stand between the lens main body 50 and the antireflective film 51. In this case, the adherence of the antireflective film 51 to the lens main body 50 can be increased. Further, it is preferable that the refractive index $n_0'$ of this primary coat is, to the refractive index $n_0$ of the lens main body 50, $|n_0'-n_0| \leq 0.1$. In this case, it becomes a situation that the deterioration of the optical function by providing the primary coat is prevented.

Because the operation of the optical pick-up device 1 structured as described above, is well known, the detailed description is neglected, and after the first light flux projected from the first light source 2a passes the first beam splitter 31a, it is made parallel light in the first collimator lens 30a, and passes the third beam splitter 31c.

Next, the first light flux is light converged on the information recording surface of AOD 100 by the objective lens 5, and forms a spot on the optical axis L. The first light flux which formed the spot, is modulated by the information pits on the information recording surface and reflected, and passes again the objective lens 5. Herein, because the reflection of the first light flux on the optical functional surfaces 52 and 53 is prevented by the antireflective film 51, the first light flux passes the objective lens 5 without lowering the light amount.

Next, the first light flux passes the third beam splitter 31c, first collimator lens 30a and is reflected by the first beam splitter 31a, and branched. Then, the branched first light flux is incident on the first light detector 4a via sensor lens group 33a. The first light detector 4a detects the spot of the incident light and outputs a signal, and the reading signal of the information recorded in AOD 100 is obtained by using the outputted signal.

Further, a shape change of the spot on the first light detector 4a, or a light amount change by the position change is detected, and the focusing detection or track detection is conducted. According to this detection result, the second dimensional actuator moves the objective lens 5 toward the focus direction and tracking direction so that the first light flux accurately form the spot on the information recording surface.

On the one hand, the second light flux projected from the second light source 2b is, after passing the second beam splitter 31b, made parallel light in the second collimator lens 30b, reflected by the third beam splitter 31c, and reaches the objective lens 5.

Next, the second light flux is light converged on the information recording surface of DVD 200 by the objective lens 5, and forms the spot on the optical axis L. The second light flux which formed the spot, is modulated by the information pits on the information recording surface and reflected, and passes again the objective lens 5. Herein, because the reflection of the second light flux on the optical functional surfaces 52, 53 is prevented by the antireflective film 51, the second light flux passes the objective lens 5 without lowering the light amount.

Next, the second light flux is reflected by the third beam splitter 31c, and branched. Then, the branched second light flux passes the second collimator lens 30b, reflected by the second beam splitter 31b and branched, and is incident on the second light detector 4b via sensor lens group 33a. Hereinafter, it is the same as in the case of the first light flux.

According to the optical pick-up device 1 as described above, different from the conventional antireflective film to prevent the reflection for the whole light fluxes in the broad wavelength region of wavelengths $\lambda 1$-$\lambda 2$, the number of layers of the antireflective film 51 can be reduced without deteriorating the reflection prevention function to the light flux of wavelength $\lambda 1$ and the light flux of wavelength $\lambda 2$. Accordingly, the production cost can be reduced, and a change of spectral characteristic by penetration of the water between layers of the antireflective film 51 can be suppressed.

Further, even when the optical element main body 50 is made of plastic, it can be prevented that a crack is generated in the antireflective film 51 by the stress of the antireflective film 51, or the adherence between the antireflective film 51 and the optical element main body 50 is lowered, that is, the environmental resistance can be increased.

Hereupon, in the above embodiment, description is made as the wavelength of the second light source is not smaller than 640 nm, and not larger than 680 nm, however, it may also be allowable that the wavelength is not smaller than 750 nm and not larger than 850 nm. In this case, as the information recording medium, CD can be used in place of DVD 200.

The Second Embodiment

Next, the second embodiment of the optical pick-up device according to the present invention will be described. Hereupon, the same component as in the above first embodiment is denoted by the same sign and the description will be neglected.

The optical pick-up device 1A in the present second embodiment is different from the above first optical pick-up device 1, and is provided with the objective lens 5A in place of the objective lens 5.

The objective lens 5A is, as shown in FIG. 2, provided with a lens main body 50 and the antireflective film 51A. The antireflective film 51A is provided on at least one surface of a lens main body 50, in the present embodiment, on both surfaces, and forms optical functional surfaces 52A, 53A. The reflection factor of the light flux incident perpendicularly to the optical functional surfaces 52A, 53A, shows the local maximal value not smaller than 1% between the wavelength $\lambda 1$ and wavelength $\lambda 2$, and becomes relatively low at the wavelength $\lambda 1$ and the wavelength $\lambda 2$. Accordingly, for the first light flux and the second light flux, it is in the situation that the reflection on the optical functional surfaces 52A, 53A is prevented.

This antireflective film 51A is formed of layers not smaller than 3 and not larger than 30 from at least 3 kinds of materials in the low refractive index material in which the refractive index n to the light flux of wavelength 500 nm, is $1.3 \leq n < 1.55$, the middle refractive index material in which it is $1.55 \leq n < 1.7$, and the high refractive index material in which it is $1.7 \leq n < 2.5$. Herein, as the low refractive index material, a material whose main component is $MgF_2$ or $SiO_2$, can be used. Further, as the middle refractive index material, a material whose main component is $Al_2O_3$, can be used. Further, as the high refractive index material, a material whose main component is $TiO_2$, $Ta_2O_5$, $CeO_2$, $ZrO_2$, $HfO_2$ or $CeF_3$ can be used.

Further, in layers included in the antireflective film 51A, the refractive index $n_1$ of the first layer and layer thickness $nd_1$, the refractive index $n_2$ of the second layer and layer thickness $nd_2$, and the refractive index $n_3$ of the third layer and layer thickness $nd_3$, are $1.7 \leq n_1 \leq 2.5$, 125 nm $\leq nd_1 \leq$ 175 nm, $1.55 \leq n_2 \leq 1.7$, 75 nm $\leq nd_2 \leq$ 125 nm, and $1.3 \leq n_3 \leq 1.55$, 100 nm $\leq nd_3 \leq$ 150 nm.

The operation of the optical pick-up device 1A as described above is the same as the operation of the optical pick-up device 1 in the above first embodiment. Also by this optical pick-up device 1A, the same effect as in the above first embodiment can be obtained.

The Third Embodiment

Next, the third embodiment of the optical pick-up device according to the present invention will be described. Hereupon, the same component as in the above first embodiment is denoted by the same sign and the description will be neglected.

Figure 3:
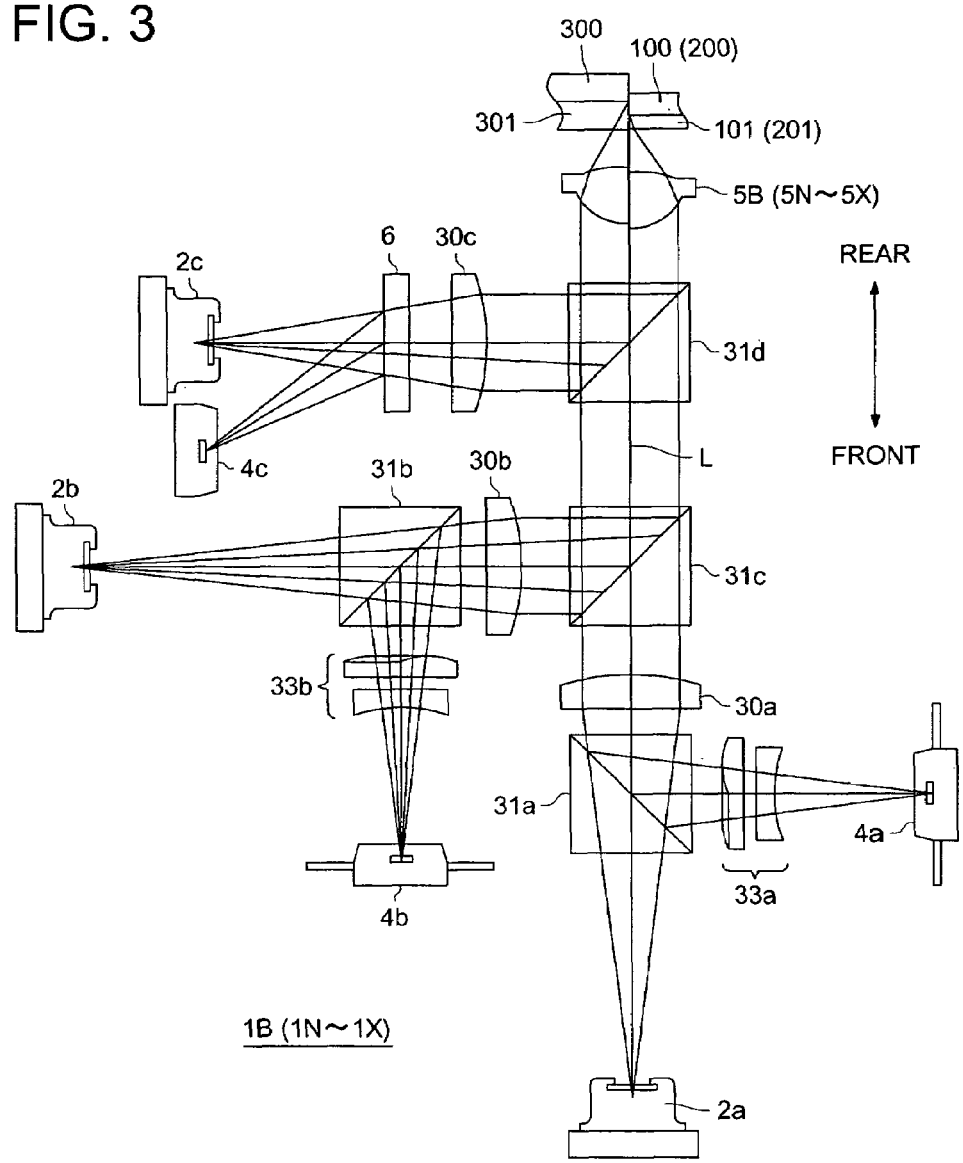
FIG. 3 is a view showing an outline structure of another embodiment of the optical pick-up device according to an embodiment of the present invention.

FIG. 3 is an outline structural view of an optical pick-up device 1B in the third embodiment. As shown in this view, the optical pick-up device 1B is, different from the optical pick-up device 1 in the above first embodiment, further provided with the third light source 2c, collimator lens 30c, beam splitter 31d, and diffraction plate 6, and an objective lens 5B in place of the objective lens 5.

The third light source 2c projects the third light flux of wavelength $\lambda 3$, and the wavelength $\lambda 3$ is 750 nm $\leq \lambda 3 \leq$ 850 nm, and in the present embodiment, $\lambda 3$=780 nm. This wavelength $\lambda 3$ is the using wavelength for CD (the third optical information recording medium) 300. Hereupon, the thickness t3 of a protective substrate 301 of CD 300 is 1.1 mm $\leq t3 \leq$ 1.3 mm.

The third collimator lens 30c makes the light flux projected from the third light source 2c the parallel light. The beam splitter 31d puts the third light flux from the third light source 2c, and the first light flux and the second light flux which transmit the beam splitter 31c, on the same light path. The diffraction plate 6 to guide the reflected light from CD 300 to the third light detector 4c is arranged between the beam splitter 31d and the third light source 2c.

The objective lens 5B is, as shown in FIG. 2, provided with a lens main body (optical element main body) 50B and the antireflective film 51B having the reflection prevention function for the first light flux, second light flux, and third light flux.

The antireflective film 51B is provided on at least one surface of a lens main body 50B, in the present embodiment, on both surfaces, and forms optical functional surfaces 52B, 53B. The reflection factor of the light flux incident perpendicularly to the optical functional surfaces 52B, 53B, shows the local maximal value not smaller than 1% between the wavelength λ1 and wavelength λ2, and becomes relatively low at the wavelength λ1 and the wavelength λ2. Accordingly, for the first light flux and the second light flux, it is in the situation that the reflection on the optical functional surfaces 52B and 53B is prevented.

This antireflective film 51B is formed of layers not smaller than 4 and not larger than 30 from at least 2 kinds of materials in the low refractive index material in which the refractive index n to the light flux of wavelength 500 nm, is $1.3 \leq n \leq 1.55$, and the high refractive index material in which it is $1.7 \leq n \leq 2.5$.

Further, in layers included in the antireflective film 51B, the refractive index $n_1$ of the first layer and optical film thickness $nd_1$, the refractive index $n_2$ of the second layer and optical film thickness $nd_2$, the refractive index $n_3$ of the third layer and optical film thickness $nd_3$, and the refractive index $n_4$ of the fourth layer and optical film thickness $nd_4$, are $1.7 \leq n_1 \leq 2.5$, 25 nm $\leq nd_1 \leq$ 75 nm, $1.3 \leq n_2 \leq 1.55$, 25 nm $\leq nd_2 \leq$ 75 nm, $1.7 \leq n_3 \leq 2.5$, 225 nm $\leq nd_3 \leq$ 275 nm and $1.3 \leq n_4 \leq 1.55$, 135 nm $\leq nd_4 \leq$ 185 nm.

In the operation of the optical pick-up device 1B structured as described above, as to the recording and/or reproducing using AOD 100 and DVD 200, it is the same as the operation of the optical pick-up device 1 in the above first embodiment.

Further, in the operation of the optical pick-up device 1B, in the recording and/or reproducing using CD 300, the third light flux projected from the third light source 2c, after passing the diffraction plate 6, is made parallel light in the third collimator lens 30c, reflected by the fourth beam splitter 31d, and reaches the objective lens 5.

Next, the third light flux is light converged on the information recording surface of CD 300 by the objective lens 5, and forms the spot on the optical axis L. The third light flux which formed the spot, is modulated by the information pits on the information recording surface and reflected, and passes again the objective lens 5. Herein, because the reflection of the second light flux on the optical functional surfaces 52 and 53 is prevented by the antireflective film 51, the third light flux passes the objective lens 5 without lowering the light amount.

Next, the third light flux is reflected by the fourth beam splitter 31d, and branched. Then, the branched third light flux passes the third collimator lens 30c, when passing the diffraction plate 6, the track is changed, and is incident on the third light detector 4c. Hereinafter, it is the same as in the case of the first light flux.

According to the optical pick-up device 1B as described above, different from the conventional antireflective film to prevent the reflection for the whole light fluxes in the broad wavelength region of wavelengths λ1-λ3, the number of layers of the antireflective film 51B can be reduced without deteriorating the reflection prevention function for the first light flux, second light flux, and third light flux. Accordingly, the production cost can be reduced, and a change of spectral characteristic by penetration of the water between layers of the antireflective film 51B can be suppressed.

Further, even when the lens main body 50 is made of plastic, it can be prevented that a crack is generated in the antireflective film 51B by the stress of the antireflective film 51B, or the adherence between the antireflective film 51B and the lens main body 50 is lowered, that is, the environmental resistance can be increased.

The Fourth Embodiment

The optical pick-up device 1C in the present fourth embodiment is, different from the above first optical pick-up device 1, provided with an objective lens 5C in place of the objective lens 5.

The objective lens 5C is, as shown in FIG. 2, provided with a lens main body 50 and an antireflective film 51C.

The antireflective film 51C is provided on at least one surface of the lens main body 50, in the present embodiment, both surfaces, and forms the optical functional surfaces 52C, 53C. In more detail, the antireflective film 51C is formed so that a value of ((the maximum film thickness in the effective diameter to the first light flux)−(the minimum film thickness in this effective diameter))/average film thickness is not larger than 5%. That is, the film thickness of the antireflective film 5C is almost uniform.

In the optical functional surfaces 52C, 53C, the maximum incidence projection angle θmax is $0° \leq \theta max \leq 40°$. Further, in the optical functional surfaces 52C and 53C, when the wavelength λ of the light flux incident perpendicularly is $\lambda1 \leq \lambda \leq \lambda1+15$ nm, or when it is $\lambda2 \leq \lambda \leq \lambda2+15$ nm, the reflection factor is suppressed to not larger than 1%. Further, in the optical functional surfaces 52C and 53C, when the above wavelength λ is a wavelength in the range of λ1+15 nm $<\lambda<\lambda2$, the reflection factor shows the local maximal value larger than 1%.

The operation of the optical pick-up device 1C described above is the same as the operation of the optical pick-up device 1 in the above first embodiment.

According to this optical pick-up device 1C, when the wavelength λ of the light flux incident perpendicularly to the optical functional surfaces 52C and 53C is $\lambda1 \leq \lambda \leq \lambda1+15$ nm, or when it is $\lambda2 \leq \lambda \leq \lambda2+15$ nm, because the reflection factor in the optical functional surfaces 52C, 53C is not larger than 1%, the reflection can be prevented for the wavelength in these zones. Further, when the wavelength λ is a wavelength in the range of λ1+15 nm$<\lambda<\lambda2$, the reflection factor shows the local maximal value larger than 1%, that is, because the reflection prevention function is lowered, different from the conventional antireflective film to prevent the reflection for the whole light fluxes in the broad wavelength region of the wavelength λ1-λ2, the number of layers of the antireflective film 51C can be reduced, without deteriorating the reflection prevention function for the first light flux and the second light flux. Accordingly, the production cost can be reduced, and a change of spectral characteristic by penetration of the water between layers of the antireflective film 51C can be suppressed.

Further, even when the lens main body 50 is made of plastic, it can be prevented that a crack is generated in the antireflective film 51C by the stress of the antireflective film 51C, or the adherence between the antireflective film 51C and the lens main body 50 is lowered, that is, the environmental resistance can be increased.

The Fifth Embodiment

The optical pick-up device 1D in the present fifth embodiment is, different from the above first optical pick-up device 1, provided with an objective lens 5D in place of the objective lens 5.

The objective lens 5D is, as shown in FIG. 2, provided with a lens main body 50 and a antireflective film 51D.

The antireflective film 51D is provided on at least one surface of the lens main body 50, in the present embodiment, on both surfaces, and forms the optical functional surfaces 52D, 53D. In more detail, the antireflective film 51D is formed so that a value of ((the maximum film thickness in the effective diameter to the first light flux)−(the minimum film thickness in this effective diameter))/average film thickness is not larger than 5%. That is, the film thickness of the antireflective film 5D is almost uniform.

In the optical functional surfaces 52D, 53D, the maximum incidence projection angle θmax in the effective diameter is 40°<θmax<90°. Further, in the optical functional surfaces 52D and 53D, when the wavelength λ of the light flux incident perpendicularly is $\lambda 1 \leq \lambda \leq \lambda 1+50$ nm, or when it is $\lambda 2 \leq \lambda \leq \lambda 2+40$ nm, the reflection factor is suppressed to not larger than 1%. Further, in the optical functional surfaces 52D and 53D, when the above wavelength λ is a wavelength in the range of $\lambda 1+50$ nm$<\lambda<\lambda 2$, the reflection factor shows the local maximal value larger than 1%.

The operation of the optical pick-up device 1D described above is the same as in the optical pick-up device 1 in the above first embodiment.

According to this optical pick-up device 1D, when the wavelength λ of the light flux incident perpendicularly to the optical functional surfaces 52D and 53D is $\lambda 1 \leq \lambda \leq \lambda 1+50$ nm, or when it is $\lambda 2 \leq \lambda \leq \lambda 2+40$ nm, because the reflection factor in the optical functional surfaces 52D, 53D is not larger than 1%, the reflection can be prevented for the wavelength in these regions. Further, when the wavelength λ is a wavelength in the range of $\lambda 1+50$ nm$<\lambda<\lambda 2$, the reflection factor shows the local maximal value larger than 1%, that is, the reflection prevention function is lowered. Therein, the number of layers of the antireflective film 51D can be reduced, without deteriorating the reflection prevention function for the first light flux and the second light flux against the conventional antireflective film to prevent the reflection for the whole light fluxes in the broad wavelength region of the wavelength $\lambda 1$-$\lambda 2$. Accordingly, the production cost can be reduced, and a change of spectral characteristic by penetration of the water between layers of the antireflective film 51D can be suppressed.

Further, even when the lens main body 50 is made of plastic, it can be prevented that a crack is generated in the antireflective film 51D by the stress of the antireflective film 51D, or the adherence between the antireflective film 51D and the lens main body 50 is lowered, that is, the environmental resistance can be increased.

The Sixth Embodiment

The optical pick-up device 1E in the present sixth embodiment is, different from the above first optical pick-up device 1, provided with an objective lens 5E in place of the objective lens 5.

The objective lens 5E is, as shown in FIG. 2, provided with a lens main body 50 and a antireflective film 51E.

The antireflective film 51E is provided on at least one surface of the lens main body 50, in the present embodiment, on both surfaces, and forms the optical functional surfaces 52E, 53E. In more detail, the antireflective film 51E is formed so that a value of ((the maximum film thickness in the effective diameter to the first light flux)−(the minimum film thickness in this effective diameter))/average film thickness is not larger than 5%. That is, the film thickness of the antireflective film 5E is almost uniform. In the optical functional surface 52E, the maximum incidence projection angle θmax in the effective diameter is 40°<θmax<90°. Further, in the optical functional surface 52E, when the wavelength λ of the light flux incident perpendicularly is $\lambda 1 \leq \lambda \leq \lambda 1+50$ nm, or when it is $\lambda 2 \leq \lambda \leq \lambda 2+40$ nm, the reflection factor is suppressed to not larger than 1%. Further, in the optical functional surfaces 52E, when the above wavelength λ is a wavelength in the range of $\lambda 1+50$ nm$<\lambda<\lambda 2$, the reflection factor shows the local maximal value larger than 1%.

In the optical functional surface 53E, the maximum incidence projection angle θmax in the effective diameter is 0°<θmax<40°. Further, in the optical functional surface 53E, when the wavelength λ of the light flux incident perpendicularly is $\lambda 1 \leq \lambda \leq \lambda 1+15$ nm, or when it is $\lambda 2 \leq \lambda \leq \lambda 2+15$ nm, the reflection factor is suppressed to not larger than 1%. Further, in the optical functional surfaces 53E, when the above wavelength λ is a wavelength in the range of $\lambda 1+15$ nm$<\lambda<\lambda 2$, the reflection factor shows the local maximal value larger than 1%.

The operation of the optical pick-up device 1E described above is the same as the operation of the optical pick-up device 1 in the above first embodiment.

According to this optical pick-up device 1E, when the wavelength λ of the light flux incident perpendicularly to the optical functional surfaces 53E, is $\lambda 1 \leq \lambda \leq \lambda 1+15$ nm, or when it is $\lambda 2 \leq \lambda \leq \lambda 2+15$ nm, the reflection factor in the optical functional surface 53E is not larger than 1%, and when the wavelength λ of the light flux incident perpendicularly to the optical functional surface 52E, is $\lambda 1 \leq \lambda \leq \lambda 1+50$ nm, or when it is $\lambda 2 \leq \lambda \leq \lambda 2+40$ nm, because the reflection factor in the optical functional surface 52E is not larger than 1%, the reflection can be prevented for the wavelength in these regions. Further, in the optical functional surface 53E, when the wavelength λ is a wavelength in the range of $\lambda 1+15$ nm$<\lambda<\lambda 2$, the reflection factor shows the local maximal value larger than 1%, that is, the reflection prevention function is lowered. Therefore, the number of layers of the antireflective film 51E can be reduced, without deteriorating the reflection prevention function for the first light flux and the second light flux against the conventional antireflective film to prevent the reflection for the whole light fluxes in the broad wavelength region of the wavelength $\lambda 1$ -$\lambda 2$. Accordingly, the production cost can be reduced, and a change of the spectral characteristic by penetration of the water between layers of the antireflective film 51E can be suppressed.

Further, even when the lens main body 50 is made of plastic, it can be prevented that a crack is generated in the antireflective film 51E by the stress of the antireflective film 51E, or the adherence between the antireflective film 51E and the lens main body 50 is lowered, that is, the environmental resistance can be increased.

Hereupon, in the present embodiment, the optical functional surface 52E is described as the light incidence surface, and the optical functional surface 53E is described as the light projection surface, however, it may also be allowable that the optical functional surface 52E is the light projection surface, and the optical functional surface 53E is the light incidence surface.

The Seventh Embodiment

The optical pick-up device 1F in the present seventh embodiment is, different from the above first optical pick-up device 1, provided with an objective lens 5F in place of the objective lens 5.

The objective lens 5F is, as shown in FIG. 2, provided with a lens main body 50 and an antireflective film 51F.

The antireflective film 51F is provided on at least one surface of the lens main body 50, in the present embodiment, on both surfaces, and forms the optical functional surfaces 52F, 53F. In more detail, the antireflective film 51F is formed so that a value of ((the maximum film thickness in the effective diameter to the first light flux)−(the minimum film thickness in this effective diameter)))/average film thickness is larger than 5%. That is, the film thickness of the antireflective film 5F is un-uniform.

In the optical functional surfaces 52F, 53F, the maximum incidence projection angle $\theta$max in the effective diameter, and the maximum surface angle $\theta\perp$max are $0°\leq\theta$max$\leq 40°$ and $0°\leq\theta\perp$max$\leq 40°$. Further, in the optical functional surfaces 52F and 53F, when the wavelength $\lambda$ of the light flux incident perpendicularly is $\lambda 1\leq\lambda\leq\lambda 1+15$ nm, or when it is $\lambda 2\leq\lambda\leq\lambda 2+15$ nm, the reflection factor is suppressed to not larger than 1%. Further, in the optical functional surfaces 52F and 53F, when the above wavelength $\lambda$ is a wavelength in the range of $\lambda 1+15$ nm$<\lambda<\lambda 2$, the reflection factor shows the local maximal value larger than 1%.

The operation of the optical pick-up device 1F described above is the same as in the optical pick-up device 1 in the above first embodiment.

According to this optical pick-up device 1F, when the wavelength $\lambda$ of the light flux incident perpendicularly to the optical functional surfaces 52F and 53F, is $\lambda 1\leq\lambda\leq\lambda 1+15$ nm, or when it is $\lambda 2\leq\lambda\leq\lambda 2+15$ nm, because the reflection factor in the optical functional surfaces 52F and 53F is not larger than 1%, the reflection can be prevented for the wavelength in these zones. Further, when the wavelength $\lambda$ is a wavelength in the range of $\lambda 1+15$ nm$<\lambda<\lambda 2$, the reflection factor shows the local maximal value larger than 1%, that is, because the reflection prevention function is lowered, different from the conventional antireflective film to prevent the reflection for the whole light fluxes in the broad wavelength region of the wavelength $\lambda 1$-$\lambda 2$, the number of layers of the antireflective film 51F can be reduced, without deteriorating the reflection prevention function for the first light flux and the second light flux. Accordingly, the production cost can be reduced, and a change of the spectral characteristic by penetration of the water between layers of the antireflective film 51F can be suppressed.

Further, even when the lens main body 50 is made of plastic, it can be prevented that a crack is generated in the antireflective film 51F by the stress of the antireflective film 51F, or the adherence between the antireflective film 51F and the lens main body 50 is lowered, that is, the environmental resistance can be increased.

The Eighth Embodiment

The optical pick-up device 1G in the present eighth embodiment is, different from the above first optical pick-up device 1, provided with an objective lens 5G in place of the objective lens 5.

The objective lens 5G is, as shown in FIG. 2, provided with a lens main body 50 and a antireflective film 51G.

The antireflective film 51G is provided on at least one surface of the lens main body 50, in the present embodiment, on both surfaces, and forms the optical functional surfaces 52G, 53G. In more detail, the antireflective film 51G is formed so that a value of ((the maximum film thickness in the effective diameter to the first light flux)−(the minimum film thickness in this effective diameter))/average film thickness is larger than 5%. That is, the film thickness of the antireflective film 5G is un-uniform.

In the optical functional surfaces 52G and 53G, the maximum incidence projection angle $\theta$max in the effective diameter, and the maximum surface angle $\theta\perp$max in the effective diameter, are $0°\leq\theta$max$\leq 40°$ and $40°<\theta\perp$max$<90°$, or $40°<\theta$max$<90°$ and $0°\leq\theta\perp$max$\leq 40°$. Further, in the optical functional surfaces 52G and 53G, when the wavelength $\lambda$ of the light flux incident perpendicularly is $\lambda 1\leq\lambda\leq\lambda 1+50$ nm, or when it is $\lambda 2\leq\lambda\leq\lambda 2+40$ nm, the reflection factor is suppressed to not larger than 1%. Further, in the optical functional surfaces 52G and 53G, when the above wavelength $\lambda$ is a wavelength in the range of $\lambda 1+50$ nm$<\lambda<\lambda 2$, the reflection factor shows the local maximal value larger than 1%.

The operation of the optical pick-up device 1G described above is the same as in the optical pick-up device 1 in the above first embodiment.

According to this optical pick-up device 1G, when the wavelength $\lambda$ of the light flux incident perpendicularly to the optical functional surfaces 52G and 53G, is $\lambda 1\leq\lambda\leq\lambda 1+50$ nm, or when it is $\lambda 2\leq\lambda\leq\lambda 2+40$ nm, because the reflection factor in the optical functional surfaces 52G and 53G is not larger than 1%, the reflection can be prevented for the wavelength in these zones. Further, when the wavelength $\lambda$ is a wavelength in the range of $\lambda 1+50$ nm$<\lambda<\lambda 2$, the reflection factor shows the local maximal value larger than 1%, that is, the reflection prevention function is lowered. Therefore, the number of layers of the antireflective film 51G can be reduced, without deteriorating the reflection prevention function for the first light flux and the second light flux against the conventional antireflective film to prevent the reflection for the whole light fluxes in the broad wavelength region of the wavelength $\lambda 1$-$\lambda 2$. Accordingly, the production cost can be reduced, and a change of the spectral characteristic by penetration of the water between layers of the antireflective film 51G can be suppressed.

Further, even when the lens main body 50 is made of plastic, it can be prevented that a crack is generated in the antireflective film 51G by the stress of the antireflective film 51G, or the adherence between the antireflective film 51G and the lens main body 50 is lowered, that is, the environmental resistance can be increased.

The Ninth Embodiment

The optical pick-up device 1I in the present ninth embodiment is, different from the above first optical pick-up device 1, provided with an objective lens 5I in place of the objective lens 5.

The objective lens 5I is, as shown in FIG. 2, provided with a lens main body 50 and a antireflective film 51I.

The antireflective film 51I is provided on at least one surface of the lens main body 50, in the present embodiment, on both surfaces, and forms the optical functional surfaces 52I, 53I. In more detail, the antireflective film 51I is formed so that a value of ((the maximum film thickness in the effective diameter to the first light flux)−(the minimum film thickness in this effective diameter))/average film thickness is larger than 5%. That is, the film thickness of the antireflective film 5I is un-uniform.

In the optical functional surface 52I, the maximum incidence projection angle θmax in the effective diameter, and the maximum surface angle θ⊥max in the effective diameter, are 0°≦θmax≦40° and 40°<θ⊥max<90°, or 40°<θmax<90° and 0°≦θ⊥max≦40°. Further, in the optical functional surface 52I, when the wavelength λ of the light flux incident perpendicularly is $\lambda 1 \leq \lambda \leq \lambda 1+50$ nm, or when it is $\lambda 2 \leq \lambda \leq \lambda 2+40$ nm, the reflection factor is suppressed to not larger than 1%. Further, in the optical functional surface 52I, when the above wavelength λ is a wavelength in the range of $\lambda 1+50$ nm$<\lambda<\lambda 2$, the reflection factor shows the local maximal value larger than 1%.

In the optical functional surface 53I, the maximum incidence projection angle θmax in the effective diameter, and the maximum surface angle θ⊥max in the effective diameter, are 0°≦θmax≦40° and 0°≦θ⊥max≦40°. Further, in the optical functional surface 53I, when the wavelength λ of the light flux incident perpendicularly is $\lambda 1 \leq \lambda \leq \lambda 1+15$ nm, or when it is $\lambda 2 \leq \lambda \leq \lambda 2+15$ nm, the reflection factor is suppressed to not larger than 1%. Further, in the optical functional surface 53I, when the above wavelength λ is a wavelength in the range of $\lambda 1+15$ nm$<\lambda<\lambda 2$, the reflection factor shows the local maximal value larger than 1%.

The operation of the optical pick-up device 1I described above is the same as in the optical pick-up device 1 in the above first embodiment.

According to this optical pick-up device 1I, when the wavelength λ of the light flux incident perpendicularly to the optical functional surface 53I, is $\lambda 1 \leq \lambda \leq \lambda 1+15$ nm, or when it is $\lambda 2 \leq \lambda \leq \lambda 2+15$ nm, because the reflection factor in the optical functional surface 53I is not larger than 1%, and when the wavelength λ of the light flux incident perpendicularly to the optical functional surface 53I, is $\lambda 1 \leq \lambda \leq \lambda 1+50$ nm or when it is $\lambda 2 \leq \lambda \leq \lambda 2+40$ nm, because the reflection factor in the optical functional surface 52I is not larger than 1%, the reflection can be prevented for the wavelength in these regions. Further, in the optical functional surface 53I, when the wavelength λ is a wavelength in the range of $\lambda 1+15$ nm$\leq\lambda<\lambda 2$, the reflection factor shows the local maximal value larger than 1%, and in the optical functional surface 52I, when the wavelength λ is a wavelength in the range of $\lambda 1+50$ nm$<\lambda<\lambda 2$, the reflection factor shows the local maximal value larger than 1%, that is, the reflection prevention function is lowered. Therefore, the number of layers of the antireflective film 51I can be reduced, without deteriorating the reflection prevention function for the first light flux and the second light flux against the conventional antireflective film to prevent the reflection for the whole light fluxes in the broad wavelength region of the wavelength λ1-λ2. Accordingly, the production cost can be reduced, and a change of the spectral characteristic by penetration of the water between layers of the antireflective film 51I can be suppressed.

Further, even when the lens main body 50 is made of plastic, it can be prevented that a crack is generated in the antireflective film 51I by the stress of the antireflective film 51I, or the adherence between the antireflective film 51I and the lens main body 50 is lowered, that is, the environmental resistance can be increased.

Hereupon, in the present embodiment, the optical functional surface 52I is described as the light incidence surface, and the optical functional surface 53I is described as the light projection surface, however, it may also be allowable that the optical functional surface 52I is the light projection surface, and the optical functional surface 53I is the light incidence surface.

The Tenth Embodiment

The optical pick-up device 1J in the present tenth embodiment is, different from the above first optical pick-up device 1, provided with an objective lens 5J in place of the objective lens 5.

The objective lens 5J is, as shown in FIG. 2, provided with a lens main body 50 and a antireflective film 51J.

The antireflective film 51J is provided on at least one surface of the lens main body 50, in the present embodiment, on both surfaces, and forms the optical functional surfaces 52J, 53J. In more detail, the antireflective film 51J is formed so that a value of ((the maximum film thickness in the effective diameter to the first light flux)−(the minimum film thickness in this effective diameter))/average film thickness is larger than 5%. That is, the film thickness of the antireflective film 5J is un-uniform. In the optical functional surface 52J, the maximum incidence projection angle. θmax in the effective diameter, and the maximum surface angle θ⊥max in the effective diameter, are 40°<θmax<90° and 40°<θ⊥max<90°. Further, in the optical functional surface 52J, when the wavelength λ of the light flux incident perpendicularly is $\lambda 1 \leq \lambda \leq \lambda 2+130$ nm, the reflection factor is suppressed to not larger than 1.5%. In the optical functional surface 53J, the maximum incidence projection angle θmax in the effective diameter, and the maximum surface angle θ⊥max in the effective diameter, are 0°θmax≦40° and 0°≦θ⊥max≦40°. Further, in the optical functional surface 53J, when the wavelength λ of the light flux incident perpendicularly is $\lambda 1 \leq \lambda \leq \lambda 1+15$ nm, or when it is $\lambda 2 \leq \lambda \leq \lambda 2+15$ nm, the reflection factor is suppressed to not larger than 1%. Further, in the optical functional surface 53J, when the wavelength λ is a wavelength in the range of $\lambda 1+15$ nm$<\lambda<\lambda 2$, the reflection factor shows the local maximal value larger than 1%.

In the optical functional surface 53J, the maximum incidence projection angle θmax in the effective diameter, and the maximum surface angle θ⊥max in the effective diameter, are 0°≦θmax≦40° and 0°≦θ⊥max≦40°. Further, in the optical functional surface 53J, when the wavelength λ of the light flux incident perpendicularly is $\lambda 1 \leq \lambda \leq \lambda 1+15$ nm, or when it is $\lambda 2 \leq \lambda \leq \lambda 2+15$ nm, the reflection factor is suppressed to not larger than 1%. Further, in the optical functional surface 53J, when the above wavelength λ is a wavelength in the range of $\lambda 1+15$ nm$\leq\lambda\leq\lambda 2$, the reflection factor shows the local maximal value larger than 1%.

The operation of the optical pick-up device 1J described above is the same as in the optical pick-up device 1 in the above first embodiment.

According to this optical pick-up device 1J, when the wavelength λ of the light flux incident perpendicularly to the optical functional surface 53J, is $\lambda 1 \leq \lambda \leq \lambda 1+15$ nm, or when it is $\lambda 2 \leq \lambda \leq \lambda 2+15$ nm, because the reflection factor in the optical functional surface 53J is not larger than 1%, and when the wavelength λ of the light flux incident perpendicularly to the optical functional surface 52K, is $\lambda 1 \leq \lambda \leq \lambda 2+130$ nm, because the reflection factor in the optical functional surface 52K is not larger than 1.5%, the reflection can be prevented for the wavelength in these regions. Further, in the optical functional surface 53K, when the wavelength λ is a wavelength in the range of $\lambda 1+15$ nm$<\lambda<\lambda 2$, because the reflection factor shows the local maximal value larger than 1%, different from the conventional one, the number of layers of the antireflective film 51K can be reduced, without deteriorating the reflection prevention function for the first light flux and the second light flux. Accordingly, the production cost can be reduced, and a change of the spectral characteristic by penetration of the water between layers of the antireflective film 51K can be suppressed.

Further, even when the lens main body 50 is made of plastic, it can be prevented that a crack is generated in the antireflective film 51K by the stress of the antireflective film 51J, or the adherence between the antireflective film 51K and the lens main body 50 is lowered, that is, the environmental resistance can be increased.

Hereupon, in the present embodiment, the optical functional surface 52J is described as the light incidence surface, and the optical functional surface 53J is described as the light projection surface, however, it may also be allowable that the optical functional surface 52J is the light projection surface, and the optical functional surface 53J is the light incidence surface.

The 11th Embodiment

The optical pick-up device 1K in the present 11th embodiment is, different from the above first optical pick-up device 1, provided with an objective lens 5K in place of the objective lens 5.

The objective lens 5K is, as shown in FIG. 2, provided with a lens main body 50 and a antireflective film 51K.

The antireflective film 51K is provided on at least one surface of the lens main body 50, in the present embodiment, on both surfaces, and forms the optical functional surfaces 52K, 53K. In more detail, the antireflective film 51K is formed so that a value of ((the maximum film thickness in the effective diameter to the first light flux)−(the minimum film thickness in this effective diameter))/average film thickness is larger than 5%. That is, the film thickness of the antireflective film 5K is un-uniform.

In the optical functional surface 52K, the maximum incidence projection angle θmax in the effective diameter, and the maximum surface angle θ⊥max in the effective diameter, are 40°<θmax<90° and 40°<θ⊥max<90°. Further, in the optical functional surface 52K, when the wavelength λ of the light flux incident perpendicularly is $\lambda1 \leq \lambda \leq \lambda2+130$ nm, the reflection factor is suppressed to not larger than 1.5%. In the optical functional surface 53K, the maximum incidence projection angle θmax in the effective diameter, and the maximum surface angle θ⊥max in the effective diameter, are $0° \leq \theta max \leq 40°$ and 40°<θ⊥max<90°, or 40°<θmax<90° and $0° \leq \theta\perp max \leq 40°$. Further, in the optical functional surface 53K, when the wavelength λ of the light-flux incident perpendicularly is $\lambda1 \leq \lambda \leq \lambda1+50$ nm, or when it is $\lambda2 \leq \lambda \leq \lambda2+40$ nm, the reflection factor is suppressed to not larger than 1%. Further, in the optical functional surface 53K, when the wavelength λ is a wavelength in the range of $\lambda1+50$ nm$<\lambda<\lambda2$, the reflection factor shows the local maximal value larger than 1%.

The operation of the optical pick-up device 1K described above is the same as in the optical pick-up device 1 in the above first embodiment.

According to this optical pick-up device 1K, when the wavelength λ of the light flux incident perpendicularly to the optical functional surface 53K, is $\lambda1 \leq \lambda \leq \lambda1+50$ nm, or when it is $\lambda2 \leq \lambda \leq \lambda2+40$ nm, because the reflection factor in the optical functional surface 53K is not larger than 1%, and when the wavelength λ of the light flux incident perpendicularly to the optical functional surface 52K, is $\lambda1 \leq \lambda \leq \lambda2+130$ nm, because the reflection factor in the optical functional surface 52K is not larger than 1.5%, the reflection can be prevented for the wavelength in these regions. Further, in the optical functional surface 53K, when the wavelength λ is a wavelength in the range of $\lambda1+15$ nm$\leq \lambda \leq \lambda2$, because the reflection factor shows the local maximal value larger than 1%, different from the conventional one, the number of layers of the antireflective film 51K can be reduced, without deteriorating the reflection prevention function for the first light flux and the second light flux. Accordingly, the production cost can be reduced, and a change of the spectral characteristic by penetration of the water between layers of the antireflective film 51K can be suppressed.

Further, even when the lens main body 50 is made of plastic, it can be prevented that a crack is generated in the antireflective film 51K by the stress of the antireflective film 51K, or the adherence between the antireflective film 51K and the lens main body 50 is lowered, that is, the environmental resistance can be increased.

Hereupon, in the present embodiment, the optical functional surface 52K is described as the light incidence surface, and the optical functional surface 53K is described as the light projection surface, however, it may also be allowable that the optical functional surface 52K is the light projection surface, and the optical functional surface 53K is the light incidence surface.

The 12th Embodiment

The optical pick-up device 1L in the present 12th embodiment is, different from the above first optical pick-up device 1, provided with an objective lens 5L in place of the objective lens 5.

The objective lens 5L is, as shown in FIG. 2, provided with a lens main body 50 and a antireflective film 51L.

The antireflective film 51L is provided on both surfaces of the lens main body 50, and forms the optical functional surfaces 52L and 53L.

The optical functional surface 52L, when the wavelength λ of the light flux incident perpendicularly is $\lambda1 \leq \lambda \leq \lambda2+40$ nm, suppresses the reflection factor to not larger than 1%.

The optical functional surface 53L, when the wavelength λ of the light flux incident perpendicularly is $\lambda1 \leq \lambda \leq \lambda1+50$ nm, or when it is $\lambda2 \leq \lambda \leq \lambda2+40$ nm, suppresses the reflection factor to not larger than 1%. Further, in the optical functional surface 53L, when the wavelength λ is a wavelength in the range of $\lambda1+50<\lambda<\lambda2$, the reflection factor shows the local maximal value larger than 1%.

The operation of the optical pick-up device 1L described above is the same as in the optical pick-up device 1 in the above first embodiment.

According to this optical pick-up device 1L, when the wavelength λ of the light flux incident perpendicularly to the optical functional surface 52L, is $\lambda1 \leq \lambda \leq \lambda2+40$ nm, because the reflection factor in the optical functional surface 52L is not larger than 1%, and when the wavelength λ of the light flux incident perpendicularly to the optical functional surface 53L, is $\lambda1 \leq \lambda \leq \lambda1+50$ nm, or when it is $\lambda2 \leq \lambda \leq \lambda2+40$ nm, because the reflection factor in the optical functional surface 53L is not larger than 1%, the reflection can be prevented for the wavelength in these zones. Further, in the optical functional surface 53L, when the wavelength λ is a wavelength in the range of $\lambda1+50$ nm$<\lambda<\lambda2$, the reflection factor shows the local maximal value larger than 1%, that is, because the reflection prevention function is lowered, different from the conventional one, the number of layers of the antireflective film 51L can be reduced, without deteriorating the reflection prevention function for the first light flux and the second light flux. Accordingly, the production cost can be reduced, and a change of the spectral characteristic by penetration of the water between layers of the antireflective film 51L can be suppressed.

Further, even when the lens main body 50 is made of plastic, it can be prevented that a crack is generated in the antireflective film 51L by the stress of the antireflective film 51L, or the adherence between the antireflective film 51L and the lens main body 50 is lowered, that is, the environmental resistance can be increased.

Hereupon, in the present embodiment, the optical functional surface 52L is described as the light incidence surface, and the optical functional surface 53L is described as the light projection surface, however, it may also be allowable that the optical functional surface 52L is the light projection surface, and the optical functional surface 53L is the light incidence surface.

The 13th Embodiment

The optical pick-up device 1M in the present 13th embodiment is, different from the above first optical pick-up device 1, provided with an objective lens 5M in place of the objective lens 5.

Figure 4:
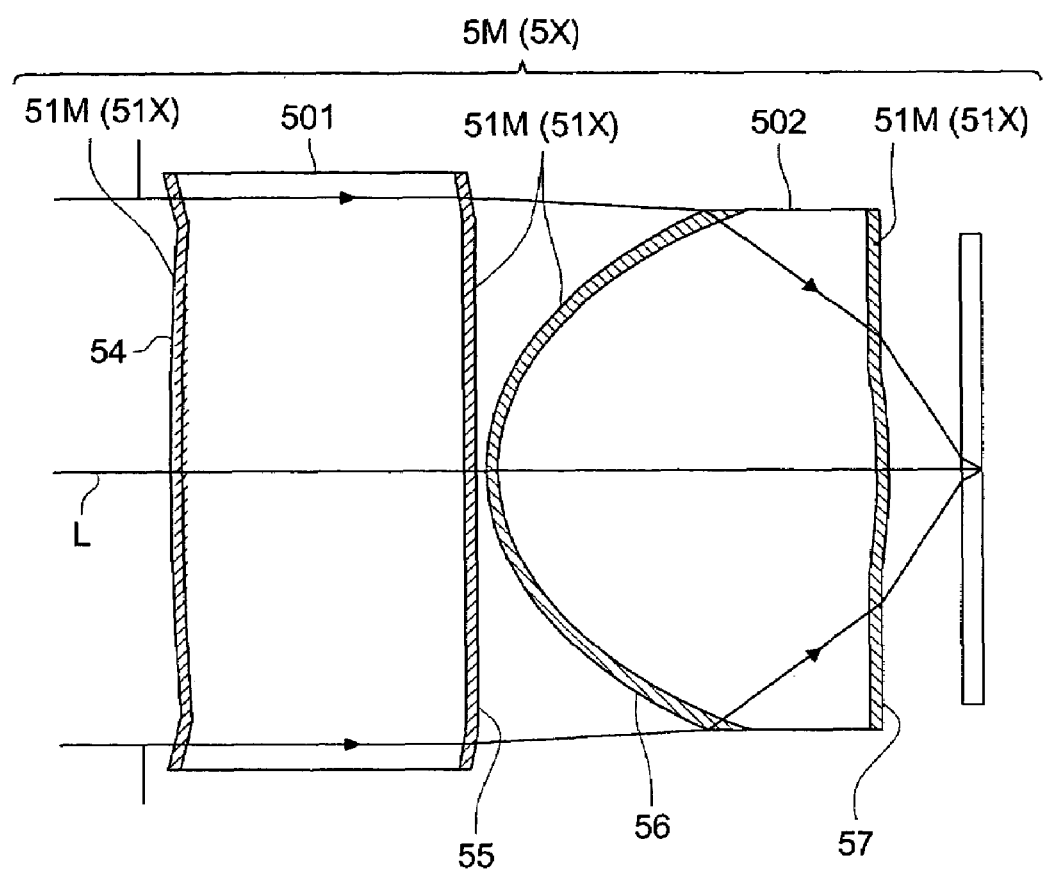
FIG. 4 is a longitudinal sectional view showing another embodiment of the objective lens according to an embodiment of the present invention.

The objective lens 5M is, as shown in FIG. 4, provided with two lens main bodies 501 and 502, and a antireflective film 51M.

The lens main body 501 is arranged on the laser light sources 2a, 2b side, and the lens main body 502 is arranged on the information recording medium side such as AOD 100.

The antireflective film 51M is provided on both surfaces of the lens main bodies 501 and 502, and forms the optical functional surfaces 54-57.

The optical functional surface 54 on laser light sources 2a, 2b side and the optical functional surface 55 on the information recording medium side, when the wavelength $\lambda$ of the light flux incident perpendicularly to the lens main body 501 is $\lambda=\lambda 1$, and when $\lambda=\lambda 2$, suppresses the reflection factor to not larger than 1%.

The optical functional surface 56 on the laser light sources 2a, 2b side, when the wavelength $\lambda$ of the light flux incident perpendicularly to the lens main body 502 is $\lambda 1 \leq \lambda \leq \lambda 2+40$ nm, suppresses the reflection factor to not larger than 1%. The optical functional surface 57 on the information recording medium side, when the wavelength $\lambda$ of the light flux incident perpendicularly to the lens main body 502 is $\lambda 1 \leq \lambda \leq \lambda 1+50$ rm, and when $\lambda 2 \leq \lambda \leq \lambda 1+40$ nm, suppresses the reflection factor to not larger than 1%. Further, when the wavelength $\lambda$ is a wavelength in the range of $\lambda 1+50<\lambda<\lambda 2$, the reflection factor shows the local maximal value larger than 1%.

The operation of the optical pick-up device 1M described above is the same as in the optical pick-up device 1 in the above first embodiment.

According to this optical pick-up device 1M, when the wavelength $\lambda$ of the light flux incident perpendicularly to the optical functional surfaces 54, 55, when $\lambda=\lambda 1$, and when $\lambda=\lambda 2$, the reflection factor on the optical functional surfaces 54, 55, is not larger than 1%, and when the wavelength $\lambda$ of the light flux incident perpendicularly to the optical functional surface 56, is $\lambda 1 \leq \lambda \leq \lambda 2+40$ nm, the reflection factor on the optical functional surface 56 is not larger than 1%, and when the wavelength $\lambda$ of the light flux incident perpendicularly to the optical functional surface 57, is $\lambda 1 \leq \lambda \leq \lambda 1+50$ nm, or when it is $\lambda 2 \leq \lambda \leq \lambda 2+40$ nm, because the reflection factor on the optical functional surface 7 is not larger than 1%, the reflection can be prevented for the wavelength in these zones. Further, in the optical functional surface 57, when the wavelength $\lambda$ is a wavelength in the range of $\lambda 1+50$ nm$<\lambda<\lambda 2$, the reflection factor shows the local maximal value larger than 1%, that is, the reflection prevention function is lowered. Therefore, the number of layers of the antireflective film 51M can be reduced, without deteriorating the reflection prevention function for the first light flux and the second light flux against the conventional one. Accordingly, the production cost can be reduced, and a change of the spectral characteristic by penetration of the water between layers of the antireflective film 51M can be suppressed.

Further, even when the lens main body 50 is made of plastic, it can be prevented that a crack is generated in the antireflective film 51M by the stress of the antireflective film 51M, or the adherence between the antireflective film 51M and the lens main body 50 is lowered, that is, the environmental resistance can be increased.

The 14th Embodiment

The optical pick-up device 1N in the present 14th embodiment is, different from the above third optical pick-up device 1B, provided with an objective lens 5N in place of the objective lens 5B.

The objective lens 5N is, as shown in FIG. 2, provided with a lens main body 50, and an antireflective film 51N.

The antireflective film 51N is provided on at least one surface of the lens main body 50, in the present embodiment, on both surfaces, and forms the optical functional surfaces 52N and 53N. In more detail, the antireflective film 51N is formed so that a value of ((the maximum film thickness in the effective diameter to the first light flux)−(the minimum film thickness in this effective diameter))/average film thickness is not larger than 5%. That is, the film thickness of the antireflective film 5N is almost uniform.

In the optical functional surfaces 52N and 53N, the maximum incidence projection angle $\theta$max in the effective diameter is $0° \leq \theta$max$\leq 40°$. Further, in the optical functional surfaces 52N and 53N, when the wavelength $\lambda$ of the light flux incident perpendicularly is $\lambda 1 \leq \lambda \leq \lambda 1+15$ nm, when $\lambda 2 \leq \lambda \leq \lambda 2+15$ nm, or when $\lambda 3 \leq \lambda \leq \lambda 3+15$ nm, the reflection factor is suppressed to not larger than 1%. Further, in the optical functional surfaces 52N and 53N, when the wavelength $\lambda$ is a wavelength in the range of $\lambda 1+15$ nm$<\lambda<\lambda 2$, the reflection factor shows the local maximal value larger than 1%.

The operation of the optical pick-up device 1N described above is the same as in the optical pick-up device 1B in the above third embodiment.

According to this optical pick-up device 1N, when the wavelength $\lambda$ of the light flux incident perpendicularly to the optical functional surfaces 52N and 53N, is $\lambda 1 \leq \lambda \leq \lambda 2+15$ nm, when $\lambda 2 \leq \lambda \leq \lambda 2+15$ nm, or when $\lambda 3 \leq \lambda \leq \lambda 3+15$ nm, because the reflection factor in the optical functional surfaces 52N, 53N, is not larger than 1%, the reflection can be prevented for the wavelengths in these zones. Further, when the wavelength $\lambda$ is a wavelength in the range of $\lambda 1+15$ nm$<\lambda<\lambda 2$, the reflection factor shows the local maximal value larger than 1%, that is, the reflection prevention function is lowered. Therefore, different from the conventional antireflective film to prevent the reflection to whole light fluxes in a broad wavelength region of wavelengths $\lambda 1$-$\lambda 3$, the number of layers of the antireflective film 51N can be reduced, without deteriorating the reflection prevention function for the first light flux, the second light flux, and third light flux. Accordingly, the production cost can be reduced, and a change of the spectral characteristic by penetration of the water between layers of the antireflective film 51N can be suppressed.

Further, even when the lens main body 50 is made of plastic, it can be prevented that a crack is generated in the antireflective film 51L by the stress of the antireflective film 51N, or the adherence between the antireflective film 51N and the lens main body 50 is lowered, that is, the environmental resistance can be increased.

The 15th Embodiment

The optical pick-up device 1O in the present 15th embodiment is, different from the above third optical pick-up device 1B, provided with an objective lens 5O in place of the objective lens 5B.

The objective lens 5O is, as shown in FIG. 2, provided with a lens main body 50, and an antireflective film 51O.

The antireflective film 51O is provided on at least one surface of the lens main body 50, in the present embodiment, on both surfaces, and forms the optical functional surfaces 52O and 53O. In more detail, the antireflective film 51O is formed so that a value of ((the maximum film thickness in the effective diameter to the first light flux)−(the minimum film thickness in this effective diameter))/average film thickness is not larger than 5%. That is, the film thickness of the antireflective film 51O is almost uniform.

In the optical functional surfaces 52N, 53N, the maximum incidence projection angle $\theta$max in the effective diameter is $40°<\theta max<90°$. Further, in the optical functional surfaces 52O and 53O, when the wavelength $\lambda$ of the light flux incident perpendicularly is $\lambda 1 \leq \lambda \leq \lambda 1+50$ nm, when $\lambda 2 \leq \lambda \leq \lambda 2+40$ nm, or when $\lambda 3 \leq \lambda \leq \lambda 3+30$ nm, the reflection factor is suppressed to not larger than 1%. Further, in the optical functional surfaces 52O and 53O, when the wavelength $\lambda$ is a wavelength in the range of $\lambda 1+50$ nm$<\lambda<\lambda 2$, the reflection factor shows the local maximal value larger than 1%.

The operation of the optical pick-up device 1O described above is the same as in the optical pick-up device 1B in the above third embodiment.

According to this optical pick-up device 1O, when the wavelength $\lambda$ of the light flux incident perpendicularly to the optical functional surfaces 52O and 53O, is $\lambda 1 \leq \lambda \leq \lambda 1+50$ nm, when $\lambda 2 \leq \lambda \leq \lambda 2+40$ nm, or when $\lambda 3 \leq \lambda \leq \lambda 3+30$ nm, because the reflection factor in the optical functional surfaces 52O and 53O, is not larger than 1%, the reflection can be prevented for the wavelengths in these regions. Further, when the wavelength $\lambda$ is a wavelength in the range of $\lambda 1+50$ nm$<\lambda<\lambda 2$, the reflection factor shows the local maximal value larger than 1%, that is, the reflection prevention function is lowered Therefore, different from the conventional antireflective film to prevent the reflection to whole light fluxes in a broad wavelength region of wavelengths $\lambda 1$-$\lambda 3$, the number of layers of the antireflective film 51O can be reduced, without deteriorating the reflection prevention function for the first light flux, the second light flux, and third light flux. Accordingly, the production cost can be reduced, and a change of the spectral characteristic by penetration of the water between layers of the antireflective film 51O can be suppressed.

Further, even when the lens main body 50 is made of optical plastic, it can be prevented that a crack is generated in the antireflective film 51O by the stress of the antireflective film 51O, or the adherence between the antireflective film 51O and the lens main body 50 is lowered, that is, the environmental resistance can be increased.

The 16th Embodiment

The optical pick-up device 1P in the present 16th embodiment is, different from the above third optical pick-up device 1B, provided with an objective lens 5P in place of the objective lens 5B.

The objective lens 5P is, as shown in FIG. 2, provided with a lens main body 50, and an antireflective film 51P.

The antireflective film 51P is provided on at least one surface of the lens main body 50, in the present embodiment, on both surfaces, and forms the optical functional surfaces 52P and 53P. In more detail, the antireflective film 51P is formed so that a value of ((the maximum film thickness in the effective diameter to the first light flux)−(the minimum film thickness in this effective diameter))/average film thickness is not larger than 5%. That is, the film thickness of the antireflective film 5P is almost uniform.

In the optical functional surface 52P, the maximum incidence projection angle $\theta$max in the effective diameter is $40°<\theta max<90°$. Further, in the optical functional surface 52P, when the wavelength $\lambda$ of the light flux incident perpendicularly is $\lambda 1 \leq \lambda \leq \lambda 1+50$ nm, when $\lambda 2 \leq \lambda \leq \lambda 2+40$ nm, or when $\lambda 3 \leq \lambda \leq \lambda 3+30$ nm, the reflection factor is suppressed to not larger than 1%. Further, in the optical functional surface 52P, when the wavelength $\lambda$ is a wavelength in the range of $\lambda 1+50$ nm$<\lambda<\lambda 2$, the reflection factor shows the local maximal value larger than 1%.

In the optical functional surface 53P, the maximum incidence projection angle $\theta$max in the effective diameter is $0°<\theta max<40°$. Further, in the optical functional surface 53P, when the wavelength $\lambda$ of the light flux incident perpendicularly is $\lambda 1 \leq \lambda \leq \lambda 1+15$ nm, when $\lambda 2 \leq \lambda \leq \lambda 2+15$ nm, or when $\lambda 3 \leq \lambda \leq \lambda 3+15$ nm, the reflection factor is suppressed to not larger than 1%. Further, in the optical functional surface 53P, when the wavelength $\lambda$ is a wavelength in the range of $\lambda 1+15$ nm$<\lambda<\lambda 2$, the reflection factor shows the local maximal value larger than 1%.

The operation of the optical pick-up device 1P described above is the same as in the optical pick-up device 1B in the above third embodiment.

According to this optical pick-up device 1P, when the wavelength $\lambda$ of the light flux incident perpendicularly to the optical functional surface 53P, is $\lambda 1 \leq \lambda \leq \lambda 1+15$ nm, when $\lambda 2 \leq \lambda \leq \lambda 2+15$ nm, or when $\lambda 3 \leq \lambda \leq \lambda 3+15$ nm, because the reflection factor in the optical functional surface 52P, is not larger than 1%, and when the wavelength $\lambda$ of the light flux incident perpendicularly to the optical functional surface 52P, is $\lambda 1 \leq \lambda \leq \lambda 1+50$ nm, when $\lambda 2 \leq \lambda \leq \lambda 2+40$ nm, or when $\lambda 3 \leq \lambda \leq \lambda 3+30$ nm, because the reflection factor in the optical functional surface 52P, is not larger than 1%, the reflection can be prevented for the wavelengths in these regions. Further, in the optical functional surface 53P, when the wavelength $\lambda$ is a wavelength in the range of $\lambda 1+15$ nm$<\lambda<\lambda 2$, the reflection factor shows the local maximal value larger than 1%, and in the optical functional surface 52P, when the wavelength $\lambda$ is a wavelength in the range of $\lambda 1+15$ nm$<\lambda<\lambda 2$, the reflection factor shows the local maximal value larger than 1%, that is, the reflection prevention function is lowered. Therefore, different from the conventional antireflective film to prevent the reflection to whole light fluxes in a broad wavelength region of wavelengths $\lambda 1$-$\lambda 3$, the number of layers of the antireflective film 51P can be reduced, without deteriorating the reflection prevention function for the first light flux, second light flux, and third light flux. Accordingly, the production cost can be reduced, and a change of the spectral characteristic by penetration of the water between layers of the antireflective film 51P can be suppressed.

Further, even when the lens main body 50 is made of plastic, it can be prevented that a crack is generated in the antireflective film 51P by the stress of the antireflective film 51P, or the adherence between the antireflective film 51P and the lens main body 50 is lowered, that is, the environmental resistance can be increased.

Hereupon, in the present embodiment, the optical functional surface 52P is described as the light incidence surface, and the optical functional surface 53P is described as the light projection surface, however, it may also be allowable that the optical functional surface 52P is the light projection surface, and the optical functional surface 53P is the light incidence and projection surface.

The 17th Embodiment

The optical pick-up device 1Q in the present 17th embodiment is, different from the above third optical pick-up device 1B, provided with an objective lens 5Q in place of the objective lens 5B.

The objective lens 5Q is, as shown in FIG. 2, provided with a lens main body 50, and a antireflective film 51Q.

The antireflective film 51Q is provided on at least one surface of the lens main body 50, in the present embodiment, on both surfaces, and forms the optical functional surfaces 52Q and 53Q. In more detail, the antireflective film 51Q is formed so that a value of ((the maximum film thickness in the effective diameter to the first light flux)−(the minimum film thickness in this effective diameter))/average film thickness is larger than 5%. That is, the film thickness of the antireflective film 51Q is un-uniform.

In the optical functional surfaces 52Q and 53Q, the maximum incidence projection angle θmax in the effective diameter, and maximum surface angle θ⊥max in the effective diameter, is $0°≦θmax≦40°$ and $0°≦θ⊥max≦40°$. Further, in the optical functional surfaces 52Q and 53Q, when the wavelength λ of the light flux incident perpendicularly is $λ1≦λ≦λ1+15$ nm, when $λ2≦λ≦λ2+15$ nm, or when $λ3≦λ≦λ3+15$ nm, the reflection factor is suppressed to not larger than 1%. Further, in the optical functional surfaces 52Q and 53Q, when the wavelength λ is a wavelength in the range of $λ1+15$ nm$<λ<λ2$, the reflection factor shows the local maximal value larger than 1%.

The operation of the optical pick-up device 1Q described above is the same as in the optical pick-up device 1B in the above third embodiment.

According to this optical pick-up device 1Q, when the wavelength λ of the light flux incident perpendicularly to the optical functional surfaces 52Q and 53Q, is $λ1≦λ≦λ1+15$ nm, when $λ2≦λ≦λ2+15$ nm, or when $λ3≦λ≦λ3+15$ nm, because the reflection factor in the optical functional surfaces 52Q and 53Q, is not larger than 1%, the reflection can be prevented for the wavelengths in these zones. Further, when the wavelength λ is a wavelength in the range of $λ1+15$ nm$<λ<λ2$, the reflection factor shows the local maximal value larger than 1%, that is, because the reflection prevention function is lowered, different from the conventional antireflective film to prevent the reflection to whole light fluxes in a broad wavelength region of wavelengths λ1-λ3, the number of layers of the antireflective film 51Q can be reduced, without deteriorating the reflection prevention function for the first light flux, second light flux, and third light flux. Accordingly, the production cost can be reduced, and a change of the spectral characteristic by penetration of the water between layers of the antireflective film 51P can be suppressed.

Further, even when the lens main body 50 is made of optical plastic, it can be prevented that a crack is generated in the antireflective film 51P by the stress of the antireflective film 51Q, or the adherence between the antireflective film 51Q and the lens main body 50 is lowered, that is, the environmental resistance can be increased.

The 18th Embodiment

The optical pick-up device 1R in the present 18th embodiment is, different from the above third optical pick-up device 1B, provided with an objective lens 5R in place of the objective lens 5B.

The objective lens 5R is, as shown in FIG. 2, provided with a lens main body 50, and a antireflective film 51R.

The antireflective film 51R is provided on at least one surface of the lens main body 50, in the present embodiment, on both surfaces, and forms the optical functional surfaces 52R and 53R. In more detail, the antireflective film 51R is formed so that a value of ((the maximum film thickness in the effective diameter to the first light flux)−(the minimum film thickness in this effective diameter))/average film thickness is larger than 5%. That is, the film thickness of the antireflective film 51R is un-uniform.

In the optical functional surfaces 52R and 53R, the maximum incidence projection angle θmax in the effective diameter, and maximum surface angle θ⊥max in the effective diameter, is $0°≦θmax≦40°$ and $40°<θ⊥max<90°$, or $40°<max<90°$ and $0°≦θ⊥max≦40°$. Further, in the optical functional surfaces 52R, 53R, when the wavelength λ of the light flux incident perpendicularly is $λ1≦λ≦λ1+15$ nm, when $λ2≦λ≦λ2+15$ nm, when $λ3≦λ≦λ3+15$ nm, or when $λ3≦λ≦λ3+30$ nm, the reflection factor is suppressed to not larger than 1%. Further, in the optical functional surfaces 52R and 53R, when the wavelength λ is a wavelength in the range of $λ1+15$ nm$<λ<λ2$, the reflection factor shows the local maximal value larger than 1%.

The operation of the optical pick-up device 1R described above is the same as in the optical pick-up device 1B in the above third embodiment.

According to this optical pick-up device 1R, when the wavelength λ of the light flux incident perpendicularly to the optical functional surfaces 52R, 53R, is $λ1≦λ≦λ1+15$ nm, when $λ2≦λ≦λ2+15$ nm, or when $λ3≦λ≦λ3+15$ nm, because the reflection factor in the optical functional surfaces 52R and 53R, is not larger than 1%, the reflection can be prevented for the wavelengths in these zones. Further, when the wavelength λ is a wavelength in the range of $λ1+15$ nm$<λ<λ2$, the reflection factor shows the local maximal value larger than 1%, that is, the reflection prevention function is lowered. Therefore, different from the conventional antireflective film to prevent the reflection to whole light fluxes in a broad wavelength region of wavelengths λ1-λ3, the number of layers of the antireflective film 51R can be reduced, without deteriorating the reflection prevention function for the first light flux, second light flux, and third light flux. Accordingly, the production cost can be reduced, and a change of the spectral characteristic by penetration of the water between layers of the antireflective film 51R can be suppressed.

Further, even when the lens main body 50 is made of optical plastic, it can be prevented that a crack is generated in the antireflective film 51R by the stress of the antireflective film 51R, or the adherence between the antireflective film 51R and the lens main body 50 is lowered, that is, the environmental resistance can be increased.

The 19th Embodiment

The optical pick-up device 1T in the present 19th embodiment is, different from the above third optical pick-up device 1B, provided with an objective lens 5T in place of the objective lens 5B.

The objective lens 5T is, as shown in FIG. 2, provided with a lens main body 50, and a antireflective film 51T.

The antireflective film 51T is provided on at least one surface of the lens main body 50, in the present embodiment, on both surfaces, and forms the optical functional surfaces 52T and 53T. In more detail, the antireflective film 51T is formed so that a value of ((the maximum film thickness in the effective diameter to the first light flux)−(the minimum film thickness in this effective diameter))/average film thickness is larger than 5%. That is, the film thickness of the antireflective film 51T is un-uniform.

In the optical functional surface 52G, the maximum incidence projection angle θmax in the effective diameter, and maximum surface angle θ⊥max in the effective diameter, is $0° \leq \theta max \leq 40°$ and $40° < \theta\perp max < 90°$, or $40° < \theta max < 90°$ and $0° \leq \theta\perp max \leq 40°$. Further, in the optical functional surface 52G, when the wavelength λ of the light flux incident perpendicularly is $\lambda 1 \leq \lambda \leq \lambda 1+50$ nm, when $\lambda 2 \leq \lambda \leq \lambda 2+40$ nm, or when $\lambda 3 \leq \lambda \leq \lambda 3+30$ nm, the reflection factor is suppressed to not larger than 1%. Further, in the optical functional surface 52G, when the wavelength λ is a wavelength in the range of $\lambda 1+50$ nm$<\lambda<\lambda 2$, the reflection factor shows the local maximal value larger than 1%.

In the optical functional surface 53G, the maximum incidence projection angle θmax in the effective diameter, and maximum surface angle θ⊥max in the effective diameter, is $0° \leq \theta max \leq 40°$ and $0° \leq \theta\perp max \leq 40°$. Further, in the optical functional surface 53G, when the wavelength λ of the light flux incident perpendicularly is $\lambda 1 \leq \lambda \leq \lambda 1+15$ nm, when $\lambda 2 \leq \lambda \leq \lambda 2+15$ nm, or when $\lambda 3 \leq \lambda \leq \lambda 3+15$ nm, the reflection factor is suppressed to not larger than 1%. Further, in the optical functional surface 53G, when the wavelength λ is a wavelength in the range of $\lambda 1+15$ nm$<\lambda<\lambda 2$, the reflection factor shows the local maximal value larger than 1%.

The operation of the optical pick-up device 1T described above is the same as in the optical pick-up device 1B in the above third embodiment.

According to this optical pick-up device 1T, when the wavelength λ of the light flux incident perpendicularly to the optical functional surface 53T, is $\lambda 1 \leq \lambda \leq \lambda 1+15$ nm, when $\lambda 2 \leq \lambda \leq \lambda 2+15$ nm, or when $\lambda 3 \leq \lambda \leq \lambda 3+15$ nm, the reflection factor in the optical functional surfaces 53T, is not larger than 1%, and when the wavelength λ of the light flux incident perpendicularly to the optical functional surface 52T, is $\lambda 1 \leq \lambda \leq \lambda 1+50$ nm, when $\lambda 2 \leq \lambda \leq \lambda 2+40$ nm, or when $\lambda 3 \leq \lambda \leq \lambda 3+30$ nm, because the reflection factor in the optical functional surface 52T is not larger than 1%, the reflection can be prevented for the wavelengths in these regions. Further, in the optical functional surface 53T, when the wavelength λ is a wavelength in the range of $\lambda 1+15$ nm$<\lambda<\lambda 2$, the reflection factor shows the local maximal value larger than 1%, and in the optical functional surface 52T, when the wavelength λ is a wavelength in the range of $\lambda 1+50$ nm$<\lambda<\lambda 2$, the reflection factor shows the local maximal value larger than 1%, that is, the reflection prevention function is lowered. Therefore, different from the conventional antireflective film to prevent the reflection to whole light fluxes in a broad wavelength region of wavelengths λ1-λ3, the number of layers of the antireflective film 51T can be reduced, without deteriorating the reflection prevention function for the first light flux, second light flux, and third light flux. Accordingly, the production cost can be reduced, and a change of the spectral characteristic by penetration of the water between layers of the antireflective film 51T can be suppressed.

Further, even when the lens main body 50 is made of optical plastic, it can be prevented that a crack is generated in the antireflective film 51T by the stress of the antireflective film 51T, or the adherence between the antireflective film 51T and the lens main body 50 is lowered, that is, the environmental resistance can be increased.

Hereupon, in the present embodiment, the optical functional surface 52T is described as the light incidence surface, and the optical functional surface 53T is described as the light projection surface, however, it may also be allowable that the optical functional surface 52T is the light projection surface, and the optical functional surface 53T is the light incidence and projection surface.

The 20th Embodiment

The optical pick-up device 1T in the present 20th embodiment is, different from the above third optical pick-up device 1B, provided with an objective lens 5U in place of the objective lens 5B.

The objective lens 5U is, as shown in FIG. 2, provided with a lens main body 50, and a antireflective film 51U.

The antireflective film 51U is provided on at least one surface of the lens main body 50, in the present embodiment, on both surfaces, and forms the optical functional surfaces 52U and 53U. In more detail, the antireflective film 51U is formed so that a value of ((the maximum film thickness in the effective diameter to the first light flux)−(the minimum film thickness in this effective diameter))/average film thickness is larger than 5%. That is, the film thickness of the antireflective film 51U is un-uniform.

In the optical functional surface 52U, the maximum incidence projection angle θmax in the effective diameter, and maximum surface angle θ⊥max in the effective diameter, is $40° < \theta max < 90°$ and $40° < \theta\perp max < 90°$. Further, in the optical functional surface 52U, when the wavelength λ of the light flux incident perpendicularly is $\lambda 1 \leq \lambda \leq \lambda 3+120$ nm, the reflection factor is suppressed to not larger than 1.5%.

In the optical functional surface 53U, the maximum incidence projection angle θmax in the effective diameter, and maximum surface angle θ⊥max in the effective diameter, is $0° \leq \theta max \leq 40°$ and $0° \leq \theta\perp max \leq 40°$. Further, in the optical functional surface 53U, when the wavelength λ of the light flux incident perpendicularly is $\lambda 1 \ \lambda \leq \lambda 1+15$ nm, when $\lambda 2 \leq \lambda \leq \lambda 2+15$ nm, or when $\lambda 3 \leq \lambda \leq \lambda 3+15$ nm, the reflection factor is suppressed to not larger than 1%. Further, in the optical functional surface 53U, when the wavelength λ is a wavelength in the range of $\lambda 1+15$ nm$<\lambda<\lambda 2$, the reflection factor shows the local maximal value larger than 1%.

The operation of the optical pick-up device 1T described above is the same as in the optical pick-up device 1B in the above third embodiment.

According to this optical pick-up device 1U, when the wavelength λ of the light flux incident perpendicularly to the optical functional surface 53T, is $\lambda 1 \leq \lambda \leq \lambda 1+15$ nm, when $\lambda 2 \leq \lambda \leq \lambda 2+15$ nm, or when $\lambda 3 \leq \lambda \leq \lambda 3+15$ nm, the reflection factor in the optical functional surfaces 53U, is not larger than 1%, and when the wavelength λ of the light flux incident perpendicularly to the optical functional surface 52U, is $\lambda 1 \leq \lambda \leq \lambda 3+120$ nm, because the reflection factor in the optical functional surface 52U is not larger than 1.5%, the reflection can be prevented for the wavelengths in these zones. Further, in the optical functional surface 53U, when the wavelength λ is a wavelength in the range of $\lambda 1+15$ nm$\leq \lambda \leq \lambda 2$, because the reflection factor shows the local maximal value larger than 1%, different from the conventional one, the number of layers of the antireflective film 51U can be reduced, without deteriorating the reflection prevention function for the first light flux, second light flux, and third light flux. Accordingly, the production cost can be reduced, and a change of the spectral characteristic by penetration of the water between layers of the antireflective film 51U can be suppressed.

Further, even when the lens main body 50 is made of optical plastic, it can be prevented that a crack is generated in the antireflective film 51U by the stress of the antireflective film 51U, or the adherence between the antireflective film 51U and the lens main body 50 is lowered, that is, the environmental resistance can be increased.

Hereupon, in the present embodiment, the optical functional surface 52U is described as the light incidence surface, and the optical functional surface 53U is described as the light projection surface, however, it may also be allowable that the optical functional surface 52U is the light projection surface, and the optical functional surface 53U is the light incidence surface.

The 21st Embodiment

The optical pick-up device 1V in the present 21st embodiment is, different from the above third optical pick-up device 1B, provided with an objective lens 5V in place of the objective lens 5B.

The objective lens 5V is, as shown in FIG. 2, provided with a lens main body 50, and an antireflective film 51V.

The antireflective film 51V is provided on at least one surface of the lens main body 50, in the present embodiment, on both surfaces, and forms the optical functional surfaces 52V and 53V. In more detail, the antireflective film 51V is formed so that a value of ((the maximum film thickness in the effective diameter to the first light flux)−(the minimum film thickness in this effective diameter))/average film thickness is larger than 5%. That is, the film thickness of the antireflective film 51V is un-uniform.

In the optical functional surface 52V, the maximum incidence projection angle Emax in the effective diameter, and maximum surface angle θ⊥max in the effective diameter, is 40°<θmax<90° and 40°<θ⊥max<90°. Further, in the optical functional surface 52V, when the wavelength λ of the light flux incident perpendicularly is $\lambda 1 \leq \lambda \leq \lambda 3+120$ nm, the reflection factor is suppressed to not larger than 1.5%.

In the optical functional surface 53V, the maximum incidence projection angle θmax in the effective diameter, and maximum surface angle θ⊥max in the effective diameter, are 0<θmax<40° and 40°<θ⊥max<90°, or 40°<θmax<90° and 0°≦θ⊥max≦40°. Further, in the optical functional surface 53V, when the wavelength λ of the light flux incident perpendicularly is $\lambda 1 \leq \lambda \leq \lambda 1+50$ nm, when $\lambda 2 \leq \lambda \leq \lambda 2+40$ nm, or when $\lambda 3 \leq \lambda \leq \lambda 3+30$ nm, the reflection factor is suppressed to not larger than 1%. Further, in the optical functional surface 53V, when the wavelength λ is a wavelength in the range of $\lambda 1+15$ nm$\leq \lambda \leq \lambda 2$, the reflection factor shows the local maximal value larger than 1%.

The operation of the optical pick-up device 1V described above is the same as in the optical pick-up device 1B in the above third embodiment.

According to this optical pick-up device 1V, when the wavelength λ of the light flux incident perpendicularly to the optical functional surface 53V, is $\lambda 1 \leq \lambda \leq \lambda 1+15$ nm, when $\lambda 2 \leq \lambda \leq \lambda 2+15$ nm, or when $\lambda 3 \leq \lambda \leq \lambda 3+15$ nm, the reflection factor in the optical functional surfaces 53V, is not larger than 1%, and when the wavelength λ of the light flux incident perpendicularly to the optical functional surface 52V, is $\lambda 1 \leq \lambda \leq \lambda 3+120$ nm, because the reflection factor in the optical functional surface 52V is not larger than 1.5%, the reflection can be prevented for the wavelengths in these regions. Further, in the optical functional surface 53V, when the wavelength λ is a wavelength in the range of $\lambda 1+15$ nm<λ<λ2, because the reflection factor shows the local maximal value larger than 1%, different from the conventional one, the number of layers of the antireflective film 51V can be reduced, without deteriorating the reflection prevention function for the first light flux, second light flux, and third light flux. Accordingly, the production cost can be reduced, and a change of the spectral characteristic by penetration of the water between layers of the antireflective film 51V can be suppressed.

Further, even when the lens main body 50 is made of optical plastic, it can be prevented that a crack is generated in the antireflective film 51V by the stress of the antireflective film 51V, or the adherence between the antireflective film 51V and the lens main body 50 is lowered, that is, the environmental resistance can be increased.

Hereupon, in the present embodiment, the optical functional surface 52V is described as the light incidence surface, and the optical functional surface 53V is described as the light projection surface, however, it may also be allowable that the optical functional surface 52V is the light projection surface, and the optical functional surface 53V is the light incidence surface.

The 22nd Embodiment

The optical pick-up device 1W in the present 22nd embodiment is, different from the above third optical pick-up device 1B, provided with an objective lens 5W in place of the objective lens 5B.

The objective lens 5W is, as shown in FIG. 2, provided with a lens main body 50, and a antireflective film 51W.

The antireflective film 51W is provided on both surfaces of the lens main body 50, and forms the optical functional surfaces 52W and 53W.

In the optical functional surface 52W, when the wavelength λ of the light flux incident perpendicularly is $\lambda 1 \leq \lambda \leq \lambda 3+30$ nm, the reflection factor is suppressed to not larger than 1%.

In the optical functional surface 53W, when the wavelength λ of the light flux incident perpendicularly is $\lambda 1 \leq \lambda \leq \lambda 1+50$ nm, or when $\lambda 2 \leq \lambda \leq \lambda 2+30$ nm, the reflection factor is suppressed to not larger than 1%. Further, in the optical functional surface 53W, when the wavelength λ is a wavelength in the range of λ1+50 nm<λ<λ2, the reflection factor shows the local maximal value larger than 1%.

The operation of the optical pick-up device 1W described above is the same as in the optical pick-up device 1B in the above third embodiment.

According to this optical pick-up device 1W, when the wavelength λ of the light flux incident perpendicularly to the optical functional surface 52W, is $\lambda 1 \leq \lambda \leq \lambda 3+30$ nm, the reflection factor in the optical functional surfaces 52W, is not larger than 1%, and when the wavelength λ of the light flux incident perpendicularly to the optical functional surface 53W, is λ1≦λ≦λ1+50 nm, or when it is λ2≦λ≦λ3+30 nm, because the reflection factor in the optical functional surface 53W is not larger than 1%, the reflection can be prevented for the wavelengths in these zones. Further, in the optical functional surface 53W, when the wavelength λ is a wavelength in the range of λ1+50 nm<λ<λ2, because the reflection factor shows the local maximal value larger than 1%, that is, the reflection prevention function is lowered. Therefore, different from the conventional one, the number of layers of the antireflective film 51W can be reduced, without deteriorating the reflection prevention function for the first light flux, second light flux, and third light flux. Accordingly, the production cost can be reduced, and a change of the spectral characteristic by penetration of the water between layers of the antireflective film 51W can be suppressed.

Further, even when the lens main body 50 is made of optical plastic, it can be prevented that a crack is generated in the antireflective film 51W by the stress of the antireflective film 51W, or the adherence between the antireflective film 51W and the lens main body 50 is lowered, that is, the environmental resistance can be increased.

Hereupon, in the present embodiment, the optical functional surface 52W is described as the light incidence surface, and the optical functional surface 53W is described as the light projection surface, however, it may also be allowable that the optical functional surface 52W is the light projection surface, and the optical functional surface 53W is the light incidence surface.

The 23rd Embodiment

The optical pick-up device 1X in the present 23rd embodiment is, different from the above third optical pick-up device 1B, provided with an objective lens 5X in place of the objective lens 5B.

The objective lens 5X is, as shown in FIG. 4, provided with two lens main bodies 501 and 502 and a antireflective film 51X.

The lens main body 501 is arranged on laser light sources 2a-2c side, and the lens main body 502 is arranged on the information recording medium side such as AOD 100.

The antireflective film 51X is provided on both surfaces of each of lens main bodies 501, 502, and forms the optical functional surfaces 54-57.

In the optical functional surface 54 on laser light sources 2a-2c side, and the optical functional surface 55 on the information recording medium side, when the wavelength λ of the light flux incident perpendicularly is λ1=λ2, when λ=λ2, and when λ=λ3, the reflection factor is suppressed to not larger than 1%.

In the optical functional surface 56 on laser light sources 2a, 2b side to the lens main body 502, when the wavelength λ of the light flux incident perpendicularly is λ1≦λ≦λ3+30 nm, the reflection factor is suppressed to not larger than 1%. In the optical functional surface 57 on the information recording medium side to the lens main body 502, when the wavelength λ of the light flux incident perpendicularly is λ1≦λ≦λ1+50 nm, and when λ2≦λ≦λ3+30 nm, the reflection factor is suppressed to not larger than 1%. Further, in the optical functional surface 57, when the wavelength λ is a wavelength in the range of λ1+50 nm<λ<λ2, the reflection factor shows the local maximal value larger than 1%.

The operation of the optical pick-up device 1X described above is the same as in the optical pick-up device 1B in the above third embodiment.

According to this optical pick-up device 1X, when the wavelength λ of the light flux incident perpendicularly to the optical functional surfaces 54 and 55, is λ=λ1, when λ=λ2, and when λ=λ3, the reflection factor in the optical functional surfaces 54 and 55, is not larger than 1%, and when the wavelength λ of the light flux incident perpendicularly to the optical functional surface 56, is λ1≦λ≦λ3+30 nm, the reflection factor in the optical functional surfaces 56, is not larger than 1%, and when the wavelength λ of the light flux incident perpendicularly to the optical functional surface 57, is λ1λ≦λ1+50 nm, or when λ2≦λ≦λ3+30 nm, because the reflection factor in the optical functional surface 57 is not larger than 1%, the reflection can be prevented for the wavelengths in these zones. Further, in the optical functional surface 57, when the wavelength λ is a wavelength in the range of λ1+50 nm<λ<λ2, because the reflection factor shows the local maximal value larger than 1%, that is, the reflection prevention function is lowered. Therefore, different from the conventional one, the number of layers of the antireflective film 51X can be reduced, without deteriorating the reflection prevention function for the first light flux, second light flux, and third light flux. Accordingly, the production cost can be reduced, and a change of the spectral characteristic by penetration of the water between layers of the antireflective film 51X can be suppressed.

Further, even when the lens main body 50 is made of optical plastic, it can be prevented that a crack is generated in the antireflective film 51X by the stress of the antireflective film 51X, or the adherence between the antireflective film 51X and the lens main body 50 is lowered, that is, the environmental resistance can be increased.

Hereupon, in the 1st-23rd embodiments, the numerical aperture of the objective lenses 5, 5A-5X, is described as 0.65, however, it may also be 0.85-0.9. In this case, as the information recording medium, the blu-ray disc whose protective substrate thickness is 0.1 mm, can be used in place of AOD 100.

Further, in the 1st-12th and 14th-22nd embodiments, the objective lens is described as that it is provided with a lens main body and the antireflective film provided on both surfaces of the lens main body, however, it may also be provided with 2 or more lens main bodies and the antireflective films provided on the surfaces of each of lens main bodies.

Further, in the 1st-23rd embodiments, the optical element is described as the objective lens 5, however, it may also be a beam shrinker, or beam expander.

EXAMPLE

By listing Examples and comparative Examples, the present invention will be more specifically described below. Hereupon, in the following Examples, it is defined that the wavelength λ1 is 405 nm, λ2 is 650 nm, and λ3 is 780 nm.

Example 1

In Example 1, the antireflective film 51 of the objective lens 5 in the above 1st Embodiment, is structured by 2 layers as shown in Table 1. Hereupon, the lens main body is formed of BK7 (trade name, made by Shot glass Co.).

TABLE 1

| Layer | Material | Index | Thickness |
|---|---|---|---|
| Air | | 1 | |
| 2 | SiO$_2$ | 1.46 | 85.62 |

TABLE 1-continued

| Layer | Material | Index | Thickness |
|-------|----------|-------|-----------|
| 1 | $Ta_2O_5$ | 2.06 | 121.34 |
| Lens | BK7 | 1.52 | |

Figure 5:
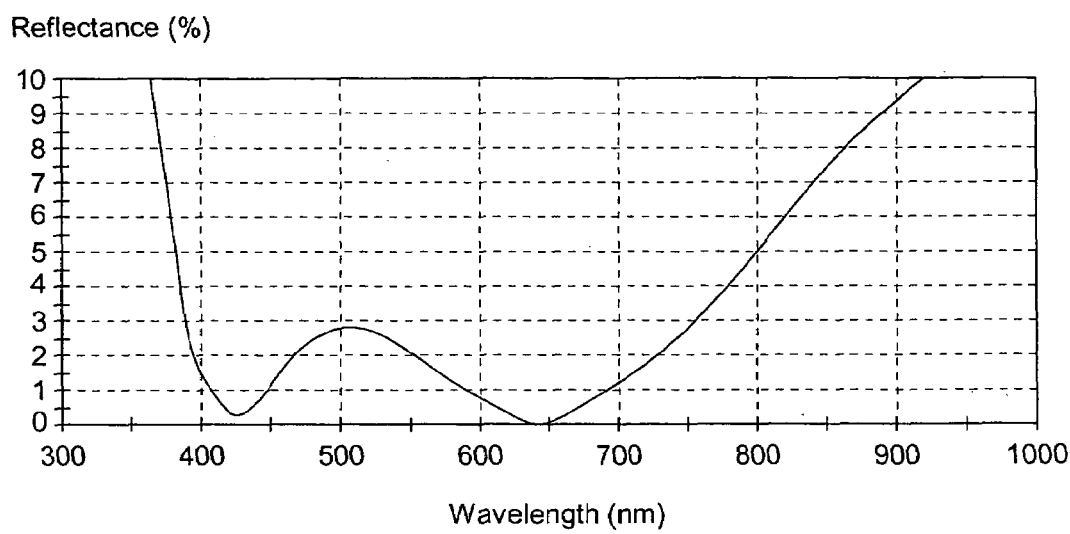
FIG. 5 is a view showing a spectral reflection factor curve on the optical functional surface formed of an antireflective film of Table 1.

As a result of measurement of the relationship of the reflection factor in optical functional surfaces 52 and 53 of the objective lens 5 and the wavelength of the incident ray of light, the reflection factor of the optical functional surfaces 52 and 53 shows, as shown in FIG. 5, the local maximal value larger than 2% between the wavelength $\lambda 1$ and wavelength $\lambda 2$, however, shows the minimum value lower than 1% in the vicinity of the wavelengths $\lambda 1$ and $\lambda 2$.

From this, the objective lens 5 in the present example 1 has the reflection prevention function for the first light flux of wavelength $\lambda 1$ and the second light flux of wavelength $\lambda 2$, and it can be seen that, by preventing the lowering of transmission light amount, the dependability of the recording and reproducing can be increased.

Example 2

In Example 2, the antireflective film 51A of the objective lens 5A in the second embodiment is structured by 3 layers as shown in Table 2.

TABLE 2

| Layer | Material | Index | Thickness |
|-------|----------|-------|-----------|
| Air | | 1 | |
| 3 | $MgF_2$ | 1.38 | 95.03 |
| 2 | $Al_2O_3$ | 1.62 | 61.56 |
| 1 | $CeO_2$ | 1.81 | 84.62 |
| Lens | BK7 | 1.52 | |

The relationship of the reflection factor in optical functional surfaces 52A and 53A of this objective lens 5A and the wavelength of the incident ray of light is measured.

Figure 6:
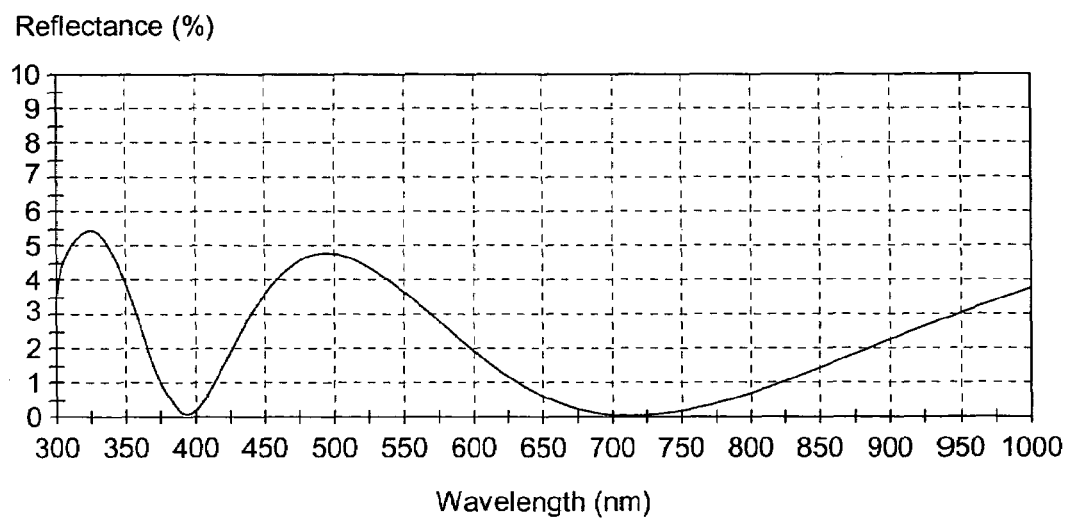
FIG. 6 is a view showing a spectral reflection factor curve on the optical functional surface formed of an antireflective film of Table 2.

As a result of the measurement, the reflection factor of the optical functional surfaces 52A and 53A of the objective lens 5A shows, as shown in FIG. 6, the local maximal value larger than 2% between the wavelength $\lambda 1$ and wavelength $\lambda 2$, however, shows that it is not larger than 1% in the wavelength range of a broad region including the wavelength $\lambda 1$ and $\lambda 2$.

From this, the objective lens 5A in the present example 2 has the reflection prevention function for the first light flux wavelength $\lambda 1$ and the second light flux of wavelength $\lambda 2$, and it can be seen that, by preventing the lowering of transmission light amount, the dependability of the recording and reproducing can be increased.

Example 3

In Example 3, the antireflective film 51B of the objective lens 5B in the third embodiment is structured by 4 layers as shown in Table 3.

TABLE 3

| Layer | Material | Index | Thickness |
|-------|----------|-------|-----------|
| Air | | 1 | |
| 4 | $SiO_2$ | 1.46 | 112.22 |
| 3 | $Ta_2O_5$ | 2.06 | 122.1 |

TABLE 3-continued

| Layer | Material | Index | Thickness |
|-------|----------|-------|-----------|
| 2 | $SiO_2$ | 1.46 | 39.21 |
| 1 | $Ta_2O_5$ | 2.06 | 27.26 |
| Lens | Optical plastic | 1.51 | |

Figure 7:
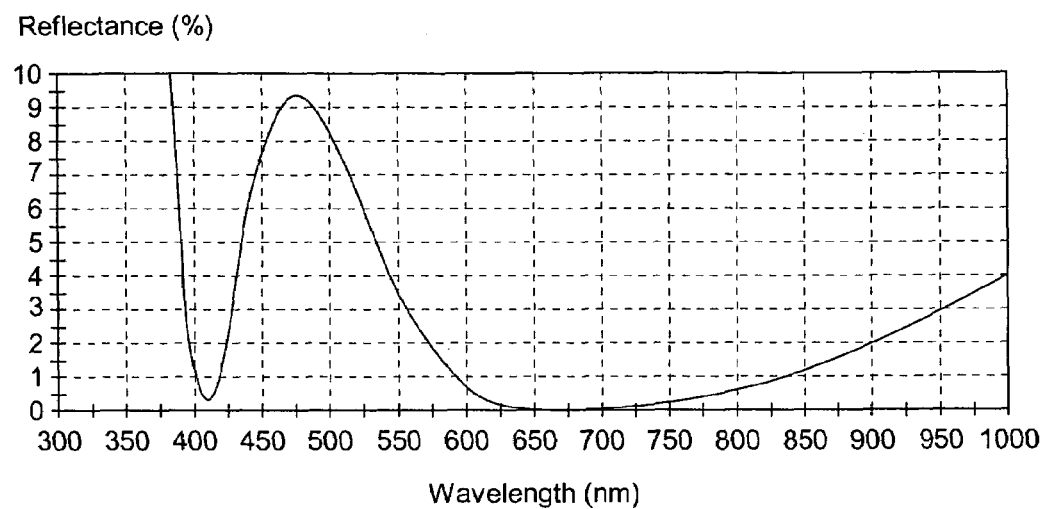
FIG. 7 is a view showing a spectral reflection factor curve on the optical functional surface formed of an antireflective film of Table 3.

As a result of measurement of the relationship of the reflection factor in optical functional surfaces 52B and 53B of this objective lens 5B and the wavelength of the incident ray of light, the reflection factor of the optical functional surfaces 52B, 53B shows, as shown in FIG. 7, the local maximal value larger than 2% between the wavelength $\lambda 1$ and wavelength $\lambda 2$, however, shows that it is not larger than 1% in the vicinity of wavelengths $\lambda 1$, $\lambda 2$, and $\lambda 3$.

From this, the objective lens 5B in the present example 3 has the reflection prevention function for the first light flux of wavelength $\lambda 1$ and the second light flux of wavelength $\lambda 2$, and the third light flux of wavelength $\lambda 3$, and it can be seen that, by preventing the lowering of transmission light amount, the dependability of the recording and reproducing can be increased.

Example 4

In Example 4, the antireflective film 51B of the objective lens 5B in the third embodiment is structured by 6 layers as shown in Table 4.

TABLE 4

| Layer | Material | Index | Thickness |
|-------|----------|-------|-----------|
| Air | | 1 | |
| 6 | $SiO_2$ | 1.46 | 100.00 |
| 5 | $Ta_2O_5$ | 2.06 | 26.60 |
| 4 | $SiO_2$ | 1.46 | 10.00 |
| 3 | $Ta_2O_5$ | 2.06 | 94.00 |
| 2 | $SiO_2$ | 1.46 | 39.00 |
| 1 | $Ta_2O_5$ | 2.06 | 19.00 |
| Lens | Optical plastic | 1.51 | |

Figure 8:
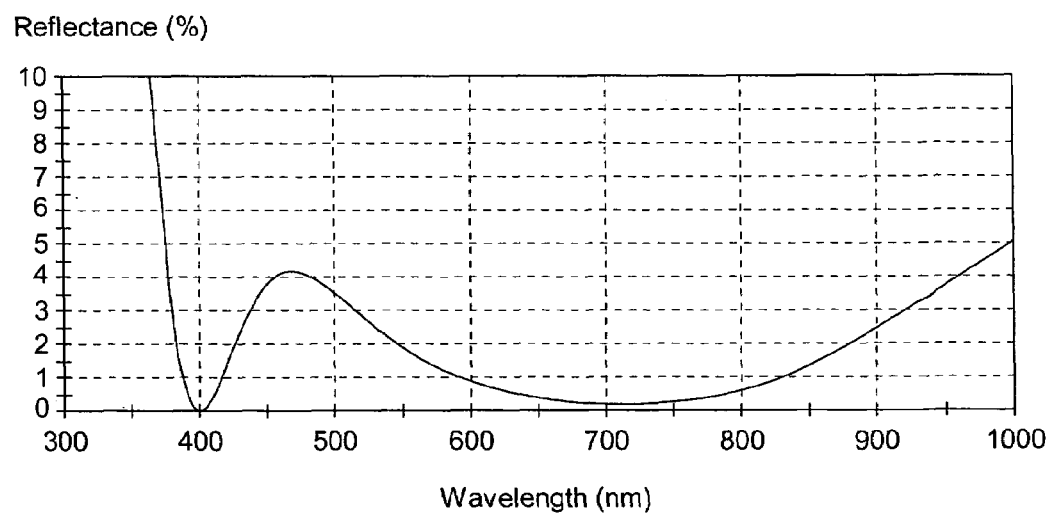
FIG. 8 is a view showing a spectral reflection factor curve on the optical functional surface formed of an antireflective film of Table 4.

As a result of measurement of the relationship of the reflection vector in optical functional surfaces 52B, 53B of this objective lens 5B and the wavelength of the incident ray of light, the reflection factor of the optical functional surfaces 52B and 53B shows, as shown in FIG. 8, the local maximal value larger than 2% between the wavelength $\lambda 1$ and wavelength $\lambda 2$, however, shows that it is not larger than 1% in the vicinity of wavelengths $\lambda 1$, $\lambda 2$, and $\lambda 3$.

From this, the objective lens 5B in the present example 4 has the reflection prevention function for the first light flux of wavelength $\lambda 1$, the second light flux of wavelength $\lambda 2$, and the third light flux of wavelength $\lambda 3$, and it can be seen that, by preventing the lowering of transmission light amount, the dependability of the recording and reproducing can be increased.

Example 5

In Example 5, the objective lens 5C in the embodiments 4, 5 and 6, is structured as a lens of so-called 2-lens composition as shown in Table 5. Hereupon, the lens of 2-lens composition means that it is provided with 2 lens main bodies. The focal distance of this objective lens 5C is 2.2 mm to the light flux of wavelength 408 nm.

TABLE 5

| | | 2-lens composition Focal distance = 2.2 (mm) (λ = 408 nm) | | |
|---|---|---|---|---|
| | Lens composition | λ = 405 nm | λ = 650 nm | λ = 780 nm |
| | NA | 0.87 | 0.67 | 0.51 |
| S1 | S1 maximum surface angle (°) | 18 | 5.3 | 3.8 |
| | S1 maximum incident angle (°) | 18 | 10.1 | 9.9 |
| S2 | S2 maximum surface angle (°) | 7.7 | 0.9 | 1.8 |
| | S2 maximum incident angle (°) | 12.3 | 1.6 | 5.1 |
| S3 | S3 maximum surface angle (°) | 69.7 | 58.9 | 48 |
| | S3 maximum incident angle (°) | 65.1 | 59.6 | 51.3 |
| S4 | S4 maximum surface angle (°) | 1.8 | 1.9 | 4.5 |
| | S4 maximum incident angle (°) | 56.4 | 44 | 35.2 |

Herein, in Table 5, S1-S4 are respectively optical functional surfaces of objective lens 5C, and they are positioned in order of S1-S4 toward the information recording medium such as AOD 100 from laser light sources 2a, 2b.

In more detail, the optical functional surfaces S1, S2 are formed of the antireflective film of 2-layer structure shown in Table 1. Further, the optical functional surfaces S3, S4 are formed of the antireflective film of 7-layer structure shown in Table 6.

TABLE 6

| Layer | Material | Index | Thickness |
|---|---|---|---|
| Air | | 1 | |
| 7 | $SiO_2$ | 1.47 | 98.22 |
| 6 | $Ta_2O_5$ | 2.12 | 47.90 |
| 5 | $SiO_2$ | 1.47 | 15.00 |
| 4 | $Ta_2O_5$ | 2.12 | 64.02 |
| 3 | $SiO_2$ | 1.47 | 35.44 |
| 2 | $Ta_2O_5$ | 2.12 | 15.44 |
| 1 | $SiO_2$ | 1.47 | 239.00 |
| Lens | BK7 | 1.53 | |

As a result of measurement of the transmission factor of the objective lens 5C, it shows a good value as in the case that the transmission factor to the light flux of the wavelength 408 nm is 98%, and the transmission factor to the light flux of the wavelength 658 nm is 98%.

Figure 9:
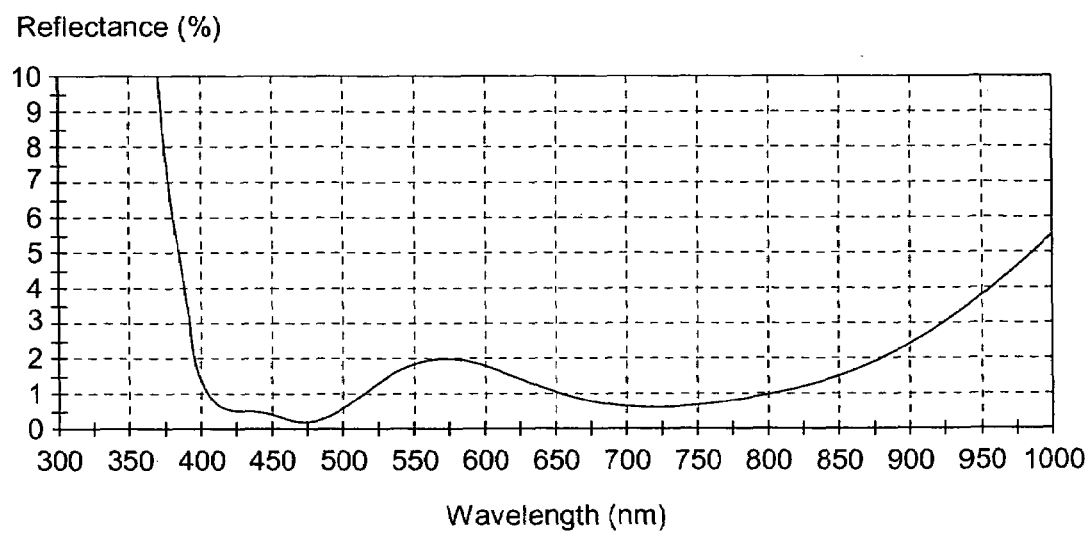
FIG. 9 is a view showing a spectral reflection factor curve on the optical functional surface formed of an antireflective film of Table 6.

Further, as a result of measurement of the relationship between the reflection factor in the optical functional surfaces S1 and S2, of this objective lens 5C, and the wavelength of the incident ray of light, the reflection factor of the optical functional surfaces S3 and S4 shows, as shown in FIG. 9, the local maximal value larger than 1% between the wavelength λ1+50 nm and wavelength λ2, however, shows that it is not larger than 1% in the vicinity of wavelength λ1 and λ2.

From this, the objective lens 5C in the present example 5 has the reflection prevention function for the first light flux, the second light flux, and it can be seen that, by preventing the lowering of transmission light amount, the dependability of the recording and reproducing can be increased.

Example 6

In Example 6, the objective lens 50 in the embodiments 14, 15, 16, is structured as a lens of so-called 2-lens composition as shown in Table 5.

In more detail, the optical functional surfaces S1, S2 are formed of the antireflective film of 6-layer structure shown in Table 4. Further, the optical functional surfaces S3, S4 are formed of the antireflective film of 7-layer structure shown in Table 6.

As a result of measurement of the transmission factor of this objective lens 50, it shows a good value in which the transmission factor to the light flux of the wavelength 408 nm is 98%, the transmission factor to the light flux of the wavelength 658 nm is 98%, and the transmission factor to the light flux of the wavelength 785 nm is 97%.

Further, as a result of measurement of the relationship between the reflection factor in the optical functional surfaces S1, S2, of this objective lens 50, and the wavelength of the incident ray of light, the reflection factor of the optical functional surfaces S1, S2 shows, as shown in FIG. 8, the local maximal value larger than 1% between the wavelength λ1+15 nm and wavelength λ2, however, shows that it is not larger than 1% in the vicinity of wavelengths λ1, λ2, and λ3.

Further, as a result of measurement of the relationship between the reflection factor in the optical functional surfaces S3 and S4, of this objective lens 50, and the wavelength of the incident ray of light, the reflection factor of the optical functional surfaces S3, S4 shows, as shown in FIG. 9, the local maximal value larger than 1% between the wavelength λ1+50 nm and wavelength λ2, however, shows that it is not larger than 1% in the vicinity of wavelengths λ1, λ2, and λ3.

From this, the objective lens 50 in the present example 6 has the reflection prevention function for the first-third light fluxes by the antireflective film 510 whose number of layers is small, and it can be seen that, by preventing the lowering of transmission light amount, the dependability of the recording and reproducing can be increased Example 7

In Example 7, the objective lenses 5F, 5I, 5J and 5K in the embodiments 7, 9, 10, 11 and 13 are structured as a lens of so-called 2-lens composition as shown in Table 5.

In more detail, the optical functional surfaces S1, S2 are formed of the antireflective film of 2-layer structure shown in Table 1. Further, the optical functional surface S3 is formed of the antireflective film of 5-layer structure shown in Table 7.

TABLE 7

| Layer | Material | Index | Thickness |
|---|---|---|---|
| Air | | 1 | |
| 5 | $SiO_2$ | 1.46 | 92.43 |
| 4 | $Ta_2O_5$ | 2.06 | 137.51 |
| 3 | $SiO_2$ | 1.46 | 35.21 |
| 2 | $Ta_2O_5$ | 2.06 | 16.74 |
| 1 | $SiO_2$ | 1.46 | 226.48 |
| Lens | Optical plastic | 1.55 | |

As a result of measurement of the transmission factor of this objective lens, it shows a good value in which the transmission factor to the light flux of the wavelength 408 nm is 98%, and the transmission factor to the light flux of the wavelength 658 nm is 98%.

Further, as a result of measurement of the relationship between the reflection factor in the optical functional surfaces S1, S2 of this objective lens 5F, 5I, 5J and 5K, and the wavelength of the incident ray of light, the reflection factor of the optical functional surfaces S1 and S2 shows, as shown in FIG. 5, the local maximal value larger than 1% between the wavelength λ1+15 nm and wavelength λ2, however, shows that it is not larger than 1.5% in the vicinity of wavelengths λ1 and λ2.

Further, as a result of measurement of the relationship between the reflection factor in the optical functional surface S4, and the wavelength of the incident ray of light, the reflection factor of the optical functional surface S4 shows, as shown in FIG. 9, the local maximal value larger than 1% between the wavelength λ1+50 nm and wavelength λ2, however, shows that it is not larger than 1% in the vicinity of wavelengths λ1 and λ2.

From this, the objective lens in the present example 7 has the reflection prevention function for the first light flux, the second light flux, by the antireflective film whose number of layers is small, and it can be seen that, by preventing the lowering of transmission light amount, the dependability of the recording and reproducing can be increased.

Example 8

In Example 8, the objective lenses 5Q, 5T, 5U and 5W in the embodiments 17, 19, 20, 21 and 23 are structured as a lens of so-called 2-lens composition as shown in Table 5.

In more detail, the optical functional surfaces S1, S2 are formed of the antireflective film of 6-layer structure shown in Table 4. Further, the optical functional surface S3 is formed of the antireflective film of 9-layer structure shown in Table 8. Further, the optical functional surface S4 is formed of the antireflective film of 7-layer structure shown in Table 6.

TABLE 8

| Layer | Material | Index | Thickness |
|---|---|---|---|
| Air |  | 1 |  |
| 9 | SiO$_2$ | 1.46 | 99.27 |
| 8 | Ta$_2$O$_5$ | 2.06 | 40.94 |
| 7 | SiO$_2$ | 1.46 | 10.01 |
| 6 | Ta$_2$O$_5$ | 2.06 | 80.77 |
| 5 | SiO$_2$ | 1.46 | 23.92 |
| 4 | Ta$_2$O$_5$ | 2.06 | 18.42 |
| 3 | SiO$_2$ | 1.46 | 25.27 |
| 2 | Ta$_2$O$_5$ | 2.06 | 6.43 |
| 1 | SiO$_2$ | 1.46 | 182.83 |
| Lens | BK7 | 1.52 |  |

As a result of measurement of the transmission factor of these objective lenses 5Q, 5T, 5U and 5W, it shows a good value in which the transmission factor to the light flux of the wavelength 408 nm is 98%, the transmission factor to the light flux of the wavelength 658 nm is 98%, and the transmission factor to the light flux of the wavelength 785 nm is 97%.

Further, as a result of measurement of the relationship between the reflection factor in the optical functional surfaces S1 and S2 of these objective lens 5Q, 5T, 5U and 5W, and the wavelength of the incident ray of light, the reflection factor of the optical functional surfaces S1 and S2 shows, as shown in FIG. 8, the local maximal value larger than 1% between the wavelength λ1+15 nm and wavelength λ2, however, shows that it is not larger than 1% in the vicinity of wavelengths λ1, λ2 and λ3.

Figure 11:
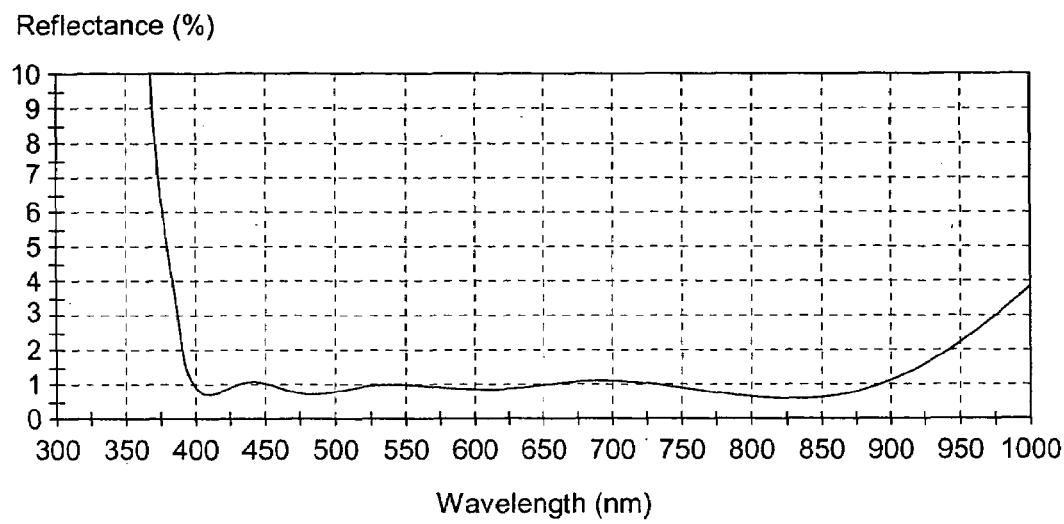
FIG. 11 is a view showing a spectral reflection factor curve on the optical functional surface formed of a antireflective film of Table 8.

Further, as a result of measurement of the relationship between the reflection factor in the optical functional surface S3, and the wavelength of the incident ray of light, the reflection factor of the optical functional surface S3 shows, as shown in FIG. 11, that it is not larger than 1.5% in the vicinity of wavelengths λ1, λ2 and λ3.

Further, as a result of measurement of the relationship between the reflection factor in the optical functional surface S4, and the wavelength of the incident ray of light, the reflection factor of the optical functional surface S4 shows, as shown in FIG. 9, the local maximal value larger than 1% between the wavelength λ1+50 nm and the wavelength λ2, however, it shows that it is not larger than 1% in the vicinity of wavelengths λ1, λ2 and λ3.

From this, the objective lenses 5q, 5T, 5U and 5W in the present example 8 has the reflection prevention function for the first-third light flux, by the antireflective films 51Q, 51T, 51U and 51W, whose number of layers is small, and it can be seen that, by preventing the lowering of transmission light amount, the dependability of the recording and reproducing can be increased.

Example 9

In Example 9, the objective lenses 5D in the embodiment is structured as a lens of so-called 1-lens composition as shown in Table 9. The focal distance of this objective lens 5E is 2.0 mm to the light flux of wavelength 405 nm.

TABLE 9

|  |  | 1-lens composition Focal distance = 2.0 mm (λ = 405 nm) | | |
|---|---|---|---|---|
|  | Lens composition | λ = 405 nm | λ = 650 nm | λ = 780 nm |
|  | NA | 0.85 | 0.65 | 0.5 |
| S1 | S1 maximum surface angle (°) | 70.6 | 55 | 49.2 |
|  | S1 maximum ray angle (°) | 70.6 | 56.2 | 53.1 |
| S2 | S2 maximum surface angle (°) | 6.6 | 1.3 | 2.9 |
|  | S2 maximum ray angle (°) | 51.6 | 41.9 | 33 |

Herein, in Table 9, S1 and S2 are respectively optical functional surfaces of objective lens 5D, and S1 is positioned on laser light sources 2a and 2b side, and S2 is positioned on the information recording medium such as AOD 100, to the lens main body 50.

In more detail, the optical functional surfaces S1 and S2 are formed of the antireflective film of 7-layer structure shown in Table 6.

As a result of measurement of the transmission factor of this objective lens 5D, it shows a good value in which the transmission factor to the light flux of the wavelength 408 nm is 98%, and the transmission factor to the light flux of the wavelength 658 nm is 98%.

Further, as a result of measurement of the relationship between the reflection factor in the optical functional surfaces S1 and S2 of this objective lens 5D, and the wavelength of the incident ray of light, the reflection factor of the optical functional surfaces S1 and S2 shows, as shown in FIG. 9, the local maximal value larger than 1% between the wavelength λ1+50 nm and wavelength λ2, however, shows that it is not larger than 1% in the vicinity of wavelengths λ1 and λ2.

From this, the objective lenses 5D in the present example 9 has the reflection prevention function for the first, second light flux, by the antireflective film 51D whose number of layers is small, and it can be seen that, by preventing the lowering of transmission light amount, the dependability of the recording and reproducing can be increased.

Example 10

In Example 10, the objective lens 50 in the embodiment 15 is structured as a lens of so-called 1-lens composition as shown in Table 9.

In more details, the optical functional surfaces S1, S2 are formed of the antireflective film of 7-layer composition shown in the Table 6.

As a result of measurement of the transmission factor of this objective lens 50, it shows a good value in which the transmission factor to the light flux of the wavelength 408 nm is 98%, the transmission factor to the light flux of the wavelength 658 nm is 98%, and the transmission factor to the light flux of the wavelength 785 nm is 97%.

Further, as a result of measurement of the relationship between the reflection factor in the optical functional surfaces S1, S2 of this objective lens 50, and the wavelength of the incident ray of light, the reflection factor of the optical functional surfaces S1, S2 shows, as shown in FIG. 9, the local maximal value larger than 1% between the wavelength $\lambda 1+50$ nm and wavelength $\lambda 2$, however, shows that it is not larger than 1% in the vicinity of wavelengths $\lambda 1$, $\lambda 2$ and $\lambda 3$.

From this, it can be seen that the objective lens 50 in the present example 10 has the reflection prevention function for the first-third light flux by the antireflective film 510 whose number of layers is small, and that, by preventing the lowering of transmission light amount, the dependability of the recording and reproducing can be increased.

Example 11

In Example 11, the objective lens 5K in the embodiments 11 and 12 is structured as a lens of so-called 1-lens composition as shown in Table 9.

In more details, the optical functional surfaces S1 is formed of the antireflective film of 5-layer composition shown in the Table 7 and S2 is formed of the antireflective film of 7-layer composition shown in the Table 6.

As a result of measurement of the transmission factor of this objective lens 5K, it shows a good value in which the transmission factor to the light flux of the wavelength 408 nm is 98%, and the transmission factor to the light flux of the wavelength 658 nm is 98%.

Figure 10:
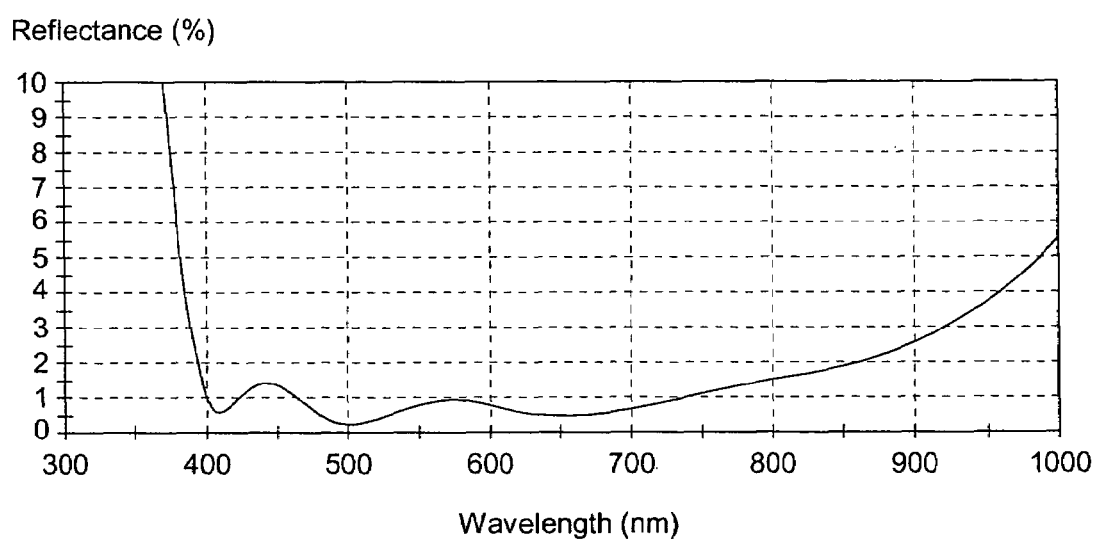
FIG. 10 is a view showing a spectral reflection factor curve on the optical functional surface formed of a antireflective film of Table 7.

Further, as a result of measurement of the relationship between the reflection factor in the optical functional surface S1 of this objective lens 5K, and the wavelength of the incident ray of light, the reflection factor of the optical functional surface S1 shows, as shown in FIG. 10, the local maximal value larger than 1% between the wavelength $\lambda 1+15$ nm and wavelength $\lambda 2$, however, shows that it is not larger than 1% in the vicinity of wavelengths $\lambda 1$ and $\lambda 2$.

Further, as a result of measurement of the relationship between the reflection factor in the optical functional surface S2, and the wavelength of the incident ray of light, the reflection factor of the optical functional surface S2 shows, as shown in FIG. 9, the local maximal value larger than 1% between the wavelength $\lambda 1+15$ nm and wavelength $\lambda 2$, however, shows that it is not larger than 1% in the vicinity of wavelengths $\lambda 1$ and $\lambda 2$.

From this, it can be seen that the objective lens 5K in the present example 11 has the reflection prevention function for the first and second light fluxes by the antireflective film 51K whose number of layers is small, and that, by preventing the lowering of transmission light amount, the dependability of the recording and reproducing can be increased.

Example 12

In Example 12, the objective lens 5V in the embodiments 21, 22 is structured as a lens of so-called 1-lens composition as shown in Table 9.

In more details, the optical functional surfaces S1 is formed of the antireflective film of 9-layer composition shown in the Table 8, and S2 is formed of the antireflective film of 7-layer composition shown in the Table 6.

As a result of measurement of the transmission factor of this objective lens 5V, it shows a good value in which the transmission factor to the light flux of the wavelength 408 nm is 98%, the transmission factor to the light flux of the wavelength 658 nm is 98%, and the transmission factor to the light flux of the wavelength 785 nm is 97%.

Further, as a result of measurement of the relationship between the reflection factor in the optical functional surface S1 of this objective lens 5V, and the wavelength of the incident ray of light, the reflection factor of the optical functional surface S1 shows, as shown in FIG. 11, that it is not larger than 1% in the vicinity of wavelengths $\lambda 1$, $\lambda 2$, and $\lambda 3$.

Further, as a result of measurement of the relationship between the reflection factor in the optical functional surface S2, and the wavelength of the incident ray of light, the reflection factor of the optical functional surface S2 shows, as shown in FIG. 9, the local maximal value larger than 1% between the wavelength $\lambda 1+15$ nm and wavelength $\lambda 2$, however, shows that it is not larger than 1% in the vicinity of wavelengths $\lambda 1$, $\lambda 2$, and $\lambda 3$.

From this, it can be seen that the objective lens 5V in the present example 12 has the reflection prevention function for the first-third light fluxes by the antireflective film 51V whose number of layers is small, and that, by preventing the lowering of transmission light amount, the dependability of the recording and reproducing can be increased.

Example 13

In Example 13, the objective lens 5W in the embodiment 15, is structured as a lens of so-called 1-lens composition, and the optical functional surfaces S1, S2 are formed of the antireflective film of 10-layer structure shown in Table 11. In the antireflective film, a value of ((the maximum film thickness in the effective diameter)−(the minimum film thickness in the effective diameter))/average film thickness, is made not larger than 5%, and the film thickness distribution is made uniform.

TABLE 10

| Example | | Example 13 | Example 14 | Example 15 |
|---|---|---|---|---|
| | S1 | Table 11 | Table 12 | Table 12 |
| | S2 | Table 11 | Table 13 | Table 13 |
| Film thickness distribution | | Uniform | Uniform | Un-uniform |
| 408 nm | P-wave transmission factor (%) | 98.5 | 99.0 | 98.8 |
| | S-wave transmission factor (%) | 98.5 | 95.8 | 95.0 |
| | Average transmission factor (%) | 98.3 | 97.1 | 96.7 |
| 658 nm | P-wave transmission factor (%) | 99.1 | 99.2 | 98.9 |
| | S-wave | 97.6 | 94.3 | 95.9 |

TABLE 10-continued

| Example | | Example 13 | Example 14 | Example 15 |
|---|---|---|---|---|
| | transmission factor (%) | | | |
| | Average transmission factor (%) | 98.1 | 96.5 | 97.2 |
| 785 nm | P-wave transmission factor (%) | 98.4 | 98.7 | 98.2 |
| | S-wave transmission factor (%) | 98.4 | 97.0 | 96.6 |
| | Average transmission factor (%) | 98.2 | 97.6 | 97.1 |

In the optical pick-up device 1W using this objective lens 5W, the recording and reproducing can be surely conducted by the first-third light fluxes. When the transmission factor of the P-polarization and S-polarization of the first-third light fluxes is measured, it is almost equal as shown in Table 10.

TABLE 11

| Layer | Material | Index | Thickness |
|---|---|---|---|
| Air | | 1 | |
| 10 | $MgF_2$ | 1.39 | 106.21 |
| 9 | $TiO_2$ | 2.50 | 18.98 |
| 8 | $Al_2O_3$ | 1.65 | 25.44 |
| 7 | $TiO_2$ | 2.50 | 92.11 |
| 6 | $Al_2O_3$ | 1.65 | 30.61 |
| 5 | $TiO_2$ | 2.50 | 19.32 |
| 4 | $Al_2O_3$ | 1.65 | 77.25 |
| 3 | $TiO_2$ | 2.50 | 10.43 |
| 2 | $MgF_2$ | 1.39 | 43.24 |
| 1 | $Al_2O_3$ | 1.65 | 71.06 |
| Lens | BK7 | 1.53 | |

Figure 12:
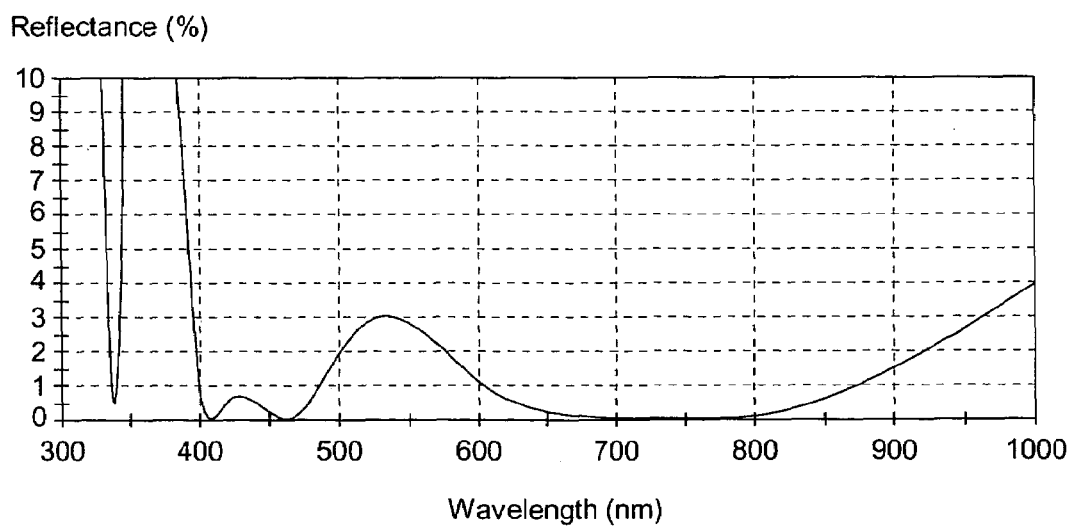
FIG. 12 is a view showing a spectral reflection factor curve on the optical functional surface formed of a antireflective film of Table 11.

Further, as a result of measurement of the relationship between the reflection factor in the optical functional surfaces S1 and S2, of this objective lens 5W, and the wavelength of the incident ray of light, the reflection factor of the optical functional surfaces S1 and S2 shows, as shown in FIG. 12, the local maximal value larger than 1% between the wavelength λ1+50 nm and wavelength λ2, however, shows that it is not larger than 1% in the vicinity of λ1, λ2 and λ3.

From this, the objective lens 5W in the present example 13 has the reflection prevention function for the first-third light fluxes, and it can be seen that, by preventing the lowering of transmission light amount, the dependability of the recording and reproducing can be increased. Further, because there is not a case where the incident light amount of the light detector is decreased due to the separation of the transmission factor of the P-polarization and S-polarization, it can be seen that the dependability of the recording and reproducing can be more increased.

Example 14

In Example 14, the objective lens 5W in the embodiment 22 is structured as a lens of so-called 1-lens composition, and the optical functional surface S1 is formed of the antireflective film of 9-layer structure shown in the Table 12, and the optical functional surface S2 is formed of the antireflective film of 9-layer structure shown in the Table 13. In the antireflective film, a value of)((the maximum film thickness in the effective diameter)−(the minimum film thickness in the effective diameter))/average film thickness, is made not larger than 5%, and the film thickness distribution is made uniform.

TABLE 12

| Layer | Material | Index | Thickness |
|---|---|---|---|
| Air | | 1 | |
| 9 | $SiO_2$ | 1.46 | 106.08 |
| 8 | $Ta_2O_5$ | 2.06 | 40.23 |
| 7 | $SiO_2$ | 1.46 | 10.67 |
| 6 | $Ta_2O_5$ | 2.06 | 85.89 |
| 5 | $SiO_2$ | 1.46 | 26.22 |
| 4 | $Ta_2O_5$ | 2.06 | 16.89 |
| 3 | $SiO_2$ | 1.46 | 15.79 |
| 2 | $Ta_2O_5$ | 2.06 | 9.65 |
| 1 | $SiO_2$ | 1.46 | 190.96 |
| Lens | Optical plastic | 1.55 | |

TABLE 13

| Layer | Material | Index | Thickness |
|---|---|---|---|
| Air | | 1 | |
| 9 | $SiO_2$ | 1.46 | 100.84 |
| 8 | $Ta_2O_5$ | 2.06 | 38.94 |
| 7 | $SiO_2$ | 1.46 | 11.75 |
| 6 | $Ta_2O_5$ | 2.06 | 78.7 |
| 5 | $SiO_2$ | 1.46 | 34.17 |
| 4 | $Ta_2O_5$ | 2.06 | 8.22 |
| 3 | $SiO_2$ | 1.46 | 15 |
| 2 | $Ta_2O_5$ | 2.06 | 5.27 |
| 1 | $SiO_2$ | 1.46 | 212.21 |
| Lens | Optical plastic | 1.55 | |

Figure 13:
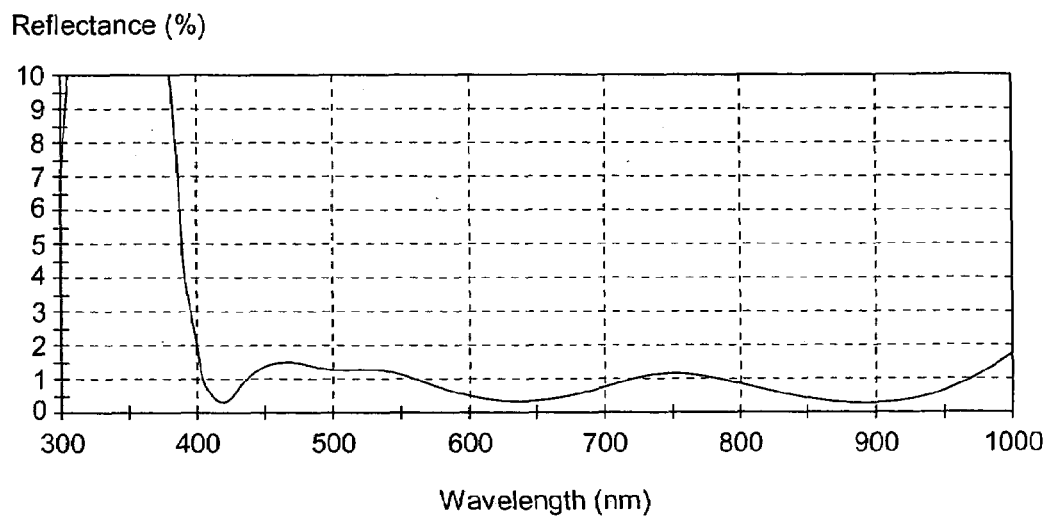
FIG. 13 is a view showing a spectral reflection factor curve on the optical functional surface formed of a antireflective film of Table 12.

In the optical pick-up device 1W using this objective lens 5W, the recording and reproducing can be securely conducted by the first-third light fluxes., Further, as a result of measurement of the relationship between the reflection factor in the optical functional surface S1 of this objective lens 5W, and the wavelength of the incident ray of light, the reflection factor of the optical functional surface S1 shows, as shown in FIG. 13, the local maximal value larger than 1% between the wavelength λ1+50 nm and wavelength λ2, however, shows that it is not larger than 1% in the vicinity of wavelengths λ1, λ2 and λ3.

Figure 14:
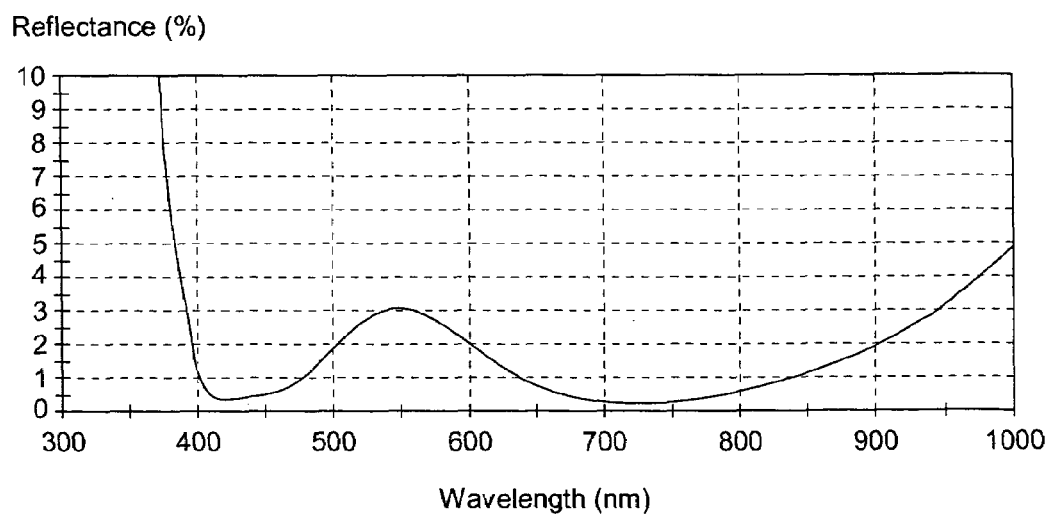
FIG. 14 is a view showing a spectral reflection factor curve on the optical functional surface formed of a antireflective film of Table 13.

Further, as a result of measurement of the relationship between the reflection factor in the optical functional surface S2, and the wavelength of the incident ray of light, the reflection factor of the optical functional surface S2 shows, as shown in FIG. 14, the local maximal value larger than 1% between the wavelength λ1+50 nm and wavelength λ2, however, shows that it is not larger than 1% in the vicinity of wavelengths λ1, λ2 and λ3.

From this, the objective lens 5W in the present example 14 has the reflection prevention function for the first-third light fluxes, and it can be seen that, by preventing the lowering of transmission light amount, the dependability of the recording and reproducing can be increased.

Example 15

In Example 15, the objective lens 5W in the embodiment 22 is structured as a lens of so-called 1-lens composition, and the optical functional surface S1 is formed of the antireflective film of 9-layer structure shown in the Table 12, and the optical functional surface S2 is formed of the antireflective film of 9-layer structure shown in the Table 13. In the antireflective film, a value of ((the maximum film thickness in the effective diameter)−(the minimum film thickness in the effective diameter))/average film thickness, is made larger than 5%, and the film thickness distribution is made un-uniform.

When the transmission factor of this objective lens 5W is measured, the transmission factor is a little lower than the objective lens 5W in the present example 14, however, also in the optical pick-up device 1W using the objective lens 5W in the present example 15, the recording and reproducing can be securely conducted by the first-third light fluxes.

From this, the objective lens 5W in the present example 15 has the reflection prevention function for the first-third light fluxes, and it can be seen that, by preventing the lowering of transmission light amount, the dependability of the recording and reproducing can be increased.

Example 16

In Example 16, the objective lens 5W in the embodiment 15, is structured as a lens of so-called 2-lens composition, and the optical functional surfaces S1 and S2 are formed of the antireflective film of 6-layer structure shown in Table 4, and the optical functional surfaces S3, S4 are formed of the antireflective film of 10-layer structure shown in Table 11. In the antireflective film, a value of ((the maximum film thickness in the effective diameter)−(the minimum film thickness in the effective diameter))/average film thickness, is made not larger than 5%, and the film thickness distribution is made uniform.

In the optical pick-up device 1X using this objective lens 5X, the recording and reproducing can be securely conducted by the first-third light fluxes. When the transmission factors of the P-polarization and S-polarization of the first-third light fluxes are measured, they are almost equal as shown in Table 14.

TABLE 14

|  |  | Example | | |
|---|---|---|---|---|
|  |  | Example 16 | Example 17 | Example 18 |
| Name of coats | S1 | Table 4 | Table 4 | Table 4 |
|  | S2 | Table 4 | Table 4 | Table 4 |
|  | S3 | Table 11 | Table 12 | Table 12 |
|  | S4 | Table 11 | Table 13 | Table 13 |
|  | Film thickness distribution | Uniform | Uniform | Un-uniform |
| 408 nm | P-wave transmission factor (%) | 98.3 | 98.8 | 98.6 |
|  | S-wave transmission factor (%) | 98.2 | 95.5 | 94.9 |
|  | Average transmission factor (%) | 98.3 | 97.1 | 96.7 |
| 658 nm | P-wave transmission factor (%) | 98.8 | 98.9 | 98.6 |
|  | S-wave transmission factor (%) | 97.4 | 94.1 | 95.7 |
|  | Average transmission factor (%) | 98.1 | 96.5 | 97.2 |
| 785 nm | P-wave transmission factor (%) | 98.2 | 98.5 | 98.0 |

TABLE 14-continued

|  | Example | | |
|---|---|---|---|
|  | Example 16 | Example 17 | Example 18 |
| S-wave transmission factor (%) | 98.1 | 96.7 | 96.3 |
| Average transmission factor (%) | 98.2 | 97.6 | 97.1 |

Further, as a result of measurement of the relationship between the reflection factor in the optical functional surfaces S1 and S2 of this objective lens 5X, and the wavelength of the incident ray of light, the reflection factor of the optical functional surfaces S1 and S2 shows, as shown in FIG. 8, the local maximal value larger than 1% between the wavelength $\lambda 1+15$ nm and wavelength $\lambda 2$, however, shows that it is not larger than 1% in the vicinity of wavelengths $\lambda 1$, $\lambda 2$ and $\lambda 3$.

Further, as a result of measurement of the relationship between the reflection factor in the optical functional surfaces S3 and S4 and the wavelength of the incident ray of light, the reflection factor of the optical functional surfaces S3, S4 shows, as shown in FIG. 12, the local maximal value larger than 1% between the wavelength $\lambda 1+50$ nm and wavelength $\lambda 2$, however, shows that it is not larger than 1% in the vicinity of wavelengths $\lambda 1$, $\lambda 2$ and $\lambda 3$.

From this, it can be seen that the objective lens 5X in the present example 16 has the reflection prevention function for the first-third light fluxes by the antireflective film 51X whose number of layers is small, and that, by preventing the lowering of transmission light amount, the dependability of the recording and reproducing can be increased. Further, because there is not a case where the incident light amount of the light detector is decreased due to the separation of the transmission factor of the P-polarization and S-polarization, it can be seen that the dependability of the recording and reproducing can be more increased.

Example 17

In Example 17, the objective lens 5X in the embodiment 23, is structured as a lens of so-called 2-lens composition, and the optical functional surfaces S1 and S2 are formed of the antireflective film of 6-layer structure shown in Table 4, the optical functional surface S3, is formed of the antireflective film of 9-layer structure shown in Table 12, and the optical functional surface S4 is formed of the antireflective film of 9-layer structure shown in Table 13. In the antireflective film, a value of ((the maximum film thickness in the effective diameter)−(the minimum film thickness in the effective diameter))/average film thickness, is made not larger than 5%, and the film thickness distribution is made uniform.

In the optical pick-up device 1X using this objective lens 5X, the recording and reproducing can be securely conducted by the first-third light fluxes.

Further, as a result of measurement of the relationship between the reflection factor in the optical functional surfaces S1 and S2 of this objective lens 5X, and the wavelength of the incident ray of light, the reflection factor of the optical functional surfaces S1, S2 shows, as shown in FIG. 8, the local maximal value larger than 1% between the wavelength λ1 and wavelength λ2, however, shows that it is not larger than 1% in the vicinity of wavelengths λ1, λ2 and λ3.

Further, as a result of measurement of the relationship between the reflection factor in the optical functional surface S3, and the wavelength of the incident ray of light, the reflection factor of the optical functional surface S3 shows, as shown in FIG. 13, that it is not larger than 1% in the vicinity of wavelengths λ1, λ2 and λ3.

Further, as a result of measurement of the relationship between the reflection factor in the optical functional surface S4 and the wavelength of the incident ray of light, the reflection factor of the optical functional surface S4 shows, as shown in FIG. 14, the local maximal value larger than 1% between the wavelength λ1+50 nm and wavelength λ2, however, shows that it is not larger than 1% in the vicinity of wavelengths λ1, λ2 and λ3.

From this, it can be seen that the objective lens 5X in the present example 17 has the reflection prevention function for the first-third light fluxes by the antireflective film 51X whose number of layers is small, and that, by preventing the lowering of transmission light amount, the dependability of the recording and reproducing can be increased.

Example 18

In Example 18, the objective lens 5X in the embodiment 23, is structured as a lens of so-called 2-lens composition, and the optical functional surfaces S1, S2 are formed of the antireflective film of 6-layer structure shown in Table 4, the optical functional surface S3, is formed of the antireflective film of 9-layer structure shown in Table 12, and the optical functional surface S4 is formed of the antireflective film of 9-layer structure shown in Table 13. In the antireflective film, a value of ((the maximum film thickness in the effective diameter)−(the minimum film thickness in the effective diameter))/average film thickness, is made larger than 5%, and the film thickness distribution is made un-uniform.

When the transmission factor of this objective lens 5X is measured, the transmission factor is a little lower than the objective lens 5X in the present example 17, however, also in the optical pick-up device 1X using the objective lens 5X in the present example 18, the recording and reproducing can be securely conducted by the first-third light fluxes.

Further, as a result of measurement of the relationship between the reflection factor in the optical functional surfaces S1 and S2 of this objective lens 5X, and the wavelength of the incident ray of light, the reflection factor of the optical functional surfaces S1 and S2 shows, as shown in FIG. 8, the local maximal value larger than 1% between the wavelength λ1 and wavelength λ2, however, shows that it is not larger than 1% in the vicinity of wavelengths λ1, λ2 and λ3.

Further, as a result of measurement of the relationship between the reflection factor in the optical functional surface S3, and the wavelength of the incident ray of light, the reflection factor of the optical functional surface S3 shows, as shown in FIG. 13, that it is not larger than 1% in the vicinity of wavelengths λ1, λ2 and λ3.

Further, as a result of measurement of the relationship between the reflection factor in the optical functional surface S4 and the wavelength of the incident ray of light, the reflection factor of the optical functional surface S4 shows, as shown in FIG. 14, the local maximal value larger than 1% between the wavelength λ1+50 rim and wavelength λ2, however, shows that it is not larger than 1% in the vicinity of wavelengths λ1, λ2 and λ3.

From this, it can be seen that the objective lens 5X in the present example 18 has the reflection prevention function for the first-third light fluxes by the antireflective film 51X whose number of layers is small, and that, by preventing the lowering of transmission light amount, the dependability of the recording and reproducing can be increased.

According to the structure written in item 1, the number of layers of the antireflective film can be reduced without deteriorating the reflection prevention function for the light flux of wavelength λ1 and the light flux of wavelength λ2. Accordingly, the production cost can be reduced, and a change of the spectral characteristic by the penetration of water between layers of the antireflective film can be suppressed.

According to the structure written in item 2, it is of course that the same effect as the structure written in item 1 can be obtained, and the reflection of the light flux of using wavelength λ1 of AOD or blu-ray disc, the light flux of using wavelength λ2 of DVD, and the light flux of using wavelength λ3 of CD, can be prevented by the antireflective film whose number of layers is small.

According to the structure written in item 3, it is of course that the same effect as the structure written in item 1 or item 2 can be obtained, and the accurate recording or reproducing of the information can be conducted by using the light flux of $0° \leq \theta max \leq 40°$.

According to the structure written in items 4-6, it is of course that the same effect as the structure written any one of items 1-3, can be conducted, and the number of layers of the antireflective film can be reduced without deteriorating the reflection prevention function.

According to the structures written in 7, 9, 11, 13, 15, 17, 19, 21, 23, and 25, the number of layers of the antireflective film can be reduced without deteriorating the reflection prevention function for the light flux of wavelength λ1 and the light flux of wavelength λ2. Accordingly, the production cost can be reduced, and a change of the spectral characteristic by the penetration of water between layers of the antireflective film can be suppressed.

According to the structures written in items 8, 10, 12, 14, 16, 18, 20, 22, 24, and 26, it is of course that the same effect as the structures written in items 7, 9, 11, 13, 15, 17, 19, 21, 23, and 25, can be obtained, and the reflection can be prevented also for the wavelength λ in the zone near λ3 (760≦λ3≦800 nm).

According to the structure written in item 27, the same effect as the structure written in any one of items 1-27 can be obtained.

According to the structure written in items 28 and 30, the same effect as the structure written in any one of items 1-27 can be obtained.

According to the structure written in items 29 and 31, the same effect as the structure written in items 28 and 30 can be obtained.

According to the structure written in items 32 and 33, the same effect as the structure written in any one of items 1-31 can be obtained.

According to the structure written in item 34, it is of course that the same effect as the structure written in any one of items 1-33 can be obtained, and because the primary coat exists between the optical element main body and antireflective film, the adhesion of the antireflective film to the optical element main body can be increased. According to the structure written in item 35, the same effect as the structure written in any one of items 1-34 can be obtained.

What is claimed is:

1. An optical element to be arranged in an optical pickup apparatus for conducting information recording and/or reproducing and to converge light fluxes with a plurality of wavelengths including a wavelength of $\lambda 1$ (390 nm$\leq \lambda 1 \leq$430 nm) and a wavelength of $\lambda 2$ (630 nm$\leq \lambda 2 \leq$800 nm) onto information recording media, comprising:
   one or more optical main bodies; and
   an antireflective film which is arranged on a surface of the optical element main bodies and on which at least one optical functional surface is formed,
   wherein a reflectivity of an incident light flux perpendicular to the optical functional surface has a local maximum value of 1% or more between the wavelength $\lambda 1$ and the wavelength $\lambda 2$.

2. The optical element of claim 1, wherein a reflectivity of an incident light flux perpendicular to the optical functional surface has a local maximum value of 2% or more between the wavelength $\lambda 1$ and the wavelength $\lambda 2$.

3. The optical element of claim 2, wherein the plurality of wavelengths comprises a wavelength $\lambda 3$ (760 nm$\leq \lambda 3 \leq$800 nm) and the wavelength $\lambda 2$ (630 nm$\leq \lambda 2 \leq$670 nm).

4. The optical element of claim 2 which satisfies $0° \leq \theta max \leq 40°$ where $\theta max$ is the maximum incident and outgoing angle of a light flux with the wavelength $\lambda 1$ on the optical functional surface.

5. The optical element of claim 2,
   wherein the optical element satisfies $1.45 \leq n_0 \leq 1.65$
      where $n_0$ is a refractive index of the optical element main body and
   the antireflective layer comprises
      a first layer which is closest to the optical element main body and
      a second layer which is second closest to the optical element main body, and
      satisfies the followings:

$1.7 \leq n_1 \leq 2.5$, 225 nm$\leq nd_1 \leq$275 nm $1.3 \leq n_2 \leq 1.55$, 100 nm$\leq nd_2 \leq$150 nm where $n_1$ is a refractive index of the first layer,
   $nd_1$ is an optical film thickness of the first layer,
   $n_2$ is a refractive index of the second layer and
   $nd_2$ is an optical film thickness of the second layer.

6. The optical element of claim 2,
   wherein the optical element satisfies $1.45 \leq n_0 \leq 1.65$
      where $n_0$ is a refractive index of the optical element main body and
   the antireflective layer comprises
      a first layer which is closest to the optical element main body,
      a second layer which is second closest to the optical element main body and
      a third layer which is third closest to the optical element main body, and
      satisfies the followings:

$1.7 \leq n1 \leq 2.5$, 125 nm$\leq nd1 \leq$175 nm, $1.55 \leq n2 \leq 1.7$, 75 nm$\leq nd2 \leq$125 nm, $1.3 \leq n_3 \leq 1.55$, 100 nm$\leq nd_3 \leq$150 nm where $n_1$ is a refractive index of the first layer,
   $nd_1$ is an optical film thickness of the first layer,
   $n_2$ is a refractive index of the second layer,
   $nd_2$ is an optical film thickness of the second layer,
   $n_3$ is a refractive index of the third layer and
   $nd_3$ is an optical film thickness of the third layer.

7. The optical element of claim 2,
   wherein the optical element satisfies $1.45 \leq n_0 \leq 1.65$
      where $n_0$ is a refractive index of the optical element main body and
   the antireflective layer comprises
      a first layer which is closest to the optical element main body,
      a second layer which is second closest to the optical element main body,
      a third layer which is third closest to the optical element main body and
      a fourth layer which is fourth closest to the optical element main body, and
      satisfies the followings:

$1.7 \leq n_1 \leq 2.5$, 25 nm$\leq nd_1 \leq$75 nm $1.3 \leq n_2 \leq 1.55$, 25 nm$\leq nd_2 \leq$75 nm $1.7 \leq n_3 \leq 2.5$, 225 nm$\leq nd_3 \leq$275 nm $1.3 \leq n_4 \leq 1.55$, 135 nm$\leq nd_4 \leq$185 nm where $n_1$ is a refractive index of the first layer,
   $nd_1$ is an optical film thickness of the first layer,
   $n_2$ is a refractive index of the second layer,
   $nd_2$ is an optical film thickness of the second layer,
   $n_3$ is a refractive index of the third layer,
   $nd_3$ is an optical-film thickness of the third layer,
   $n_4$ is a refractive index of the fourth layer and
   $nd_4$ is an optical film thickness of the fourth layer.

8. The optical element of claim 1, wherein the wavelength $\lambda 2$ satisfies 630 nm$\leq \lambda 2 \leq$670 nm.

9. The optical element of claim 8,
   wherein the optical functional surface has a reflectivity of 1% or below when a wavelength $\lambda$ of an incident light flux perpendicular to the optical functional surface satisfies $\lambda 1 \leq \lambda \leq \lambda 1+15$ nm or $\lambda 2 \leq \lambda \leq \lambda 2+15$ nm
   and has a local maximum reflectivity of more than 1% when the wavelength $\lambda$ satisfies $\lambda 1+15$ nm$\leq \lambda \leq \lambda 2$.

10. The optical element of claim 9,
    wherein the antireflective film satisfies the following formula:

((the maximum film thickness in an effective diameter of the optical element for a light flux with the wavelength $\lambda 1$)−(the minimum film thickness in the effective diameter))/(an average of the antireflective film thickness)$\leq$5% and the antireflective film forms at least two optical functional surfaces which satisfy $0° \leq \theta max \leq 40°$
       where $\theta max$ is the maximum incident and outgoing angle in the effective diameter.

11. The optical element of claim 9,
    wherein the antireflective film satisfies the following formula:

((the maximum film thickness in an effective diameter of the optical element for a light flux with the wavelength $\lambda 1$)−(the minimum film thickness in the effective diameter))/(an average of the antireflective film thickness)>5% and the antireflective film forms at least two optical functional surfaces which satisfy the followings:

$0° \leq \theta max \leq 40°$ and $0° \leq \theta\perp max \leq 40°$ where $\theta max$ is the maximum incident and outgoing angle in the effective diameter and $\theta\perp max$ is the maximum face angle in the effective diameter.

12. The optical element of claim 9, wherein the plurality of wavelengths comprises a wavelength λ3 (760 nm≦λ3≦800 nm) and the optical functional surface has a reflectivity of 1% or below when the wavelength λ3 satisfies λ3≦λ≦λ3+15 nm.

13. The optical element of claim 8,
wherein the optical functional surface has a reflectivity of 1% or below when a wavelength λ of an incident light flux perpendicular to the optical functional surface satisfies λ1≦λ≦λ1+50 nm or λ2≦λ≦λ2+40 nm
and has a local maximum reflectivity of more than 1% when the wavelength λ satisfies λ1+50 nm≦λ≦λ2.

14. The optical element of claim 13,
wherein the antireflective film satisfies the following formula:

((the maximum film thickness in an effective diameter of the optical element for a light flux with the wavelength λ1)−(the minimum film thickness in the effective diameter))/(an average of the antireflective film thickness)≦5% and the antireflective film forms at least two optical functional surfaces which satisfy 40°<θmax<90°
where θmax is the maximum incident and outgoing angle in the effective diameter.

15. The optical element of claim 13,
wherein the antireflective film satisfies the following formula:

((the maximum film thickness in an effective diameter of the optical element for a light flux with the wavelength λ1)−(the minimum film thickness in the effective diameter))/(an average of the antireflective film thickness)>5% and the antireflective film forms at least two optical functional surfaces which satisfy one of the following combinations:

0°≦θmax≦40° and 40°<θ⊥max<90°, or

40°<θmax<90° and 0°≦θ⊥max≦40° where θmax is the maximum incident and outgoing angle in the effective diameter and θ⊥max is the maximum face angle in the effective diameter.

16. The optical element of claim 13, wherein the plurality of wavelengths comprises a wavelength λ3 (760 nm≦λ3≦800 nm) and the optical functional surface has a reflectivity of 1% or below when the wavelength λ3 satisfies λ3≦λ≦λ3+30 nm.

17. The optical element of claim 8,
wherein the antireflective film has at least one first optical functional surface and at least one second optical functional surface,
the fist optical functional surface has a reflectivity of 1% or below when a wavelength λ of an incident light flux perpendicular to the optical functional surface satisfies λ1≦λ≦λ1+15 nm or λ2≦λ≦λ2+15 nm and has a local maximum reflectivity of more than 1% when the wavelength λ satisfies λ1+15 nm≦λ≦λ2,
the second functional surface has a reflectivity of 1% or below when the wavelength λ satisfies λ1≦λ≦λ1+50 nm or λ2≦λ≦λ2+40 nm and has a local maximum reflectivity of more than 1% when the wavelength λ satisfies λ1+50 nm≦λ≦λ2.

18. The optical element of claim 17,
wherein the antireflective film satisfies the following formula:

((the maximum film thickness in an effective diameter of the optical element for a light flux with the wavelength λ1)−(the minimum film thickness in the effective diameter))/(an average of the antireflettive film thickness)≦5% and the antireflective film forms
at least one of the first optical functional surface which satisfies 0°≦θmax≦40°
and at least one of the second optical functional surface which satisfies 40°<θmax<90° are formed on the antireflective film
where θmax is the maximum incident and outgoing angle in the effective diameter and θ⊥max is a maximum face angle in the effective diameter.

19. The optical element of claim 17,
wherein the antireflective film satisfies the following formula:

((the maximum film thickness in an effective diameter of the optical element for a light flux with the wavelength λ1)−(the minimum film thickness in the effective diameter))/(an average of the antireflective film thickness)>5% and the antireflective film forms
at least one of the first optical functional surfaces which satisfy the followings:

0°≦θmax≦40° and 0°≦θ⊥max≦40° and at least one of the second optical functional surfaces which satisfy one of the following combinations:

0°≦θmax≦40° and 40°≦θ⊥max≦90°, or

40°≦θmax≦90° and 0°≦θ⊥max≦40° where θmax is a maximum incident and outgoing angle in the effective diameter and θ⊥max is a maximum face angle in the effective diameter.

20. The optical element of claim 17,
wherein the plurality of wavelengths comprises a wavelength λ3 (760 nm≦λ3≦800 nm) and the optical functional surface has a reflectivity of 1% or below when the wavelength λ3 satisfies λ3≦λ≦λ3+30 nm.

21. The optical element of claim 8,
wherein the antireflective film satisfies the followings:

((the maximum film thickness in an effective diameter of the optical element for a light flux with the wavelength λ1)−(the minimum film thickness in the effective diameter))/(an average of the antireflective film thickness)>5%, and the antireflective film forms
at least one of a first optical functional surfaces which satisfy the followings:

0°≦θmax≦40° and 0°≦θ⊥max≦40° and at least one of a second optical functional surfaces which satisfy the followings:

40°<θmax<90° and 40°<θ⊥max≦90° where θmax is a maximum incident and outgoing angle in the effective diameter and θ⊥max is a maximum face angle in the effective diameter, wherein
the fist optical functional surface has a reflectivity of 1% or below when a wavelength λ of an incident light flux perpendicular to the optical functional surface satisfies λ1≦λ≦λ1+15 nm or λ2≦λ≦λ2+15 nm and has a local maximum refractive index of more than 1% when the wavelength λ satisfies λ1+15 nm≦λ≦λ2, and the second optical functional surface has a reflectivity of 1.5% or below when a wavelength λ of the wavelength satisfies λ1≦λ≦λ2+130 nm.

22. The optical element of claim 21, wherein the plurality of wavelengths comprises a wavelength λ3 (760 nm≦λ3≦800 nm), the first optical functional surface has a refractivity of 1% or below when the wavelength λ satisfies λ3≦λ≦λ3+15 nm and the second optical functional surface has a reflectivity of 1.5% or below when the wavelength λ satisfies λ1≦λ≦λ3+120 nm.

23. The optical element of claim 8, wherein the antireflective film satisfies the followings:

((the maximum film thickness in an effective diameter of the optical element for a light flux with the wavelength λ1)−(the minimum film thickness in the effective diameter))/(an average of the antireflective film thickness)>5% and the antireflective film forms at least one of a first optical functional surfaces which satisfies one of the following combinations:

0°≦θmax≦40° and 40°≦θ⊥max≦90° or

40°<θmax<90° and 0°≦θ⊥max≦40° and at least one of a second optical functional surfaces which satisfies the followings:

40°<θmax<90° and 40°<θ⊥max≦90° where θmax is the maximum incident and outgoing angle in the effective diameter and θ⊥max is the maximum face angle in the effective diameter, wherein the fist optical functional surface has a reflectivity of 1% or below when a wavelength λ of an incident light flux perpendicular to the optical functional surface satisfies λ1≦λ≦λ1+50 nm or λ2≦λ≦λ2+40 nm and has a local maximum reflectivity of more than 1% when the wavelength λ satisfies λ1+50 nm≦λ≦λ2, the second functional surface has a reflectivity of 1.5% or below when the wavelength λ satisfies λ1≦λ≦λ2+130 nm.

24. The optical element of claim 23, wherein the plurality of wavelengths comprises a wavelength λ3 (760 nm≦λ3≦800 nm), the first optical functional surface has a reflectivity of 1% or below when the wavelength λ satisfies λ3≦λ≦λ3+30 nm and the second optical functional surface has a reflectivity of 1.5% or below when the wavelength λ satisfies λ1≦λ≦λ3+120 nm.

25. The optical element of claim 8, wherein the antireflective film is arranged on both sides of the optical element main body and forms a first optical functional surface positioned on the laser light source side in the optical pickup apparatus and a second optical functional surface positioned in the information recording medium side, wherein the fist optical functional surface has a reflectivity of 1% or below when a wavelength λ of an incident light flux perpendicular to the optical functional surface satisfies λ1≦λ≦λ2+40 nm, the second functional surface has a reflectivity of 1% or below when the wavelength λ of satisfies λ1≦λ≦λ1+50 nm or λ2≦λ≦λ2+40 nm and has a local maximum reflectivity of more than 1% when the wavelength λ satisfies λ1+50 nm≦λ≦λ2.

26. The optical element of claim 25, wherein the plurality of wavelengths comprises a wavelength λ3 (760 nm≦λ3≦800 nm), the first optical functional surface has a reflectivity of 1% or below when the wavelength λ satisfies λ3≦λ≦λ3+30 nm and the second optical functional surface has a reflectivity of 1% or below when the wavelength λ satisfies λ1≦λ≦λ3+30 nm.

27. The optical element of claim 8 wherein the optical element main bodies comprise a first optical element main body arranged on the laser light source side in the optical pickup apparatus and a second optical element main body arranged on the information recording medium side in the optical pickup apparatus, the antireflective film is arranged both sides on the first optical main body and forms a first optical functional surface positioned on the laser light source side in the optical pickup apparatus and, a second optical functional surface positioned on the information recording medium side, the antireflective film is further arranged both sides on the second optical main body and forms a third optical functional surface positioned on the laser light source side in the optical pickup apparatus of the second optical element body and a fourth optical functional surface positioned on the information recording medium side of the second optical element body, wherein the fist and second optical functional surfaces have reflectivities of 1% or below when a wavelength λ of an incident light flux perpendicular to the optical functional surface is λ=λ1 or λ=λ2 and have a local maximum reflectivity of more than 1% when the wavelength λ satisfies λ1<λ<λ2, the third functional surface has a reflectivity of 1% or below when the wavelength λ satisfies λ1≦λ≦λ1+40 nm, and the fourth functional surface has a reflectivity of 1% or below when the wavelength λ satisfies λ1≦λ≦λ1+50 nm or λ2≦λ≦λ2+40 nm and has a local maximum refractive index of more than 1% when the wavelength λ satisfies λ1+50 nm≦λ≦λ2.

28. The optical element of claim 27, wherein the plurality of wavelengths comprises a wavelength λ3 (760 nm≦λ3≦800 nm), the first and second optical functional surfaces have reflectivities of 1% or below when the wavelength λ is λ3, the third optical functional surface has a reflectivity of 1% or below when the wavelength λ satisfies λ1≦λ≦λ3+30 nm, and the fourth optical functional surface has a reflectivity of 1% or below when the wavelength λ satisfies λ2≦λ≦λ3+30 nm.

29. The optical element of claim 1 which is an objective lens having a numerical aperture of 0.65 or more.

30. The optical element of claim 1, wherein the antireflection film is formed by at least two types of materials, a material having a lower refractive index of $1.3 \leq n \leq 1.55$ and a material having a higher refractive index of $1.7 \leq n \leq 2.5$, where n is a refractive index for a light flux having a wavelength of 500 nm.

31. The optical element of claim 30, wherein the material having the lower refractive index is based on $MgF_2$ or $SiO_2$ and the material having the higher refractive index is based on $TiO_2$, $Ta_2O_5$, $CeO_2$, $ZrO_2$, $HfO_2$ or $CeF_3$.

32. The optical element of claim 1, wherein the antireflection films are formed by at least three types of materials, a material having a lower refractive index of $1.3 \leq n < 1.55$, a material having a middle refractive index of $1.55 \leq n < 1.7$ and a material having a higher refractive index of $1.7 \leq n \leq 2.5$, where n is a refractive index for a light flux having a wavelength of 500 nm.

33. The optical element of claim 32, wherein the material having the lower refractive index is based on $MgF_2$ or $SiO_2$, the material having the middle refractive index is based on $Al_2O_3$ and the material having the higher refractive index is based on $TiO_2$, $Ta_2O_5$, $CeO_2$ $ZrO_2$, $HfO_2$ or $CeF_3$.

34. The optical element of claim 1 wherein the optical element main body is molded by plastic.

35. The optical element of claim 1 wherein the optical element main body is molded by glass.

36. The optical element of claim 1, wherein a primary coat lies between the optical element main body and the antireflection film and satisfies $|n_0' - n_0| \leq 0.1$ where $n_0'$ is a refractive index of the primary coat and $n_0$ is a refractive index of the optical element main body.

37. An optical pickup apparatus comprising:

a laser light source and a light converging system having the optical element of claim 1, which converges laser beams emitted by the laser light sources onto the optical recording media to conduct at least one of information recording or information reproducing on the optical recording media.

* * * * *